（12) United States Patent
Kelly et al.

(10) Patent No.: US 11,259,453 B2
(45) Date of Patent: Mar. 1, 2022

(54) POWER WINCH EQUIPMENT CRANE

(71) Applicant: Michael S. Kelly, Louisville, TN (US)

(72) Inventors: Michael S. Kelly, Louisville, TN (US);
Benjamin David Nibali, Maryville, TN (US); Zachary David Goldsboro, Knoxville, TN (US)

(*) Notice: Subject to any disclaimer, the term of this patent is extended or adjusted under 35 U.S.C. 154(b) by 0 days.

(21) Appl. No.: 17/239,019

(22) Filed: Apr. 23, 2021

(65) Prior Publication Data

US 2021/0235608 A1 Aug. 5, 2021

Related U.S. Application Data

(63) Continuation-in-part of application No. 17/068,221, filed on Oct. 12, 2020, now Pat. No. 10,988,353.

(60) Provisional application No. 62/932,162, filed on Nov. 7, 2019.

(51) Int. Cl.
*A01B 59/06* (2006.01)
*B66C 23/44* (2006.01)
*A01B 59/00* (2006.01)
*B62D 49/02* (2006.01)

(52) U.S. Cl.
CPC .......... *A01B 59/066* (2013.01); *A01B 59/006* (2013.01); *B62D 49/02* (2013.01); *B66C 23/44* (2013.01)

(58) Field of Classification Search
CPC ..... A01B 59/066; A01B 59/006; B66C 23/44; B66D 1/00; B66D 1/02; B62D 49/02
See application file for complete search history.

(56) References Cited

U.S. PATENT DOCUMENTS

| 122,973 A | 1/1872 | Spragg et al. |
| 1,901,566 A | 3/1933 | Presbrey |
| 2,259,553 A | 10/1941 | Clapper |
| 2,298,199 A | 10/1942 | Court et al. |
| 2,366,115 A | 12/1944 | Kuch et al. |
| 2,381,731 A | 8/1945 | Erdahl |
| 2,519,974 A | 8/1950 | Mork |
| 2,713,218 A | 7/1955 | Dyer |

(Continued)

FOREIGN PATENT DOCUMENTS

| CA | 571346 A | 2/1959 |
| CA | 892881 A | 2/1972 |

(Continued)

*Primary Examiner* — Michael E Gallion
(74) *Attorney, Agent, or Firm* — Pitts & Lake, P.C.

(57) ABSTRACT

A power hoist equipment crane system to be used with a tractor roll bar, the system including a pivotable support bar configured to be substantially U-shaped having two side portions and a middle portion connecting the two side portions, a cable support member provided to the pivotable support bar and configured to support a cable from a hoist, and bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor.

23 Claims, 26 Drawing Sheets

(56) References Cited

U.S. PATENT DOCUMENTS

| | | | |
|---|---|---|---|
| 2,746,612 A | 5/1956 | Wirz | |
| 2,772,004 A | 11/1956 | Noble | |
| 2,787,383 A | 4/1957 | Antos et al. | |
| 2,794,382 A | 6/1957 | Ellson | |
| 3,229,830 A | 1/1966 | Smith | |
| 3,266,636 A | 8/1966 | Dorn | |
| 3,390,795 A | 7/1968 | Mannix | |
| 3,473,679 A | 10/1969 | Weichel | |
| 3,570,614 A | 3/1971 | Del Bagno | |
| 3,598,347 A | 8/1971 | Marburger | |
| 2,336,965 A | 12/1973 | Shoemaker | |
| 3,818,551 A | 6/1974 | Coughran, Jr. | |
| 3,888,368 A | 6/1975 | Hawkins | |
| 3,899,089 A | 8/1975 | Wardlaw | |
| 3,901,328 A | 8/1975 | Stanfield | |
| 4,042,116 A | 8/1977 | Bertolino | |
| 4,067,471 A | 1/1978 | Roatcap | |
| 4,172,688 A | 10/1979 | Cecchi et al. | |
| 4,222,186 A | 9/1980 | Molby | |
| 4,316,617 A | 2/1982 | Flaugh | |
| 4,484,760 A | 11/1984 | Rach | |
| 4,838,753 A | 6/1989 | Gehman et al. | |
| 4,846,624 A | 7/1989 | Hohn | |
| 4,929,143 A | 5/1990 | Dohnalik | |
| 5,029,650 A | 7/1991 | Smit | |
| 5,169,279 A | 12/1992 | Zimmerman | |
| 5,314,289 A | 5/1994 | O'Leary | |
| 5,347,939 A | 9/1994 | Hood, Jr. et al. | |
| 5,348,172 A | 9/1994 | Wilson | |
| 5,393,194 A * | 2/1995 | Smith | B60P 1/00 |
| | | | 212/298 |
| 5,722,677 A | 3/1998 | Lichter et al. | |
| 5,727,803 A * | 3/1998 | Johnson | B60D 1/141 |
| | | | 280/416.2 |
| 6,257,347 B1 * | 7/2001 | Campisi | A01B 59/068 |
| | | | 172/439 |
| 6,349,959 B2 | 2/2002 | Schlegel et al. | |
| 6,481,694 B2 * | 11/2002 | Kozak | B62B 1/14 |
| | | | 254/325 |
| 6,533,042 B1 | 3/2003 | Marine, Sr. et al. | |
| 6,612,549 B1 * | 9/2003 | Woods, Jr. | B66C 23/44 |
| | | | 254/323 |
| 6,981,834 B1 * | 1/2006 | Henry | B66C 23/44 |
| | | | 414/462 |
| 7,100,704 B2 * | 9/2006 | Potter | A01B 59/068 |
| | | | 172/439 |
| 7,604,134 B2 | 10/2009 | Lichinchi | |
| 7,896,604 B1 * | 3/2011 | Donlin | B66D 1/00 |
| | | | 414/462 |
| 8,690,514 B2 | 4/2014 | Marola | |
| 9,434,582 B2 * | 9/2016 | Arthur | B66C 23/00 |
| 9,775,276 B2 * | 10/2017 | Hyder | A01B 59/043 |
| 9,963,329 B1 * | 5/2018 | Guess, Jr. | B66C 23/44 |
| 10,160,395 B2 | 12/2018 | Robinson et al. | |
| 10,172,275 B2 * | 1/2019 | Totten | A01B 63/16 |
| 10,988,353 B1 * | 4/2021 | Kelly | B66D 1/28 |
| 2003/0039535 A1 | 2/2003 | Gourand | |
| 2005/0023012 A1 | 2/2005 | Bowden | |
| 2007/0166138 A1 | 7/2007 | Brooks | |
| 2007/0221600 A1 | 9/2007 | Davis | |
| 2009/0230071 A1 | 9/2009 | Thompson | |
| 2010/0200822 A1 | 8/2010 | Kitchens, Sr. | |
| 2011/0147020 A1 * | 6/2011 | Waltz | A01B 59/064 |
| | | | 172/439 |
| 2011/0206488 A1 | 8/2011 | Windsor et al. | |
| 2013/0087521 A1 | 4/2013 | Walker et al. | |
| 2016/0122973 A1 | 5/2016 | Lyle et al. | |
| 2016/0167933 A1 * | 6/2016 | Birch | B66C 23/44 |
| | | | 254/326 |
| 2016/0280516 A1 * | 9/2016 | Rieger | B62B 3/02 |
| 2017/0055430 A1 * | 3/2017 | Steiner | B62D 49/065 |
| 2020/0047655 A1 | 2/2020 | Urbanick et al. | |
| 2020/0165110 A1 * | 5/2020 | Wilson | B66C 23/44 |

FOREIGN PATENT DOCUMENTS

| | | |
|---|---|---|
| CN | 201087999 Y | 7/2008 |
| CN | 202528985 U | 11/2012 |
| EP | 2592042 A1 | 5/2013 |
| GB | 642680 A | 9/1950 |
| GB | 745243 A | 2/1956 |
| GB | 890630 A | 3/1962 |
| GB | 1267645 A | 3/1972 |

* cited by examiner

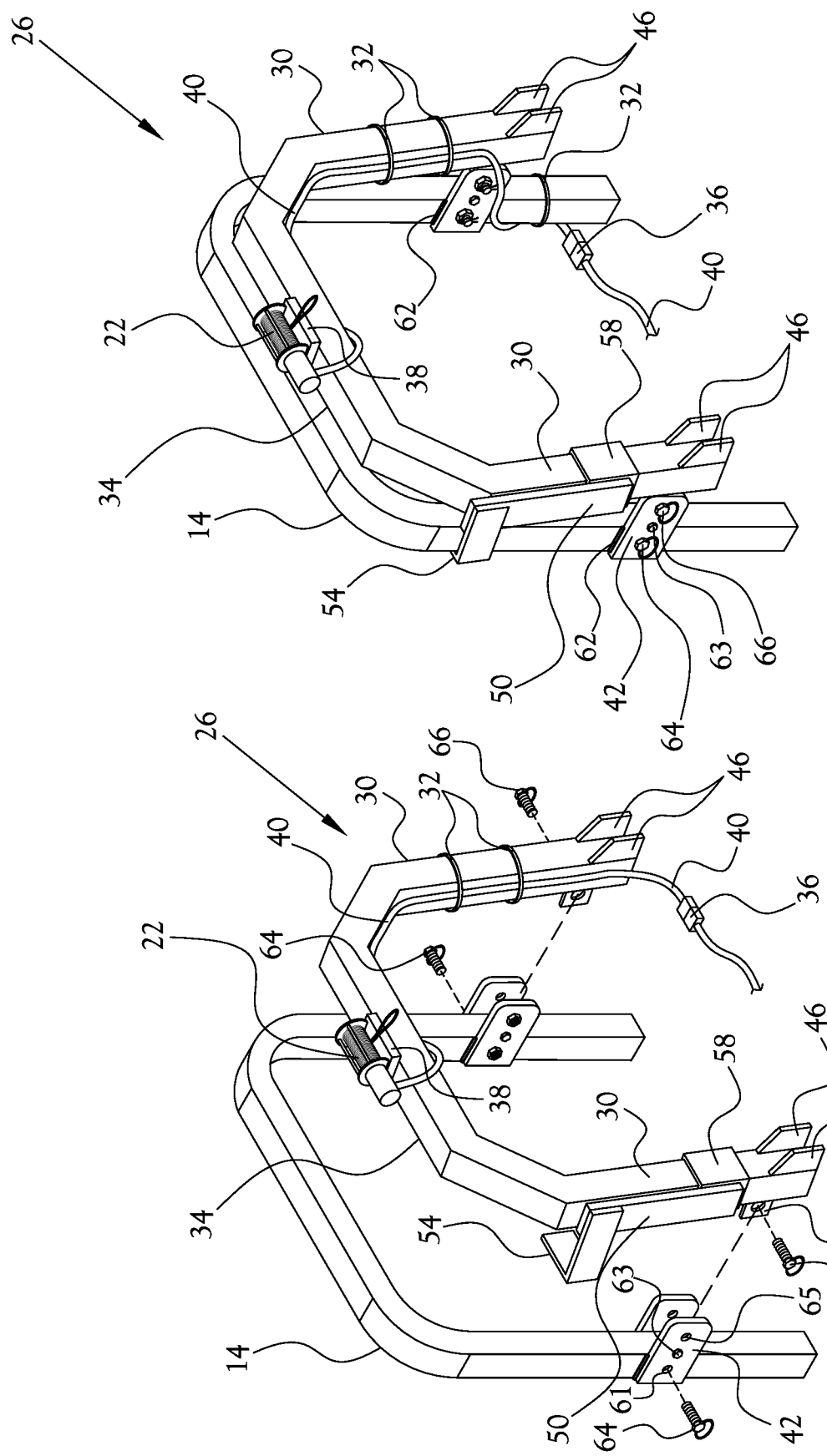

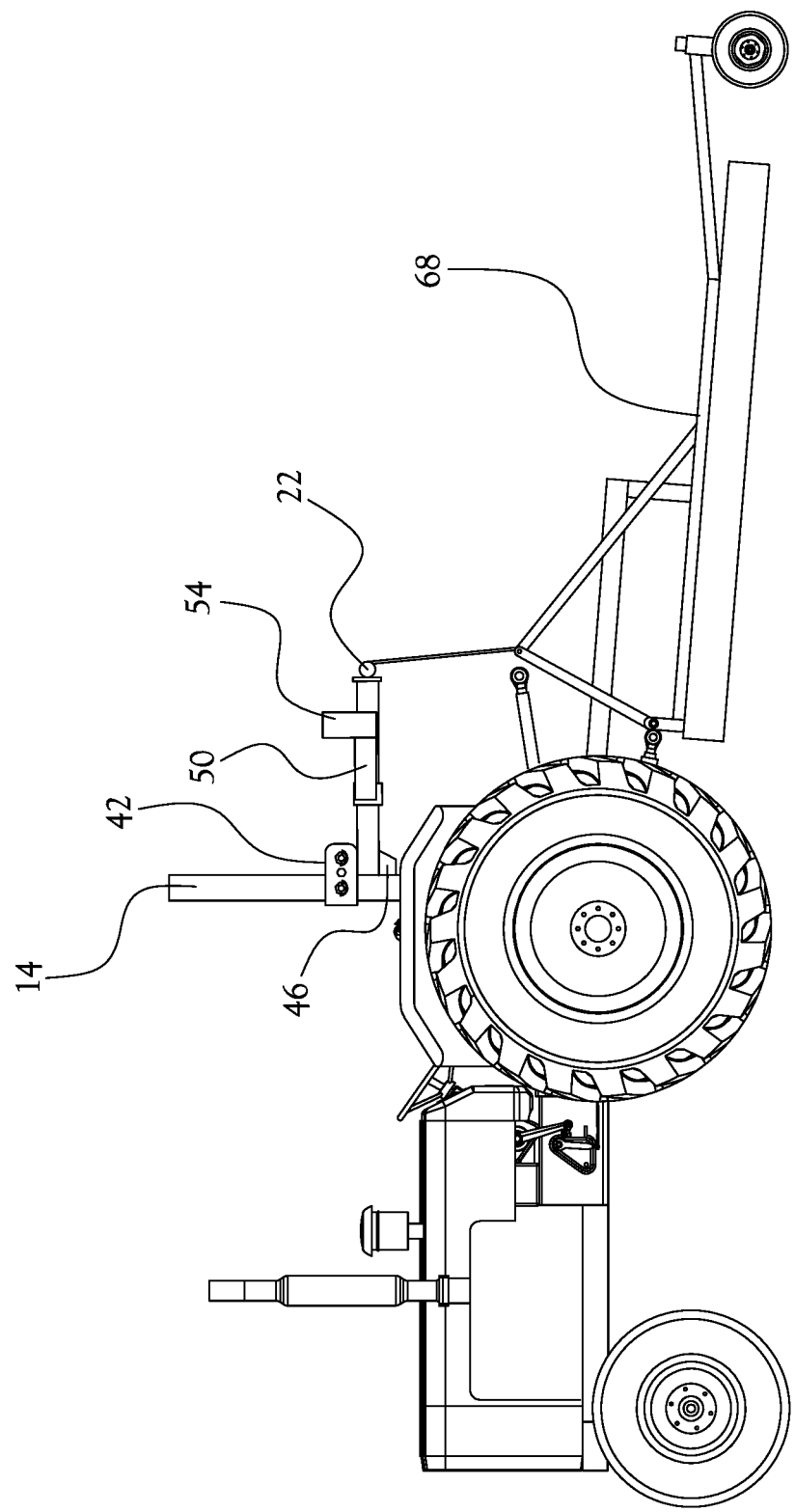

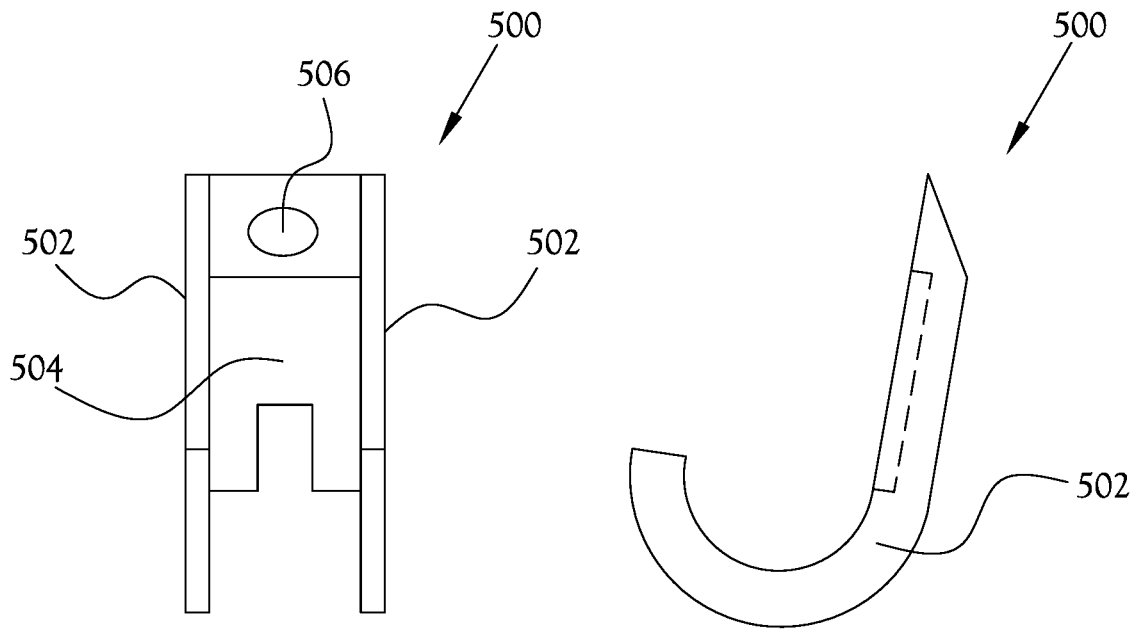
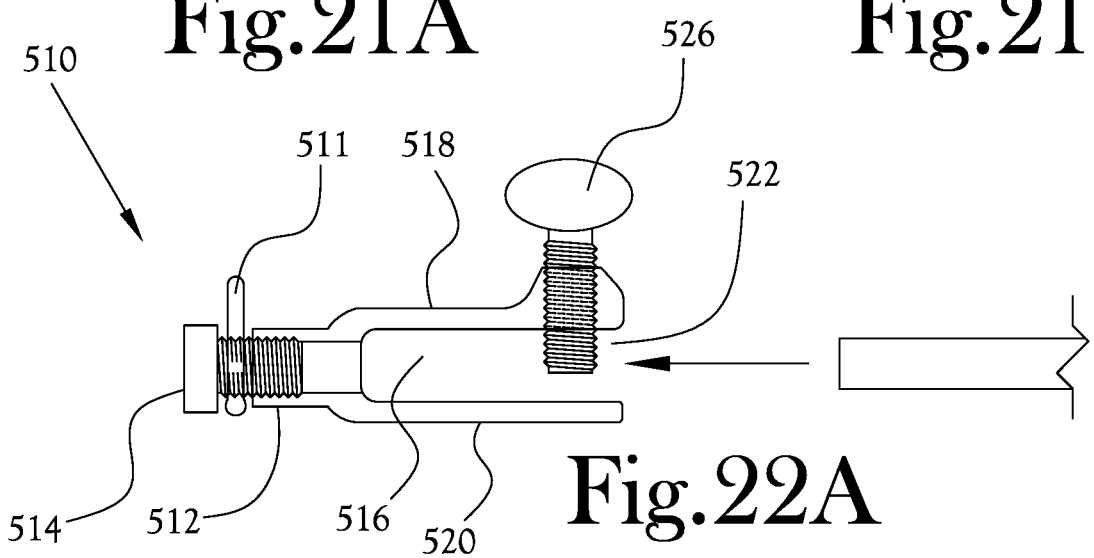
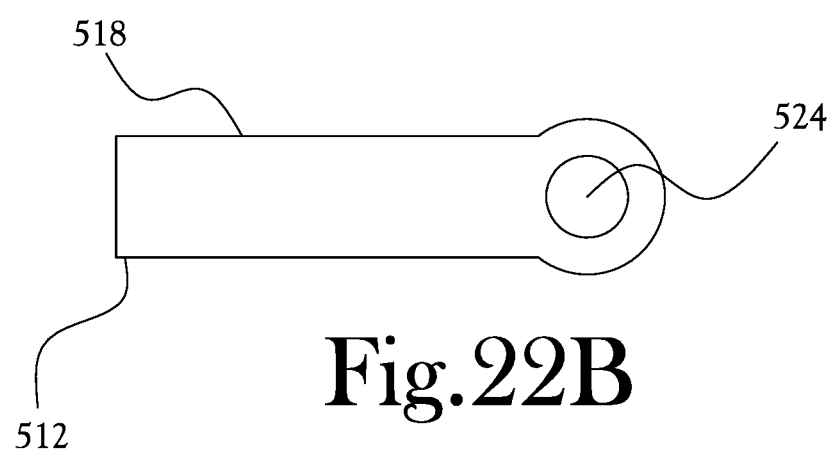

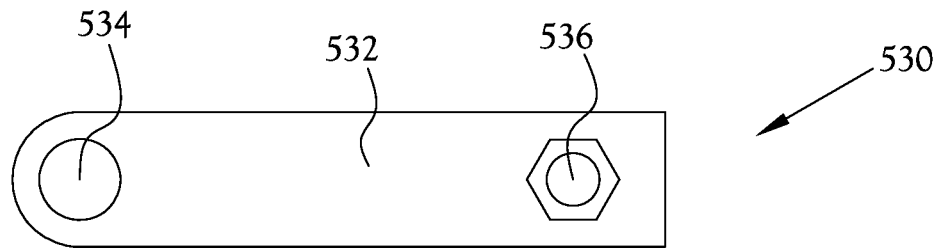
Fig.23A
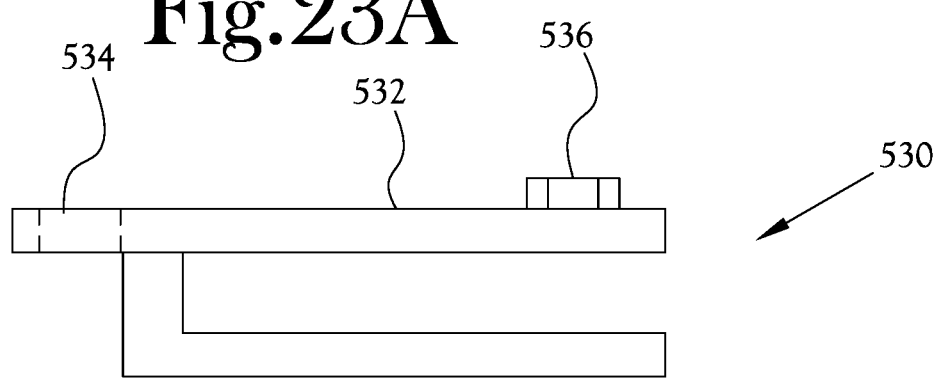
Fig.23B
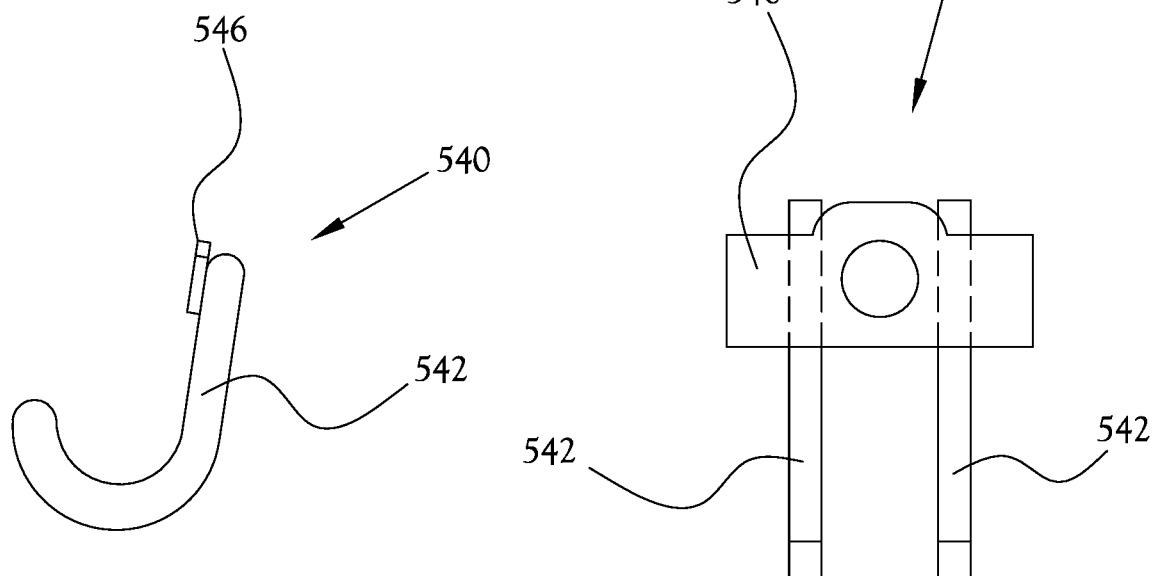
Fig.24A
Fig.24B

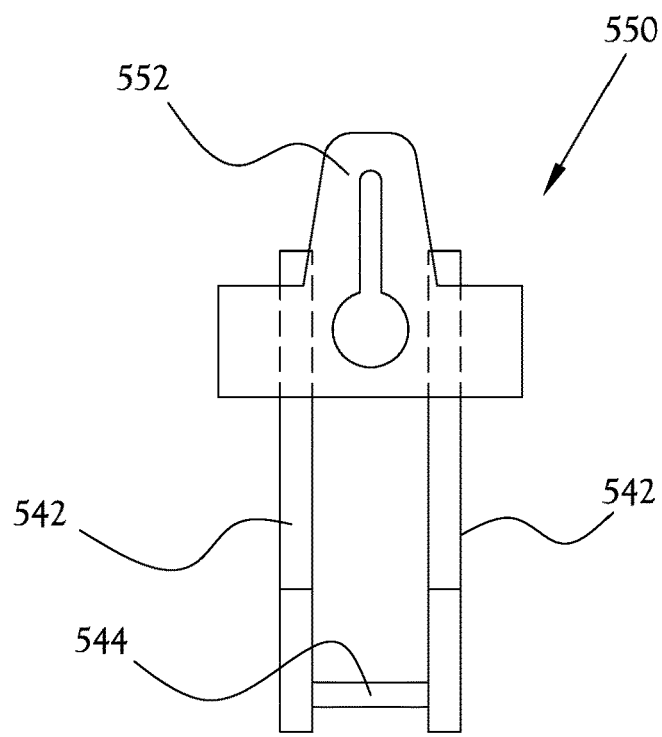
Fig.24C
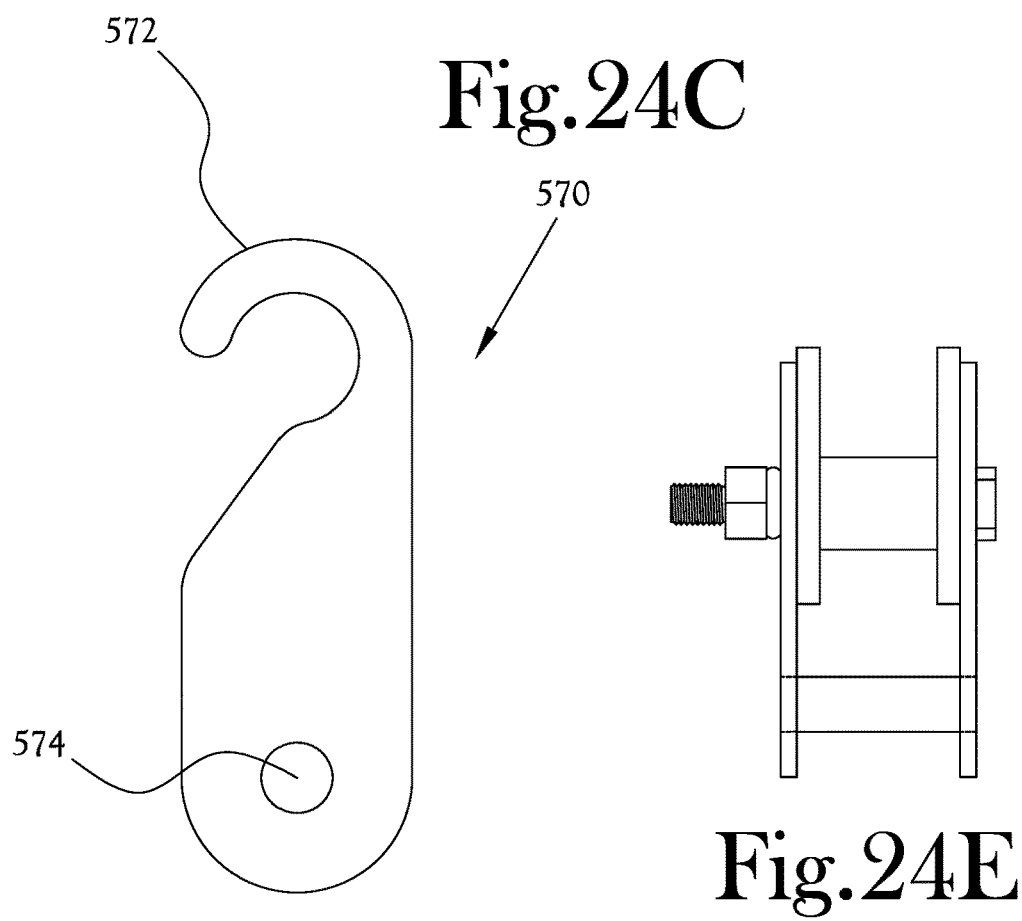
Fig.24D
Fig.24E

POWER WINCH EQUIPMENT CRANE

CROSS-REFERENCE TO RELATED APPLICATIONS

This application is a continuation-in-part of U.S. patent application Ser. No. 17/068,221, filed on Oct. 12, 2020, which claimed the benefit of U.S. Provisional Patent Application Ser. No. 62/932,162, filed on Nov. 7, 2019, the contents of which are incorporated herein in their entirety by reference.

FIELD OF INVENTION

The present general inventive concept relates to an equipment crane system for a farm vehicle, and, more particularly, to a pivotable power winch equipment crane which may be affixed to a vehicle roll bar to aid in the coupling and decoupling of heavy equipment to the vehicle.

BACKGROUND

Farm vehicles such as tractors are used for a variety of heavy work applications. A host of different work apparatuses may be attached to, and powered by, the tractor. For example, a tractor may be provided with a backhoe attachment, a rototiller, a plow, a hay baler, or any number of other such devices/systems. However, being designed for heavy duty, most of all of these attachments are themselves very heavy, and being able to lift them into place for all the necessary couplings to the tractor can be very difficult, especially for a lone user. For example, some large tillers need to be lifted into position for hookup to a 3-point hitch. Additionally, a complicated series of maneuvers is often required, for which a relatively long time in which the implements must be lifted. Attempting such a procedure by hand creates a situation in which the user could be seriously injured. Some approaches to this problem involve attaching a hoist to a beam of a structure such as a barn to mechanically lift the implements into place, or installing a quick hitch to the back of the tractor. However, these approaches are problematic. Arranging and relying on a barn hoist is both complicated and limiting as far as having to position the implements to be attached to the tractor, leading to some of the same problems for a single user. The use of quick hitches changes the arrangement of the implement arms, and can be cumbersome, obtrusive, and lacking in aesthetics. Therefore, an easier and more convenient way to maneuver heavy equipment into place for connection to the tractor would be desirable.

BRIEF SUMMARY

According to various example embodiments of the present general inventive concept, a power winch support is provided that is selectively positionable between a stored position and a position to allow a piece of equipment to be lifted by the power winch to a desirable position to be hooked to the tractor.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a power winch equipment crane system to be used with a tractor roll bar, the system including a winch support bar configured to be generally U-shaped having two side portions and a middle portion connecting the two side portions, a power winch attached to the winch support bar proximate a midpoint of the middle portion of the winch support bar, and hinge members provided respectively proximate each end of the winch support bar and configured to couple the winch support bar to the tractor roll bar in a pivoting arrangement, the hinge members configured such that the winch support bar is pivotable between a substantially vertical position when not in use, and a substantially horizontal position in which the power winch is positioned at a point spaced back from the tractor so as to be located over an implement that is attachable to the tractor.

The foregoing and/or other aspects and advantages of the present general inventive concept may also be achieved by providing a power winch equipment crane system to be used with a tractor roll bar, the system including a winch support bar configured to be generally U-shaped having two side portions and a middle portion connecting the two side portions, a power winch attached to the winch support bar proximate a midpoint of the middle portion of the winch support bar, hinge members provided respectively at each end of the winch support bar and configured to secure the winch support bar to a bracket on the tractor roll bar, the hinge members configured to form a pivoting connection to the winch support bar such that the winch support bar is pivotable between a substantially vertical position when not in use, and a substantially horizontal position in which the power winch is positioned at a point spaced back from the tractor, stop members extending from each end of the winch support bar and configured to contact the tractor roll bar when in the substantially horizontal position to brace the winch support bar against the tractor roll bar, and at least one movable securing member attached to the winch support bar and configured to be selectively positioned so as to contact the tractor roll bar to hold the winch support bar in the substantially vertical position.

The foregoing and/or other aspects and advantages of the present general inventive concept may also be provided by a power hoist equipment crane system to be used with a tractor roll bar, the system including a pivotable support bar configured to be substantially U-shaped having two side portions and a middle portion connecting the two side portions, a cable support member provided to the pivotable support bar and configured to support a cable from a hoist, and bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor.

The foregoing and/or other aspects and advantages of the present general inventive concept may also be provided by a power hoist equipment crane system to be used with a tractor roll bar, the system including a pivotable support bar configured to be substantially U-shaped having two side portions and a middle portion connecting the two side portions, a cable support member provided to the pivotable support bar and configured to support a cable from a hoist, bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor, an auxiliary support bar configured to be selectively coupled to the pivotable support bar, and an auxiliary cable support member provided to the auxiliary support bar and configured to support the cable at a different position than provided by the cable support member of the pivotable support bar, wherein auxiliary support bar is configured such that the auxiliary cable support member is positioned further back from the tractor, and higher, than the cable support member of the pivotable support bar when in the use position, and wherein each of the bracket assemblies comprise a plurality of plates coupled to one another so as to be adjustable in width to accommodate different tractor roll bar widths.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 2A-B illustrate exploded and assembled views of a power winch equipment crane system and a tractor roll bar according to an example embodiment of the present general inventive concept;

FIG. 5 illustrates a use of the power winch equipment crane system of FIGS. 2A-B;

FIGS. 21A-B illustrate front and side views of a backhoe boom supporting member according to an example embodiment of the present general inventive concept;

FIGS. 22A-B illustrate side and top views of a backhoe yoke clamp according to an example embodiment of the present general inventive concept;

FIGS. 23A-B illustrate top and side views of a backhoe yoke clamp according to another example embodiment of the present general inventive concept;

FIGS. 24A-B illustrate side and front views of a rototiller supporting member according to an example embodiment of the present general inventive concept, FIG. 24C illustrates another example embodiment of the supporting member of 24B, FIG. 24D illustrates a side view of an additional fixed rototiller supporting member, and FIG. 24 E illustrates a rototiller tongue assembly with which the rototiller supporting member will interact, according to example embodiments of the present general inventive concept;

DETAILED DESCRIPTION

Figure 1A:
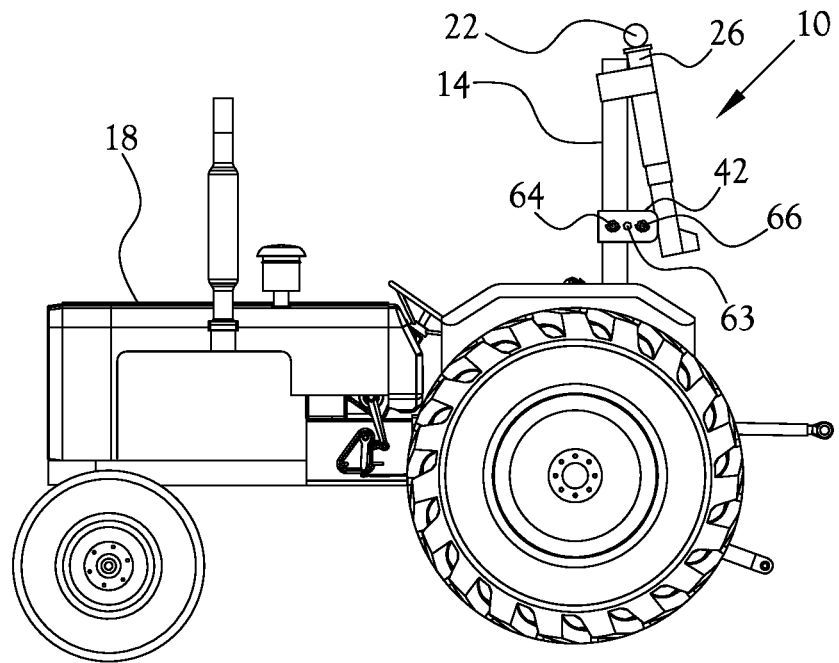
FIGS. 1A-B illustrate a power winch equipment crane system according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concept provide a power winch support system, or power winch equipment crane system, which allows a user to lower a power winch down over a tractor implement and lift the implement for easier and more convenient attachment to the tractor. Thus, the power winch is positionable at a point extending back and away from the tractor so as to be placed over the implement for a lifting and lowering operation. The system then allows the user to move the power winch back to a stowed position that is not obtrusive to the operation of the tractor. Many modern tractors are provided with a roll over protection system (ROPS), which may be referred to herein as a tractor roll bar, or simply a roll bar. In various example embodiments of the present general inventive concept, the power winch may be attached to a support bar that is similar in shape to the tractor roll bar, and which can be connected to the tractor roll bar and rotated to a vertical position that is aesthetically pleasing, as well as out of the way of other equipment operations, when the power winch is not in use. Such systems may be formed integrally with the tractor roll bar, or may be retro-fitted onto existing roll bars. When the user desires to use the power winch, the support bar can simply be moved down to position the power winch over the implement to be lifted, allowing the implement to be hooked up to the tractor connections easily and conveniently by one person. Although the term "tractor" is used in most of the descriptions herein, it is understood that various embodiments of the present general inventive concept may be used with other vehicles as well. It is also noted that the term "implement" is used to generally refer to a number of systems/attachments that may be connected to and utilized by a tractor, such as, for example, a backhoe attachment, a rototiller, a plow, a hay baler, and so on. These implements typically have various pin and linkage connections to be connected to the tractor for proper operation, and by utilizing the power winch system of the present general inventive concept these connections may be conveniently made by a single user. Thus, according to various example embodiments of the present general inventive concept, a power winch support is provided that is selectively positionable between a stored or stowed position and a position to allow a piece of equipment, generally referred to herein as an implement, to be lifted by a power winch, which is installed on the power winch support, to a desirable position to be hooked to the tractor.

Figure 1B:
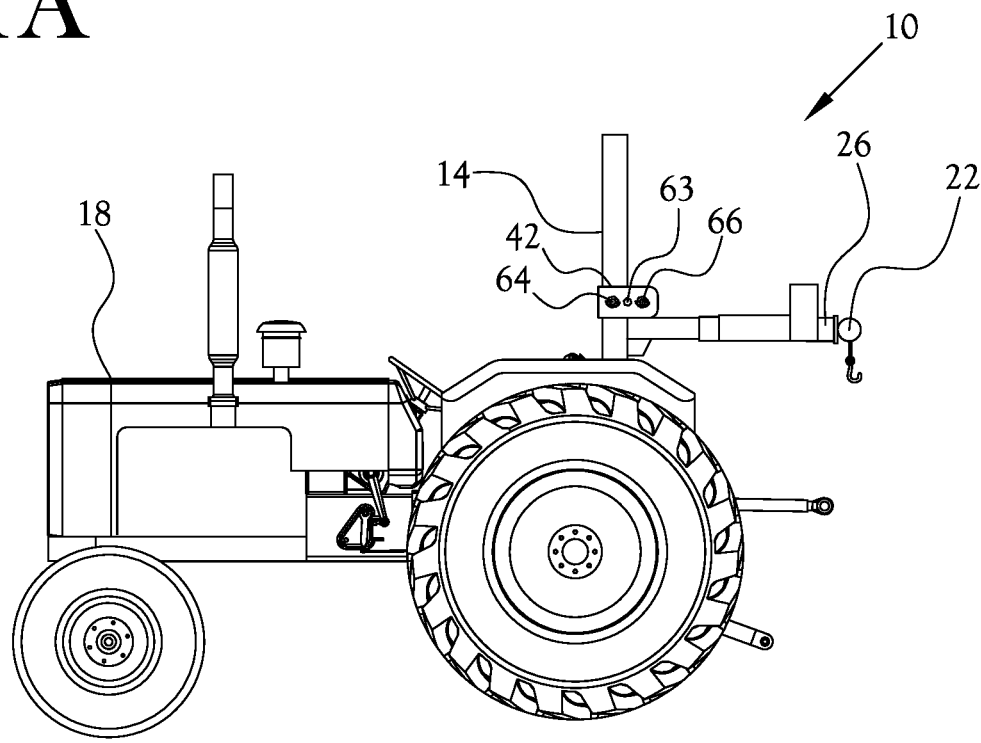

FIGS. 1A-B illustrate a power winch equipment crane system according to an example embodiment of the present general inventive concept. As illustrated in FIG. 1A, a power winch equipment crane system 10, which may be referred to herein as a power winch support system or simply a winch support system, is attached to the tractor roll bar 14 of a tractor 18 in a vertical or stowed position when not in use. The power winch support system 10 includes a power winch 22 mounted on a winch support bar 26 that may be configured in a shape substantially similar to that of the tractor roll bar 14, so as to at least somewhat blend in with the tractor roll bar 14 in an aesthetic sense, and to move the winch support bar 26 and winch 22 out of the way of other operations, when not in use. Thus, when not in use, the winch support bar 26 is oriented in a somewhat vertical orientation, with the power winch 22 positioned proximate a center portion of the tractor roll bar 14. The stowed position/orientation of the winch support bar 26 is not just for aesthetic purposes, but also serves a functional purpose of moving the winch support bar 26 out of the way when not in use. For example, an advantage of the shape of the winch support bar 26 is that when a backhoe is attached to the tractor, an operator may easily operate the backhoe without obstruction, as the operator typically faces backward on the tractor to use the backhoe. Thus, when the winch support bar 26 is in the upright/stowed position, it is safely out of the way and takes up essentially the same space as the tractor roll bar 14. As illustrated in FIG. 1B, when a user wishes to use the power winch 22 to aid in the attaching and/or detaching of an implement to be connected to the tractor 18, the winch support bar 26 is rotated back and down into a substantially horizontal orientation, placing the power winch 22 at a position rear of the tractor 18 and the various connection points of the tractor 18, so that a winch cable having a hook or other such attachment member can be lowered to a point over the implement to raise the connection end of the implement to a position that makes it easier for a single user to perform the various maneuvers and connections to attach the implement to the tractor 18. After the operations are performed, the user can detach the winch 22 cable from the implement and raise the winch support bar 26 back to the raised, or stowed, position.

FIGS. 2A-B illustrate exploded and assembled views, respectively, of a power winch equipment crane system and a tractor roll bar according to an example embodiment of the present general inventive concept. FIG. 2A illustrates the power winch support system 10 of this example embodiment, and the tractor roll bar 14 to which the system 10 is to be attached. FIG. 2B illustrates the winch support system 10 attached to the tractor roll bar 14, and oriented in the upright or stowed orientation. As illustrated in FIG. 2A, the winch support bar 26 may be generally U-shaped so as to resemble the shape of the tractor roll bar 14. Such a configuration is not only functional, in that it makes it easy to lower the winch support bar 26 to place the winch 22 over the tractor implement or equipment that is to be attached to the tractor 18, but is also aesthetically pleasing since it is not as obtrusive and somewhat blends in with the tractor roll bar 14 when the winch support 26 is rotated to a vertical position when not in use. The winch support bar 26 includes two side portions 30 extending to the respective ends of the winch support bar 26, and a middle portion 34, or summit portion, between the two side portions 30. The power winch 22 is attached to the middle portion 34 of the winch support bar 26 proximate a mid-point thereof, so that when the winch support bar 26 is lowered for use of the system 10, the winch 22 will be at least somewhat centered on the longitudinal axis of the tractor 18. In various example embodiments the power winch 22 may be mounted on a mounting plate 38 that is attached to the middle portion 34 of the winch support bar 26, and a power supply line 40 may be run along one of the side portions 30 of the winch support bar 26 to supply power from the battery of the tractor 18 to the power winch 22. As illustrated in FIGS. 2A-2B, the power supply line 40 may be adhered to various portions of the winch support bar by tie-downs 32 to avoid interfering with the movement of the support bar 26. Further, the power supply line 40 may be provided with electrical quick connects 36 for a fast and convenient electrical disconnect when removing the winch support bar 26 from the tractor roll bar 14. The system of the example embodiment illustrated in FIGS. 2A-2B, and which is illustrated in various other drawings herein, is attached to ROPS hinge brackets 42 that are already provided to the tractor roll bar 14. In such a ROPS, the roll bar 14 is designed to be collapsible such that a top portion folds over to contact the bottom portion. To actuate this action, the ROPS hinge brackets 42 have first set bolt holes 61 in which set bolts 64 are positioned when the roll bar 14 is upright. The set bolts 64 pass through corresponding holes in the top portion of the roll bar 14. By removing the set bolts 64 from the first set bolt holes 61, the top portion of the roll bar 14 can be rotated downward, about ROPS hinge pins 63 provided in the brackets 42, so that the set bolt holes in the roll bar 14 align with second set bolt holes 65 in the brackets 42. The set bolts 64 can then be placed in the second set bolt holes 65 to secure the roll bar 14 in the folded position. The power winch equipment crane system 10 illustrated in FIGS. 2A-B take advantage of the second set bolt holes 65 already provided in the ROPS brackets 42. Hinge members 55 are provided at each end of the winch support bar 26 to couple the winch support bar 26 to the tractor roll bar 14 by receiving a pivot pin 66 through each of the second set bolt holes 65 and a corresponding hole in the hinge members 55. Thus, the winch support bar 26 uses the second set bolt holes 65 already provided to the roll bar 14 to form a hinge arrangement about which the winch support bar 26 can pivot. In this example embodiment, the ROPS hinge brackets 42 are attached to the tractor roll bar 14 by, for example, welding (a weld 62 is shown in this example embodiment). The set bolts 64 of the ROPS system are typically bolts secured in place with hair-pin-cotters, and in various example embodiments the pivot pins 66 may be a similar bolt and cotter arrangement, metric bolt, lynch pin, or other type of quick release pin to enable a user to be able to quickly and conveniently remove the winch support bar 26 from the brackets 42, and thus from the tractor roll bar 14. The pivot pin 66 of this example embodiment is a metric bolt that takes advantage of a welded nut already provided on the ROPS bracket 42, but other example embodiments may have a differently designed pivot pin. Thus, various example embodiments of the present general inventive concept may be retro-fitted to existing tractor roll bars. In other various example embodiments, the power winch equipment crane system may be retro-fitted to existing tractor roll bars that do not have the ROPS hinge bracket 42 by providing its own coupling bracket or other connection members, which may be referred to herein as coupling members, as they can couple the hinge members to the tractor roll bar, to be attached to the tractor roll bar 14 by welding or other arrangements. In various example embodiments the connection members may be connected to the roll bar in a variety of ways, such as welding, bolt-on, or the like, while keeping in mind the torque forces that will be produced when a heavy piece of equipment is being supported by the winch 22 that extends back from the roll bar 14 when in position for lifting. In this example embodiment, the hinge members 55 extend from a surface of the winch support bar 26 facing the tractor roll bar 14, and are configured to receive the pivot pins 66 to form the pivoting connection, but in various other example embodiments the pivot/hinge connection may be formed in different configurations, such as directly through the winch support bar 26 proximate the ends thereof. For example, some embodiments of the present general inventive concept may provide a collar configured to fit around the roll bar 14 with a connecting pin to provide the hinge arrangement/mounting point for the system. The example embodiment illustrated in FIGS. 2A-B includes a pair of stop members 46 provided proximate each end of the winch support bar 26, the stop members 46 configured to prevent back and downward rotation of the winch support bar 26 past a point at which the winch 22 is positioned for use. In this example embodiment, the stop members 46 are configured as flat members extending from a surface of the winch support bar 26 facing away from the tractor roll bar 14, at a position proximate the ends of the winch support bar 26, such that when the winch support bar 26 is rotated down to a substantially horizontal position for use of the power winch 22, the stop members 46 will abut the tractor roll bar 14 and prevent further downward rotation of the winch support bar 26. These stop members 46 brace the winch support bar 26 to provide further support for the power winch support system 10 when in use, as the various heavy implements being lifted/lowered by the winch 22 may produce significant downward forces on the winch support bar 26. It is understood that various other example embodiments of the present general inventive concept may provide different configurations for one or more of these components without departing from the scope of the present general inventive concept. The system 10 of FIGS. 2A-B include at least one securing member 50 attached to the winch support bar 26 to lock the winch support bar 26 in place in the stowed position. In this example embodiment the securing member 50 includes a sleeve portion 58 that wraps around at least part of one of the side portions 30 of the winch support bar 26, and which is configured to reciprocally slide along a length of the side portion 30. The securing member also includes a hook portion 54 configured to hook around and contact the surface of the tractor roll bar 14 facing away from the power winch support system 10 when the winch support bar 26 is locked in place. As will be discussed in more detail below in reference to FIGS. 4A-D, a user can use the sliding action of the securing member 50 to easily lock the winch support bar 26 in the upright position when the system 10 is not in use, and can also easily unlock the winch support bar 26 for movement by simply sliding the securing member 50 upward to a point at which the hook member 54 will not make contact with the tractor roll bar 14 when rotating the winch support bar 26 downward (away from the tractor roll bar 14). Although this example embodiment includes a reciprocally sliding securing member 50, various other example embodiments may provide a host of different securing members, such as, for example, a securing member having a contact or hook portion that may be selectively rotated about a position proximate the winch support bar 26 to a position that contacts the tractor roll bar 14 to hold the winch support bar 26 in place, or a latch type member that pivots to a catch on the tractor roll bar 14, and so on.

Figure 3A:
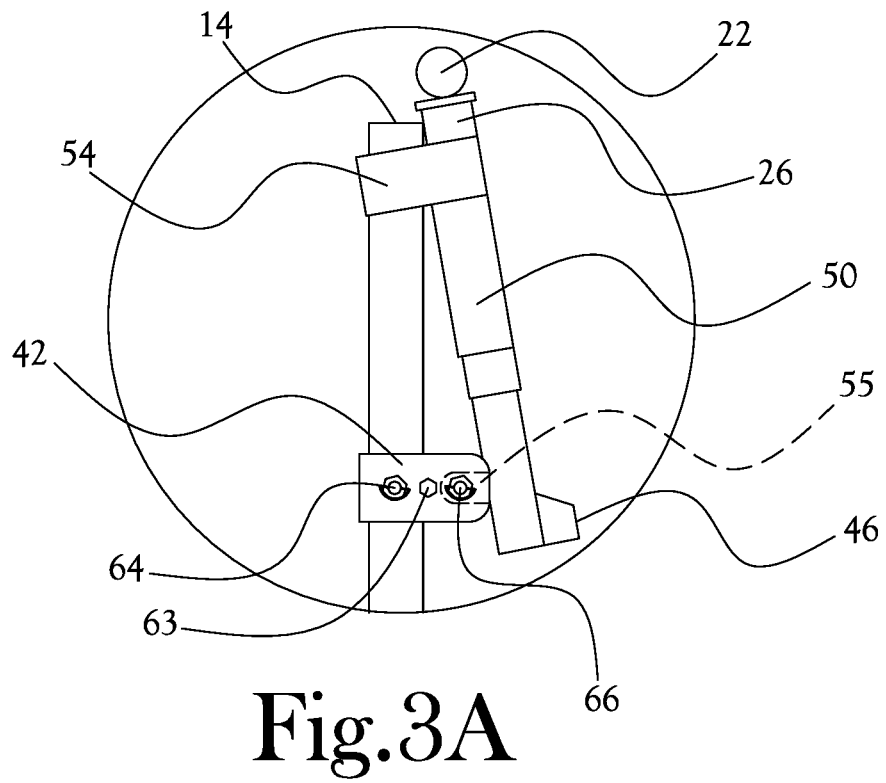
FIGS. 3A-B illustrate perspective views of a portion of the power winch equipment crane system of FIGS. 2A-B in the stowed position according to an example embodiment of the present general inventive concept.
Figure 3B:
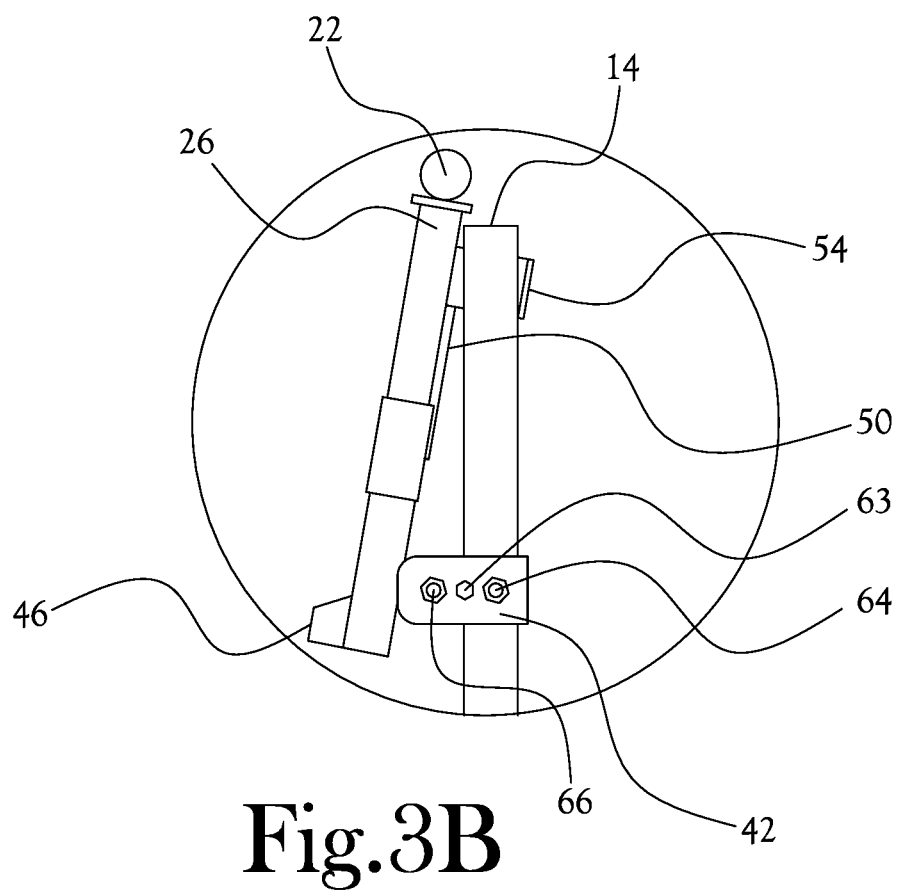
Figure 4B:
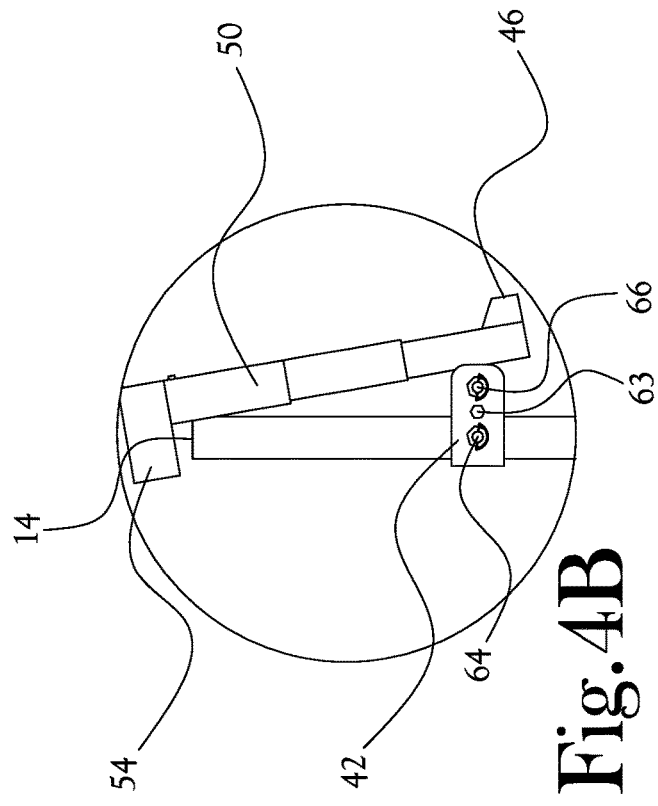
FIGS. 4A-D illustrate operations to position the power winch equipment crane system of FIGS. 3A-B according to an example embodiment of the present general inventive concept.
Figure 4D:
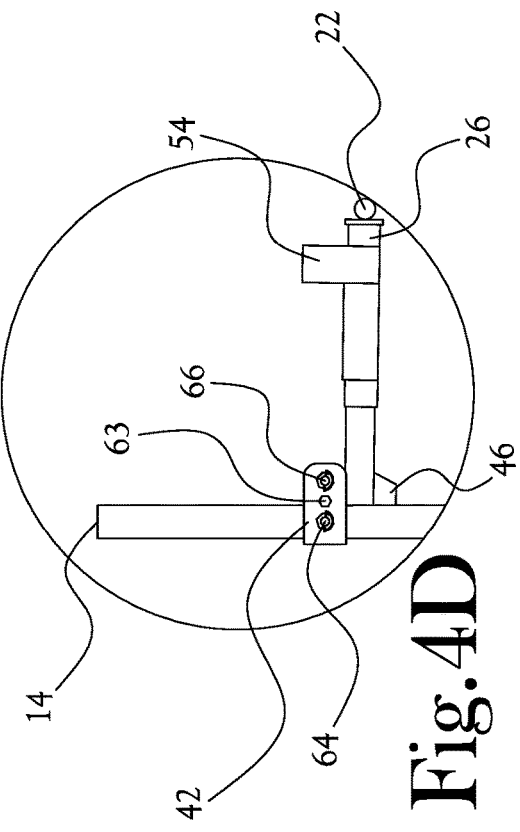
Figure 4A:
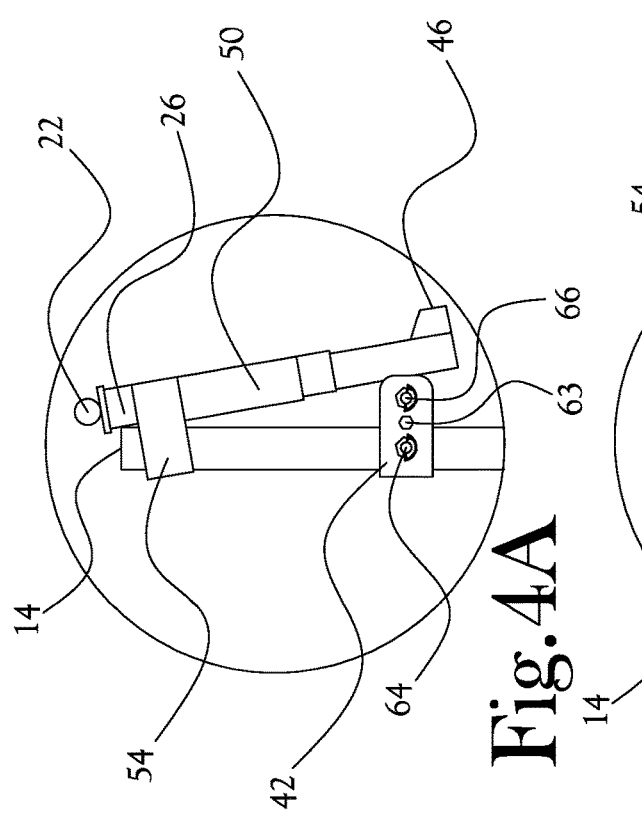
Figure 4C:
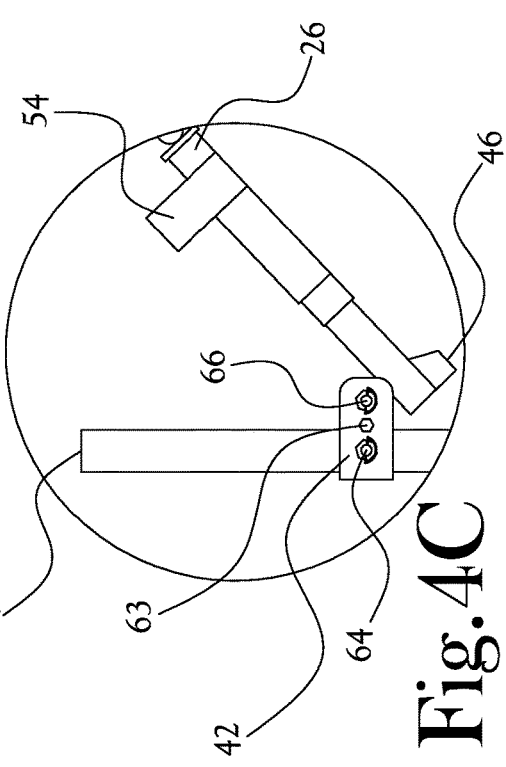

FIGS. 3A-B illustrate perspective views of a portion of the power winch equipment crane system 10 of FIGS. 2A-B in the stowed position according to an example embodiment of the present general inventive concept. As illustrated in this example embodiment, the securing member 50 is lowered along the side of the winch support bar 26 so that the hook portion 54 contacts the surface of the tractor roll bar 14 facing away from the winch support bar 26. In various example embodiments any further downward movement of the securing member 50 is limited by the contact between the hook portion 54 and the tractor roll bar, so that there will be no unwanted movement of the winch support bar 26 when in the stowed position. As the power winch support system 10 makes it easy and convenient for a user to hook up large farm implements such as brush hogs to a tractor, the securing member 50 is also easily moved into and out of the securing position by a single user. FIGS. 4A-D illustrate operations to position the power winch equipment crane system 10 of FIGS. 3A-B according to an example embodiment of the present general inventive concept. As illustrated in FIG. 4A, the winch support bar 26 is in the stowed position, as it is not in use, with the hook portion 54 of the securing member 50 contacting the tractor roll bar 14. When a user wishes to deploy the winch support bar 26 to place the winch 22 in position for use, the user can simply push upward on any component of the securing member 50, moving the hook portion 54 upward until it no longer contacts the tractor roll bar 14, and also will clear the tractor roll bar 14 when the winch support bar 26 is rotated toward a use position. The sliding motion of the securing member 50 is limited in an upward motion by the angled bend in the winch support bar 26. FIG. 4B illustrates the securing member 50 pushed up so that the hook portion 54 clears the tractor roll bar 14. As illustrated in FIG. 4C, once the securing member 50 has been moved to clear the tractor roll bar 14, the user can simply rotate the winch support bar down into place for use. FIG. 4D illustrates the winch support bar 26 fully rotated down to the position in which the stop members 46 contact the tractor roll bar 14, at which position the winch 22 is positioned for use with an implement.

FIG. 5 illustrates a use of the power winch equipment crane system of FIGS. 2A-B. As illustrated in FIG. 5, the power winch support bar 26 has been lowered to the use position, which in this example embodiment is substantially horizontal, so that the power winch 22 is located rear of the tractor 18 and over a farm implement 68. In the example embodiment illustrated in FIG. 5, a hook at the end of the cable of the power winch 22 has simply been connected directly to a part of the implement 68, allowing the implement 68 to be lifted so as to be easily connected to, and disconnected from, the various linkages and drive members of the tractor 18. Because the front end of the implement 68 has been raised to where the connection points are in close proximity to each other, the user is able to conveniently maneuver the connecting points, without any heavy lifting of the implement, thus enabling a user to hook up the implement without help from other people. It is noted that while the cable of the power winch 22 has been directly hooked to the implement 68 in the example embodiment illustrated in FIG. 5, various other implements may be more easily used by hooking the winch to a plurality of points on the implement. As will be described herein, various example embodiments of the present general inventive concept may also employ a chain or similar tool that is connected to various points on the implement to raise the entirety of the implement. For example, a chain may be threaded through a plurality of structural points of the implement and hooked to the cable of the power winch 22. In other example embodiments one or more coupling hooks may be fixed to the implement itself, either simply by contact or by one or more fixing members, to provide a more secure connection for the chain which is then hooked to the winch cable.

Figure 6:
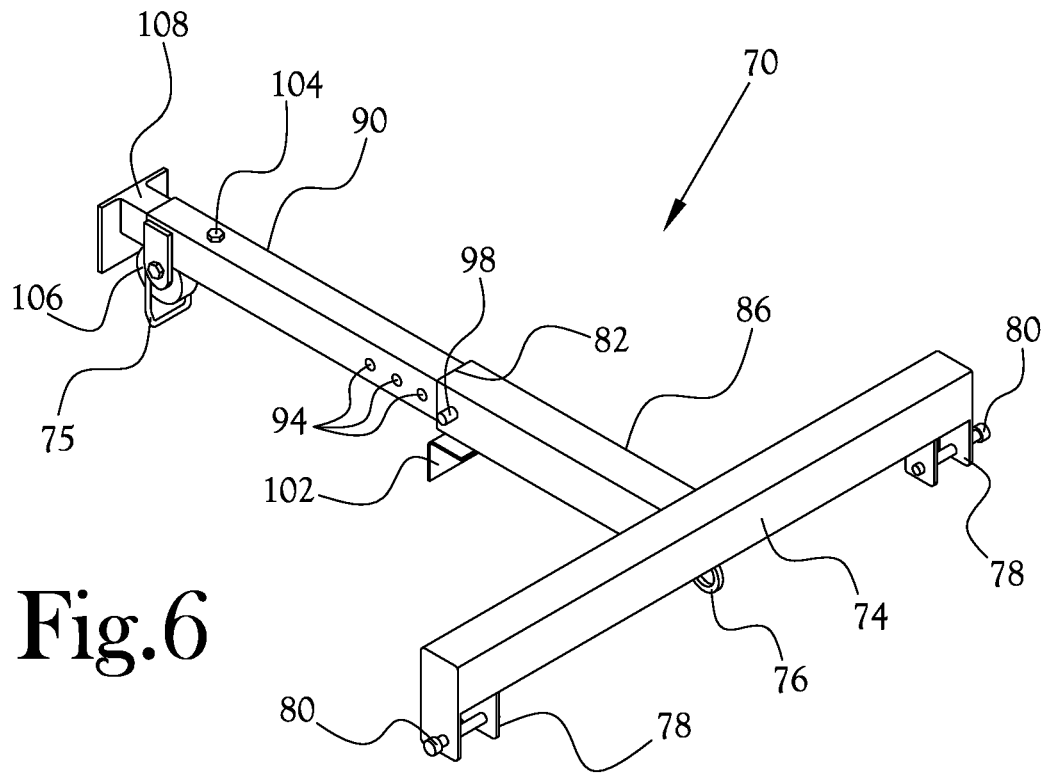
FIG. 6 illustrates a crane boom member to be used with a power winch equipment crane system according to another example embodiment of the present general inventive concept.
Figure 7:
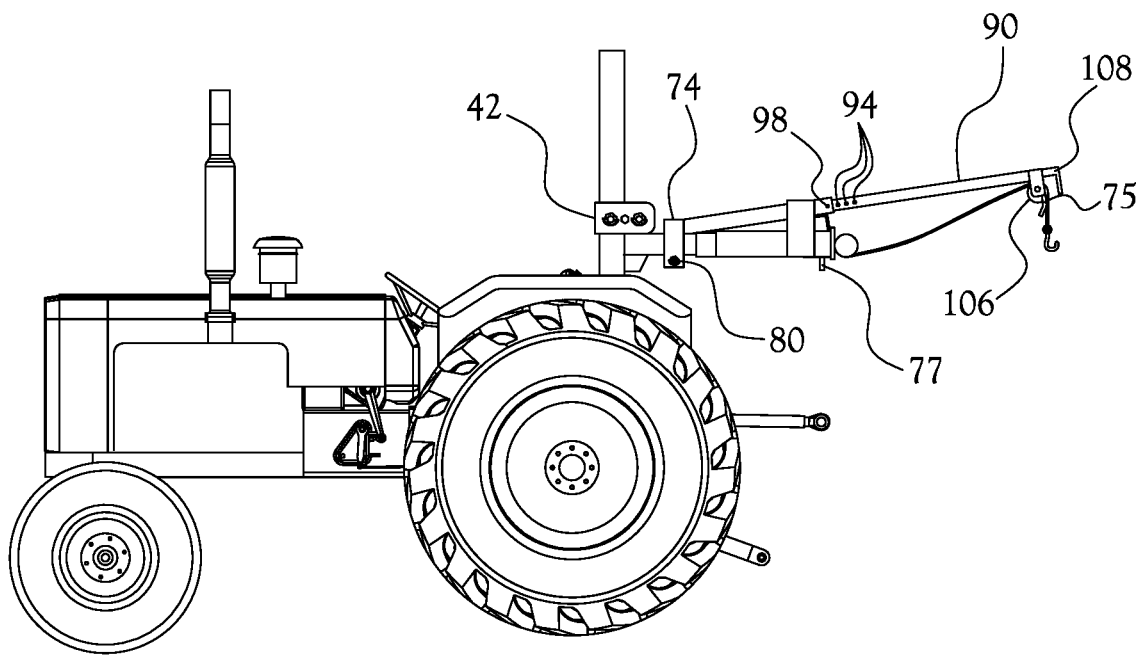
FIG. 7 illustrates the crane boom of FIG. 6 mounted on the power winch support system according to an example embodiment of the present general inventive concept.

With various implements that may be of a larger size and/or weight, there may be situations in which a user could more conveniently lift the implement from a suspension point that is further back from the tractor than the placement of the power winch 22 on the winch support bar 26. There may also be an added convenience when the suspension point is also at least slightly higher than the placement of the power winch 22. With such situations in mind, FIG. 6 illustrates a crane boom member to be used with a power winch equipment crane system according to another example embodiment of the present general inventive concept. As illustrated in FIG. 6, a crane boom 70 is provided to extend the suspension point of the system 10 further back from the tractor 18, and higher than the placement of the power winch 22, in the use position. A crane boom 70 according to an example embodiment of the present general inventive concept may include a crossmember mount 74 that is configured to span between the two side portions 30 of the winch support bar. Mounting brackets 78 are provided at each end of the crossmember mount 74 to attach the crane boom 70 to the side portions 30 of the winch support bar 26. As illustrated in FIG. 6, the mounting brackets 78 are configured to fit over the side portions 30 so that the crossmember mount 74 rests at each end on the winch support bar 26, and each mounting bracket 78 has receiving portions for pins 80 to secure the crossmember mount 74 to the winch support bar 26. One or more anchor points may be provided to the system to provide positions at which to hook the winch cable when in use with various attachments discussed herein. Such anchor points may be provided to the crane boom 70, the winch support bar 26, the winch 22 itself, and so on. For example, in FIG. 6 an anchor point 76 is provided proximate a mid-point of the crossmember mount 74 to provide a position at which to hook the winch cable when in use with various attachments discussed herein. A boom arm 82 extends from proximate a mid-point of the crossmember mount 74 in a direction away from the tractor roll bar 14. In this example embodiment, the boom arm 82 includes a boom arm base portion 86 that is attached directly to the crossmember mount 74, and a boom arm telescoping portion 90 that is configured to slide partially in and out of the boom arm base portion 86 to allow a user to select from different overall lengths of the boom arm 82. As illustrated in FIG. 6, the boom arm telescoping portion 90 is provided with a plurality of bolt receiving holes 94 along a length thereof which are configured to receive a bolt 98 that also passes through the distal end of the boom arm base portion 86. Proximate the distal end of the boom arm 82, and thus proximate the distal end of the boom arm telescoping portion 90, a pulley 106 is placed to support the cable from the power winch 22 when run therethrough. Another winch cable anchor point 75 is provided proximate the portion of the boom arm telescoping portion 90 supporting the pulley 106. A wire guide 108 may be provided at the distal end of the boom arm 82 to assure the winch wire stays in the pulley's track. The wire guide 108 may also be configured to move in a telescoping manner in and out of the distal end of the boom arm telescoping portion 90. With such a configuration, the wire guide 108 may be extended outward so as to allow the threading of the winch cable on the pulley 106, and then moved back into place to make sure the winch cable does not fall out of the pulley 106. A tightening bolt 104 may be provided on top of the boom telescoping portion 90 to assure that the wire guide 108 stays in place. The wire guide 108 also protects the pulley from the winch wire bending the pulley 106 when an off centered load is lifted. A riser portion 102 is provided proximate the distal end of the boom arm base portion 86, and is configured to contact the winch support bar 26 at an area near the power winch 22 so as to raise the boom arm 82 up and over the power winch 22 when attached to the winch support bar 26, so as not to interfere with the operation of the winch 22. FIG. 7 illustrates the crane boom 70 of FIG. 6 mounted on the power winch support system 10 according to an example embodiment of the present general inventive concept. As illustrated in FIG. 7, when the winch support bar 26 is lowered into position for the power winch 22 to be used, the crane boom 70 can be attached to the system by simply attaching the crossmember mount 74 to the winch support bar 26 when needed. A user can lay the crossmember mount 74 across the side portions 30 of the winch support bar 26 and pass the pins 80, such as lynch pins, through the mounting brackets 78 to secure the crossmember mount 74 in place. For added convenience, the boom arm telescoping portion 90 can be detached from the boom arm base portion 86 during the attachment to the winch support bar 26, as the riser portion 102 gives a third support point for the crossmember mount 74 and boom arm base portion 86. Once the pins 80 have been secured in the mounting brackets 78, the boom arm telescoping portion 90 can then be placed in the boom arm base portion 86, and the desired length of the boom arm 82 adjusted with the bolt 98 and bolt receiving holes 94. The cable of the power winch 22 can then be threaded onto the pulley 106, and a support point for operating the winch 22 is extended further back and higher than the winch 22 itself. Thus, as an example, when an implement such as an auger is higher than the power winch 22 when positioned for use, the crane boom 70 allows the auger attachment to be lifted into its mounting position on the tractor 18. The crane boom 70 attachment is designed to fit without any welding to the winch support bar 26. This allows easy and convenient attaching the crane boom 70 when needed, and then removing it for storage. The winch roller guides may be mounted at an angle on the winch mounting plate. This allows the wire to be more horizontal along the boom when using the crane boom attachment. The easily attachable/detachable crane boom is able to provide a longer cable path to move implements to the tractor, provide additional height to lift an augur or other tall implements, and can be used with a regular pulley at the end to lift various types of objects. In various example embodiments the winch cable can be anchored on the anchoring point 75 provided by the pulley at the end of the crane boom 70, and another pulley hook can be attached at the bottom of the loop formed in the cable. FIG. 7 also illustrates another anchor point 77 provided on the middle portion 34 of the winch support bar 26, to provide another point at which the end of the winch cable may be attached.

Figure 8A:
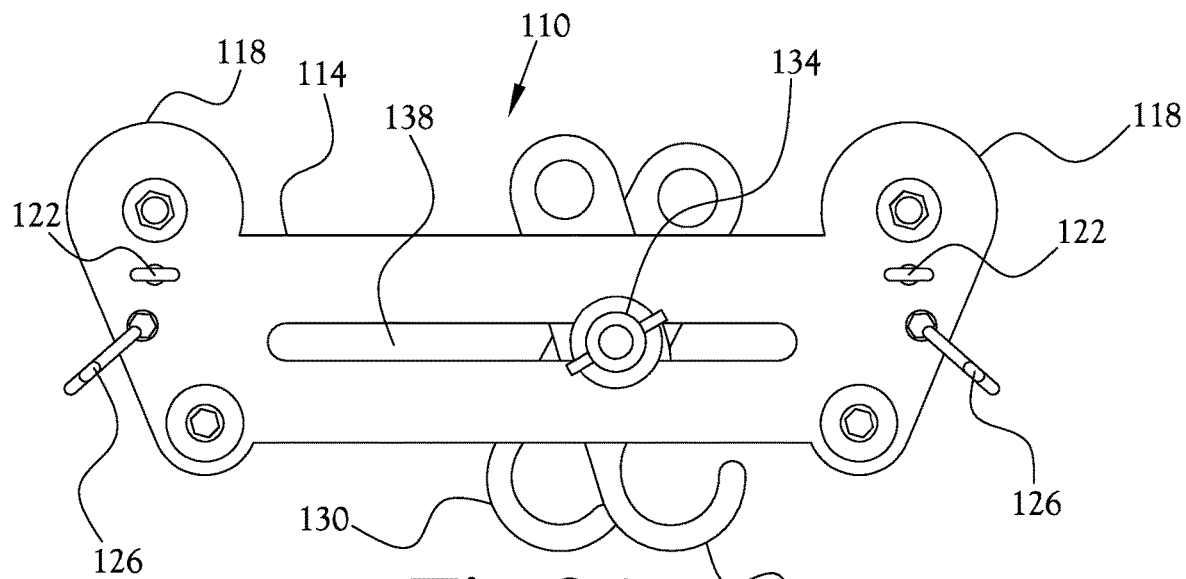
FIGS. 8A-C illustrate a sliding balance hook to be used with a power winch equipment crane system according to various example embodiments of the present general inventive concept.
Figure 8B:
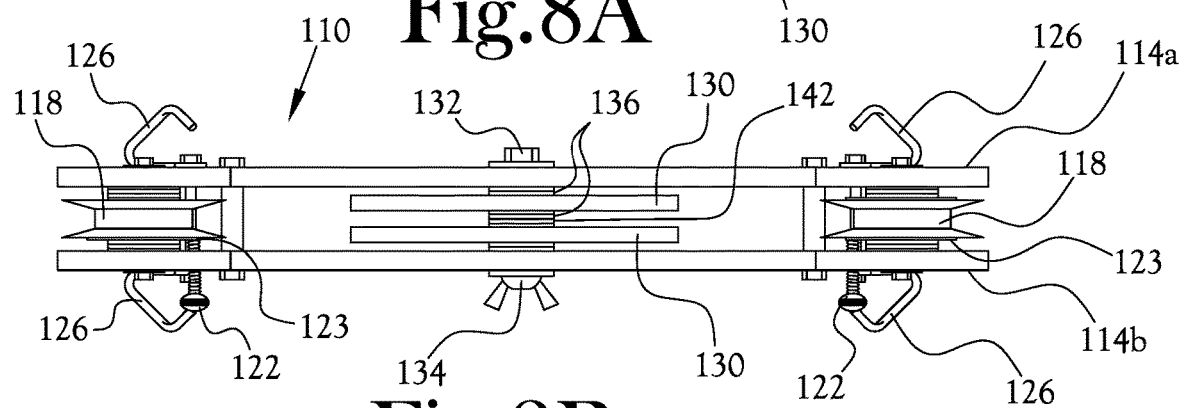
Figure 8C:
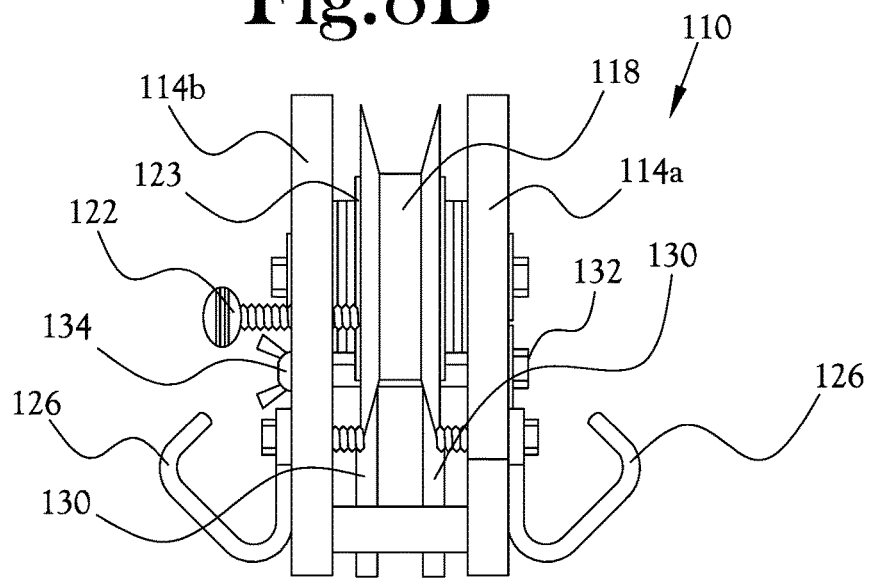

Various example embodiments of the power winch support system may include a variety of hooks and other attachments to be used with system 10. FIGS. 8A-C illustrate a sliding balance hook to be used with a power winch equipment crane system according to various example embodiments of the present general inventive concept. FIG. 8A illustrates a plan view of the sliding balance hook 110, FIG. 8B illustrates a top view of the sliding balance hook 110, and FIG. 8C illustrates an end view of the sliding balance hook 110. As illustrated in FIGS. 8A-C, the sliding balance hook 110 may be used in conjunction with the crane boom 70 to provide a plurality of points of support for a suspended implement. The sliding balance hook 110 includes an elongate body formed by two plates 114*a*,114*b* having a gap therebetween, having balance hook pulleys 118 respectively provided proximate each end, and sandwiched between the two plates 114*a*,114*b*. When installed on the winch cable, the cable passes underneath the pulleys 118. Each of the balance hook pulleys 118 may be provided with a tightening screw 122 configured to stop rotation of the respective balance hook pulleys 118 when tightened to a certain point by interacting with the balance hook pulleys 118, e.g., by the end of the tightening screw 122 contacting a portion of the balance hook pulleys 118 or a member attached to the balance hook pulleys. In this example embodiment a one inch washer is welded to each of the pulleys 118 as a brake disc 123, and the tightening screws 122 can be adjusted to contact the brake discs 123 with enough force to prohibit the pulleys 118 from rolling, thereby stabilizing the implement during installation and/or removal. One or more support hooks 126 are provided proximate each end of the sliding balance hook 110, and are configured to support chain links or other such suspension bodies used to support an implement. In this example embodiment, four support hooks 126 are provided, with one of the support hooks 126 respectively located on each side of each end of the sliding balance hook 110. One or more sliding support hooks 130 may be provided between the plates 114*a*,114*b*, and may be centered on a common pin 132 extending through a groove 138 in the plates so as to be slidable along a length of the groove 138. The sliding support hooks 130 may be spaced apart from one another and from the plates 114*a*,114*b* by washers 136 also centered on the pin 132. The sliding support hooks 130 may be selectively positioned along the groove 138 by loosening a tension nut 134 or other such tightening member that provides tension on the sliding support hooks 130 and washers 136 between the plates 114*a*,114*b*, sliding the sliding support hooks 130 to the desired position, and then tightening the tension nut 134 to prevent further movement of the sliding support hooks. The rotational position of the sliding support hooks can also be adjusted as desired before tightening the tension nut 134. Thus, when used with the crane boom 70, the winch cable can be threaded back through the balance hook pulleys 118, with the hook of the winch attached to the anchor point 76 provided on the crane boom 70, or to another point on the system 10, such as the power winch guide rollers, and the sliding balance hook 110 may then be positioned at various points along the cable to aid in the connecting of the implement. Since the winch cable is suspended from the pulley 106 of the crane boom 70 to the anchor point 76 on the crossmember mount 74 of the crane boom 70, the winch cable can be threaded though the balance hook pulleys 118 so that the sliding balance hook 110 can be positioned as desired along that span of cable. When in the desired position, the tightening screws 122 can be tightened to keep the sliding balance hook 110 in place, and the variety of support hooks 126 and sliding support hooks 130 may be used to support chains at different points to support an implement in a more balanced arrangement.

The chains can be hooked to a variety of attachment hooks attached to the implement itself, either bolted on or otherwise temporarily adhered. Example attachment hooks may include a backhoe lifting attachment, a rotor tiller lifting hook, an auger lifting clamp, a brush hog lifting clamp, and so on.

The sliding balance hook 110 serves as the lifting point of the power winch equipment crane system when installed on the winch cable. The sliding balance hook 110 moves along the winch cable to raise the position of any implement being installed to the three point hitch. It provides the stabilization in both the height off of the ground and the horizontal movement needed to align the implement perpendicular to the tractor. The sliding balance hook 110 provides the ability to balance a load's weight along the balance hook 110 connection and stabilize any load it lifts as desired. The selection of which hook an installer uses is up to the person using the crane. The four support hooks 126 provide connection points for chains used with the system to lift implements. The chains are connected to the implement or load being lifted by the system. There are two brakes (one on each pulley), referred to as the tightening screws 122 above, to keep the load being lifted in a stationary position. The balance hook 110 uses the power winch's cable that is anchored to one of the anchoring points 75,76,77 provided at various points of the system. In some example embodiments there is also one or two anchoring points located on the winch roller guides. As the cable is lengthened or tightened it raises or lowers the balance hook 110. The winch cable is routed through the center of the balance hook 110, engaging the bottom of the two pulleys 118. The cable route is between the two sliding support hooks 130 in the center of the device. This route allows the free movement of the two sliding support hooks 130 along the horizontal slots 138. The thumb screw 134 is tightened in the slot 138 when the load is balanced. This action secures the load distribution along the cable when lifting an unbalanced load.

Figure 9:
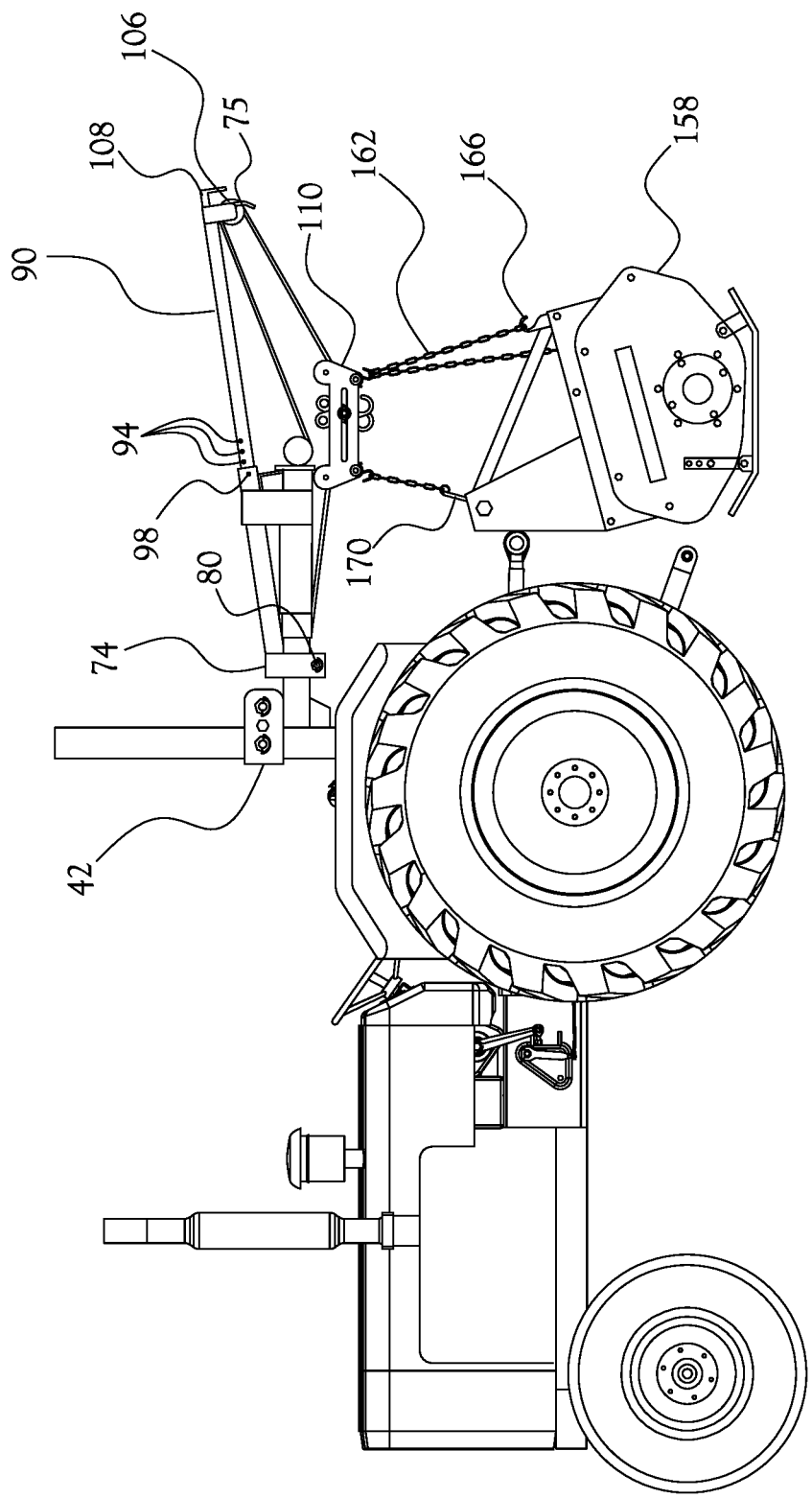
FIG. 9 illustrates a power winch system used with coupling hooks attached to an implement according to an example embodiment of the present general inventive concept.

FIG. 9 illustrates a power winch system used with coupling hooks attached to an implement according to an example embodiment of the present general inventive concept. As illustrated in FIG. 9, the winch support bar 26 has been lowered to place the power winch 22 in place for use, and the crane boom 70 has been attached to the winch support bar 26. The winch cable has been threaded from the power winch 22 through the pulley 106 of the crane boom 70, through the balance hook pulleys 118 of the sliding balance hook 110, and hooked into the anchor point 76 of the crane boom 70. The sliding balance hook 110 has been positioned at a point along a length of the winch cable that is substantially centered over a rotor tiller 158. Loops of a chain 162 have been attached to balance hooks 166 that are bolted to the rotor tiller 158, as well as to a rotor tiller lifting hook 170 attached proximate a front end of the rotor tiller 158, and to the support hooks 126 of the sliding balance hook 110. When the power winch 22 is turned on to draw the cable in, the rotor tiller 158 is lifted into a desired position. In various arrangements the tightening screws 122 of the sliding balance hook 110 may be loosened to allow the sliding balance hook to maintain the position above the rotor tiller 158 as the cable is drawn through the balance hook pulleys 118.

In various example embodiments of the present general inventive concept, the winch support system described herein may be formed integrally with the roll bar rather than retro-fitted onto an existing roll bar. The winch support system can also be conveniently detached from the roll bar when desired. In other various example embodiments, the winch support may be formed to act as the roll bar when in the vertical position, with the upper portion of the "roll bar" able to be rotated back to the horizontal position with the power winch installed thereon. In other various example embodiments, the power winch may be attached to the roll bar, and the pivotable support bar may include an alignment portion to support and align the cable coming from the power winch so that the cable extends down vertically over the implement from the alignment portion of the support bar, given a roll bar with the structural capability to support such an arrangement.

Figure 10:
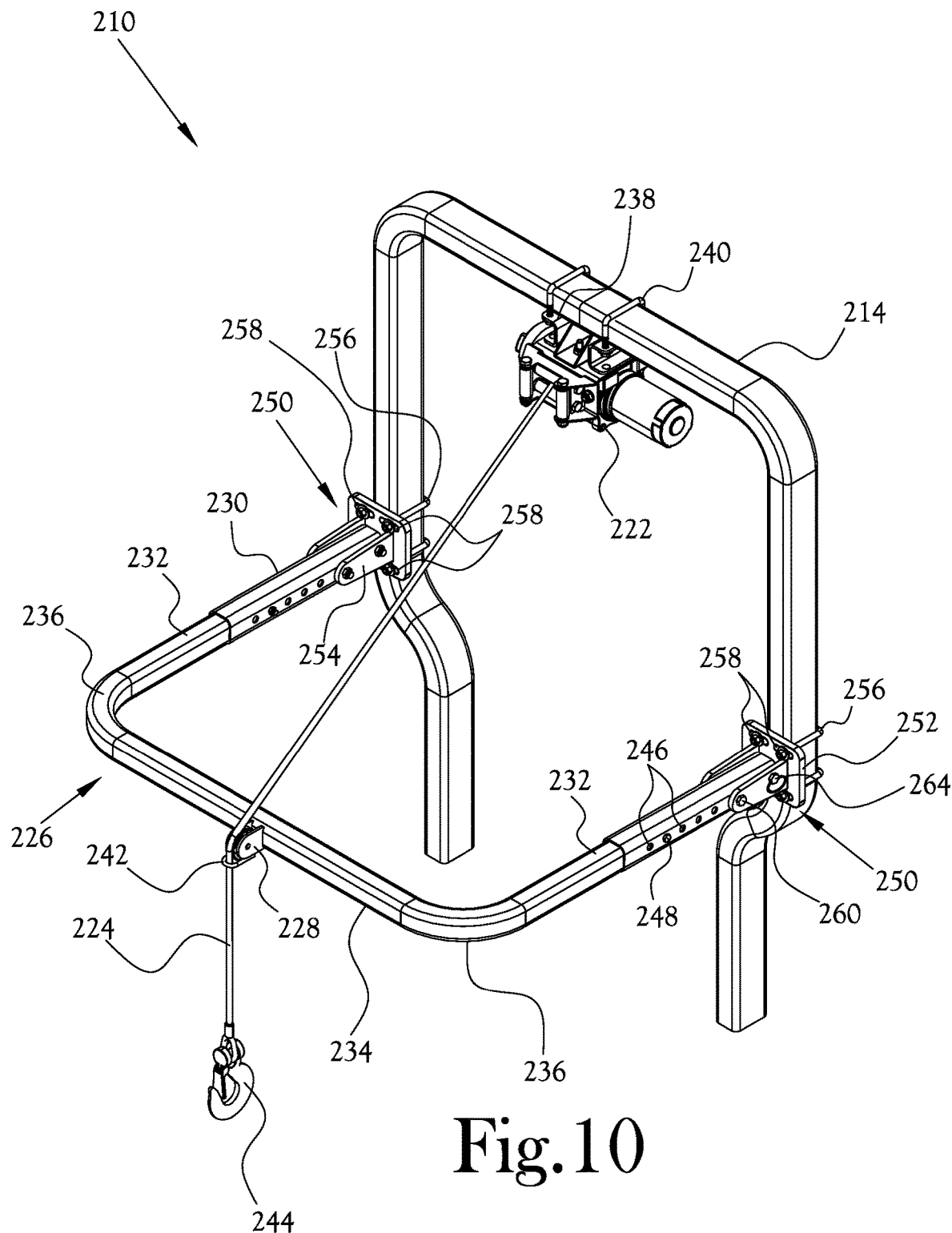
FIG. 10 illustrates a power hoist equipment crane system, or power hoist system, according to another example embodiment of the present general inventive concept.

As previously stated, in various example embodiments of the present general inventive concept the power winch may be attached to the roll bar, rather than the generally or substantially U-shaped pivotable support bar. In such an example embodiment the pivotable support bar may be provided with a pulley or other such support device for the cable extending from the winch so as to again place the cable drop, or the supported point at which the cable will hang directly downward over the area behind the tractor, more directly over the implement to be attached to the tractor. In some example embodiments such a configuration may relieve lever pressure on the ROPS of the tractor, transferring at least a portion of the lifting force onto the roll bar on which the winch is mounted. While the term "winch" is used generally in many of the example embodiments described herein, it is understood that a hoist may be used without departing from the scope of the present general inventive concept, and as such several of the example embodiments herein refer to a hoist rather than a winch. Similarly, the term "cable" or "winch cable" may be used generally in many of the descriptions herein, but other types of wire rope, rope, and so on may be used without departing from the scope of the present general inventive concept. FIG. 10 illustrates a power hoist equipment crane system 210, or power hoist system, according to another example embodiment of the present general inventive concept, in which a hoist 222 is attached or mounted to a tractor roll bar 214, and a pivotable support bar 226 is coupled to the tractor roll bar 214 so as to be pivotable from a vertical or stowed position to a lowered or substantially horizontal orientation for use in the attaching and/or detaching of an implement to be connected to the tractor. Similar to the example embodiment illustrated in FIGS. 2A-B, the pivotable support bar 226 may be configured in a shape substantially similar to that of the tractor roll bar 214, so as to at least somewhat blend in with the tractor roll bar 214 in an aesthetic sense, and to be able to be moved out of the way of other operations, when not in use. In various example embodiments the hoist 222 may be mounted on a mounting plate 238 that is attached to the tractor roll bar 214 for a convenient mounting assembly. Such a mounting plate 238 may be attached directly to the roll bar 214 through welding, fixing member, or the like, or may be coupled to the roll bar 214 by one or more brackets 240. In various example embodiments the hoist 222 may be attached to the roll bar 214 with only the brackets 240, without such a mounting plate. In various example embodiments the hoist 222 and/or mounting plate 238 may be configured to be readily detachable from the tractor roll bar, so that the hoist 222 can be selectively attached and detached in a convenient manner with the rest of the system 210. Also, while the support bar 226 of the power hoist system 210 illustrated in FIG. 10 is not illustrated in the substantially vertical or stowed position, it is understood that the support bar 226 may be pivoted, and secured in the stowed position, in a similar manner as that shown with the hoist support bar 26 of FIGS. 2A-B, though it may be secured in the stowed position in a number of different ways as described herein. The support bar 226 includes two side end portions 230 extending to the respective ends of the overall support bar 226, and a middle portion 234, or summit portion, between the two side end portions 230. In various example embodiments the middle portion 234 includes a span that is itself substantially U-shaped, with two corner portions 236 and two distal ends 232 that respectively extend generally from proximate the corner portions 236 to interact with the two side end portions 230. As illustrated in FIG. 10, the corner portions 236 may be substantially rounded so as to resemble the corresponding portions of the roll bar 214 when in the stowed position, or may have more angular corners in various example embodiments as described herein. A pulley 228 or other such cable support member is provided proximate a mid-point of the middle portion 234 of the support bar 226, and is configured to support a cable 224 being pulled or unspooled by the hoist 222 attached to the tractor roll bar 214. In the example embodiment illustrated in FIG. 10, the pulley 228 is configured such that it extends generally upward from the support bar 226 when the support bar 226 is in the stowed position, and back away from the tractor roll bar 214 when the support bar 226 is in the horizontal position, so as to provide clearance between the supported cable 224 and the support bar 226 when in use. The pulley 228 may be configured with a cable guide 242 to keep the cable 224 in proper contact with the pulley 228. In various example embodiments the pulley may be more integrated with the middle portion 234 of the pivotable support bar 226, so that the axis of rotation of the pulley is closer to, or substantially the same as, the longitudinal axis of the part of the middle portion 234 between the corners 236. In still other example embodiments a non-rotational guide may be provided to guide the cable over the pivotable support bar 226, and may be attached to or integrated with the middle portion 234 of the support bar 226. Thus, as illustrated in FIG. 10, when a user wishes to use the power hoist 222 to aid in the attaching and/or detaching of an implement to be connected to the tractor, the pivotable support bar 226 is rotated back and down into a substantially horizontal orientation, placing the pulley 228 at a position rear of the tractor and the various connection points of the tractor, so that a hoist cable 224 having a cable hook 244 or other such attachment member, and emanating from the hoist 222, can be lowered to a point over the implement to raise a connection point of the implement to a position that makes it easier for a single user to perform the various maneuvers and connections to attach the implement to the tractor. After the operations are performed, the user can detach the hoist cable 224 from the implement and raise the pivotable support bar 226 back to the raised, or stowed, position. The hoist 222 can be controlled to wind the cable 224, or rope, or the like, up onto the hoist 222 before the pivotable support bar 226 is raised to the vertical position, if the user so chooses. In various example embodiments the support bar 226 may be raised to the stowed position by winding the cable 224 onto the hoist 222, due to the interaction between the cable hook 244 and the cable guide 242 of the pulley 228. In such an embodiment, since the cable hook 244 is too large to pass through the cable guide 242, the combination of the winding action of the hoist 222 and the contact between the cable hook 244 and the cable guide 242 will cause the support bar 226, when not anchored in position by various anchoring connections described herein, to raise to the stowed position. Similar to FIGS. 2A-B, and therefore not illustrated in FIG. 10, a power supply line may be run along the side of the tractor roll bar 214 to supply power from the battery of the tractor to the power hoist 222. The power supply line may be adhered to various portions of the tractor roll bar 214 by tie-downs to avoid interfering with the movement of the pivotable support bar 226.

As with the system of the example embodiment illustrated in FIGS. 2A-2B, and which is illustrated in various other drawings herein, the pivotable support bar 226 may be attached to ROPS hinge brackets 42 that are already provided to the tractor roll bar 214 to enable the pivoting movement of the pivotable support bar 226. However, in various example embodiments, such as the embodiment illustrated in FIG. 10, the hoist system 210 may be configured to be attached to the roll bar 214 with various types of bracket assemblies that do not interact with the ROPS hinge brackets, and/or may be attached to roll bars without ROPS hinge brackets. The roll bar 214 is illustrated without any such ROPS hinge brackets for the sake of clarity in illustrating bracket assemblies 250 used in this example embodiment to attach the hoist system 210 to the tractor roll bar 214. As illustrated in FIG. 10, each of the bracket assemblies 250 configured to couple the pivotable support bar 226 to the roll bar 214 include a bracket base member 252, which may be configured as a plate, with two bracket arms 254 extending from the bracket base member 252 in a substantially parallel arrangement to be connected to opposing sides of the respective side end portions 230 of the pivotable support bar 226. In various example embodiments of the present general inventive concept the coupling of the bracket assemblies 250 to the side end portions 230 provides the pivotable connection that allows the pivoting action of the pivotable support bar 226. A pair of U-bolts 256 are provided and arranged so as to wrap around a portion of the roll bar 214 such that the distal ends of the U-bolts 256 pass through bolt receiving holes 258 formed in the bracket base member 252. Thus, by tightening a nut on the threaded distal ends of the U-bolts 256 that have been received through the bolt holes 258, the bracket base member 252 can be secured to the roll bar 214. The bolt receiving holes 258 may be formed as elongated grooves that are configured to allow different lateral positioning of the bracket base member 252 to that the bracket assembly 250 can account for some difference in width between the pivotable support bar 226 and the roll bar 214 to which the support bar 226 is attached. The bracket arms 254 and the side end portions 230 are formed with corresponding through holes through which a set bolt or pin, referred to herein as a pivot pin 260, may pass to form the pivot point about which the pivotable support bar 226 can rotate. Thus, the pivotable support arm 226 can be removed by removing the side end portions' 230 connections to the bracket assemblies 250, or by removing the bracket assemblies from the tractor roll bar 214. In various example embodiments the pivotable support bar 226 may be held in place in the horizontal position by stop members interacting with the roll bar 214, such as the stop members 46 shown in FIGS. 2A-B. In the example embodiment illustrated in FIG. 10, the bracket arms 254 and the side end portions 230 are formed with corresponding through holes through which an set bolt or pin, referred to herein as an anchor pin 264, may pass to anchor the pivotable support bar 226 in place such that it cannot pivot about the pivot pin 260. The through holes for the anchor pin 264 may be formed so as to be substantially in line with the through holes for the pivot pin 260, or may be offset in a vertical direction to allow for a reversable assembly discussed herein in regard to another example embodiment. Thus, the pivotable support bar 226 is configured to be selectively pivotable by a user attaching or removing the anchor pins 264 when the pivot pin 260 is also installed in the bracket arms 254 and side end portions 230. The set bolts, pins, etc., used at various positions in the bracket arms 254 and side end portions 230 may be secured in place with hair-pin-cotters, and in various example embodiments the pivot pins 260 and/or anchor pins 264 may be a similar bolt and cotter arrangement, metric bolt, lynch pin, or other type of quick release pin to enable a user to be able to quickly and conveniently remove and/or pivot the pivotable support bar 226. Thus, again, various example embodiments of the present general inventive concept may be retro-fitted to existing tractor roll bars. The example embodiment power hoist system 210 illustrated in FIG. 10 may include many similar, or the same, components as the example embodiment illustrated in FIGS. 2A-2B, but which are omitted in FIG. 10 for the sake of clarity in presenting other differing features. For example, the example system 210 of FIG. 10 may include at least one securing member attached to the pivotable support bar 226 to lock the support bar 226 in place in the stowed position. The securing member may include a sleeve portion that wraps around at least part of one of the side end portions 230 of the support bar 226, and which may be configured to reciprocally slide along a length of the side end portion 230. In various example embodiments the securing member may also include a hook portion configured to hook around and contact the surface of the tractor roll bar 214 facing the front of the tractor to lock the support bar 226 in place. Various other example embodiments may provide a host of different securing members, such as, for example, a securing member having a contact or hook portion that may be selectively rotated about a position proximate the support bar 226 to a position that contacts the tractor roll bar 214 to hold the support bar 226 in place, or a latch type member that pivots to a catch on the tractor roll bar 214, and so on. However, the example embodiment illustrated in FIG. 10 includes no such securing members, as the previously described interaction with the cable hook 244 and the cable guide 242 of the pulley 228 can interact such that that hoist 222 can be operated to raise and lower the support bar 226, and also hold it in place in the vertical or stowed position.

In various example embodiments of the present general inventive concept, the middle portion 234 and the side end portions 230 of the pivotable support bar 226 may be of a single-piece construction, or may be assembled so as to be of a fixed length. In the example embodiment illustrated in FIG. 10, however, the pivotable support bar 226 is configured so as to be adjustable in length along a direction in which the side end portions 230 extend. With such a configuration, a user can adjust the overall length of the pivotable support bar 226 such that the pulley 228 is located farther back from, or closer to, the tractor when the support bar 226 is in the horizontal position. This may be desirable when attaching/detaching implements that have desired connection points that may be further back, or closer to, the back of the tractor than a typical implement. Various example embodiments may provide a support bar 226 in which the distal ends 232 of the middle portion 234 are slidably connected to the respective side end portions 230, so that the length may be adjusted by moving the distal ends 232 further along the side end portions 230 in a direction away from or toward the tractor in the horizontal position. As illustrated in FIG. 10, the middle portion 234 is configured such that the respective distal ends 232 of the middle portion 234 extend back approximately 90 degrees in the general U-shape of the overall support bar 226, such that the distal ends 232 are received in the side end portions 230 and are slidable therein in a telescoping arrangement to shorten and lengthen the overall length of the support bar 226. In each of the side end portions 230, plurality of bolt receiving holes 246 are formed and configured to receive a bolt 248 which passes through corresponding bolt receiving holes (not illustrated) proximate each respective distal end 232 of the middle portion 234 so as to secure the user's desired length of the support bar 226. Thus, a user can adjust the length of the pivotable support bar 226 by removing the position securing bolts 248 from each of the side end portions 230, moving the distal ends 232 of the middle portion 234 in the desired direction inside the side end portions 230 until the bolt receiving holes in the distal ends 232 correspond to the desired bolt receiving holes 246 formed in the side end portions 230, and placing the securing bolts 248 back into the corresponding holes 246 to secure the pivotable support bar 226 at that desired length. Various example embodiments may include a host of different configurations for extending and securing the length of the support bar without departing from the scope of the present general inventive concept. For example, the side end portions may be received within the distal ends of the middle portion of the pivotable support bar, and/or may be fixed in length in less discrete intervals, such as by a threaded pressure member instead of corresponding through holes in both members, and so on. Various example embodiments may include a securing member provided to one or both ends of the pivotable support bar that is similar to the securing member 50 of FIGS. 2A-2B, but which has one or more at least partially open sides so as to allow access to the bolt receiving holes 246 and bolt 248 or bolts. In various example embodiments the length of the support bar 226 that corresponds generally to the shape of the tractor roll bar 214 may be the shortest selectable length of the support bar 226, in order to provide a longer selectable reach in a direction rearward from the tractor for the placement of the pulley 228.

Figure 11A:
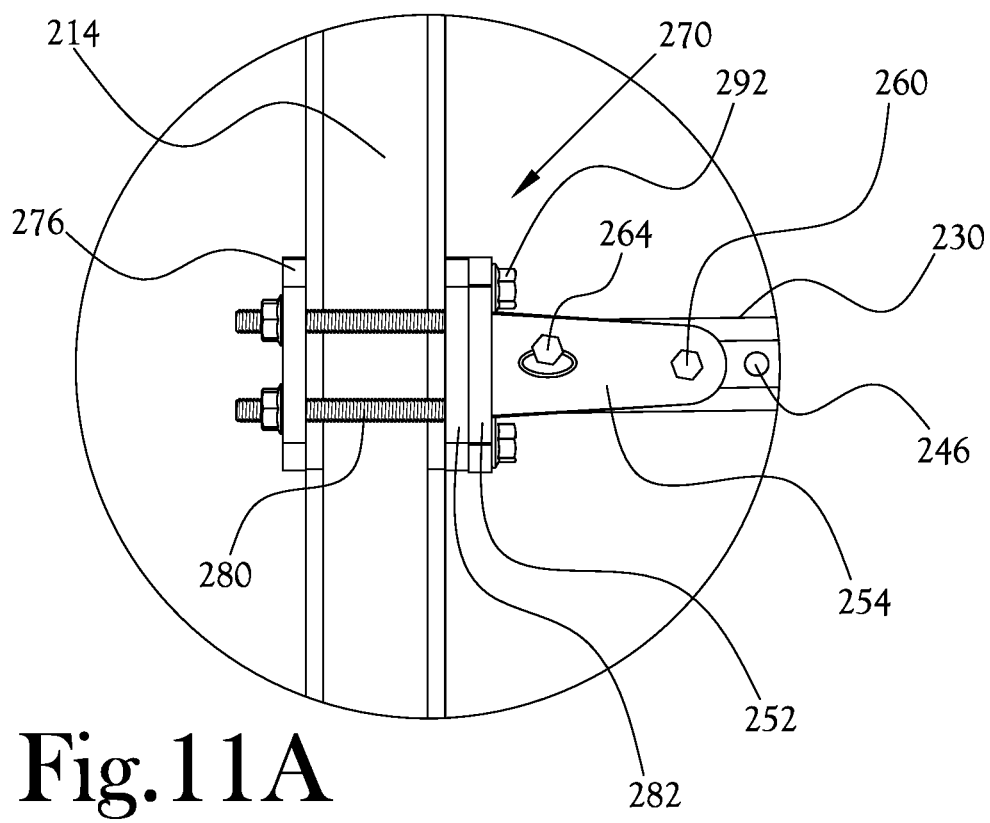
FIGS. 11A-D illustrate a hoist system bracket assembly according to another example embodiment of the present general inventive concept.
Figure 11B:
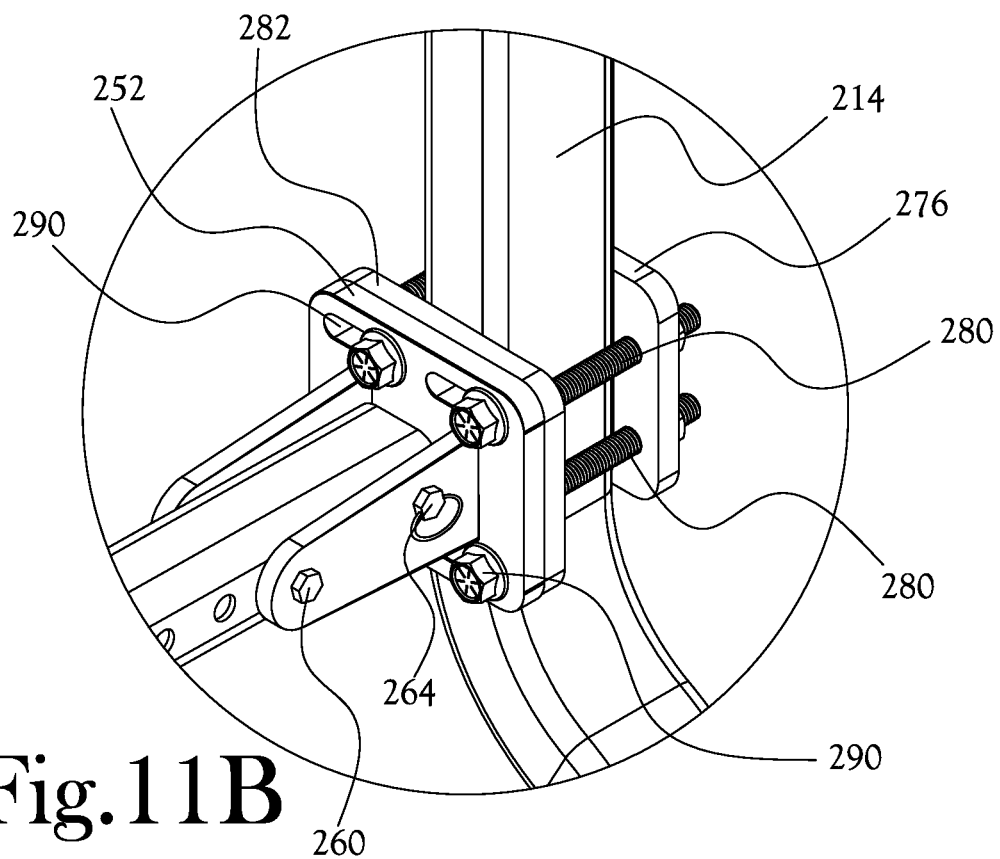
Figure 11C:
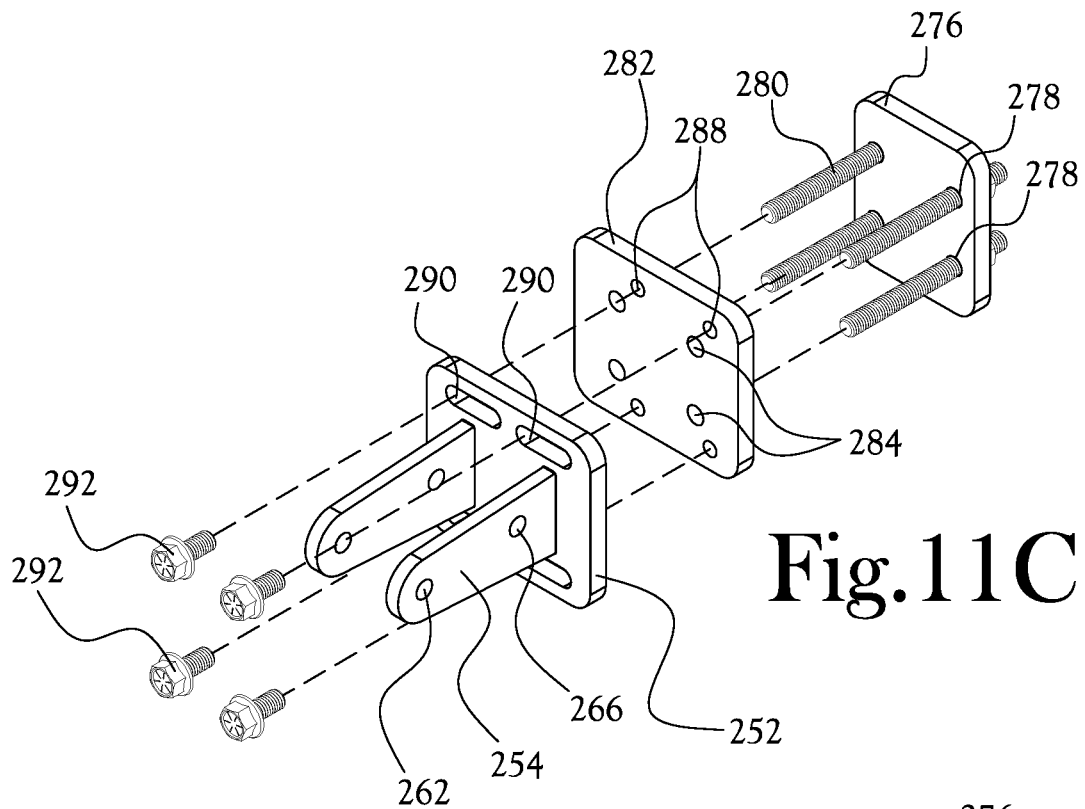
Figure 11D:
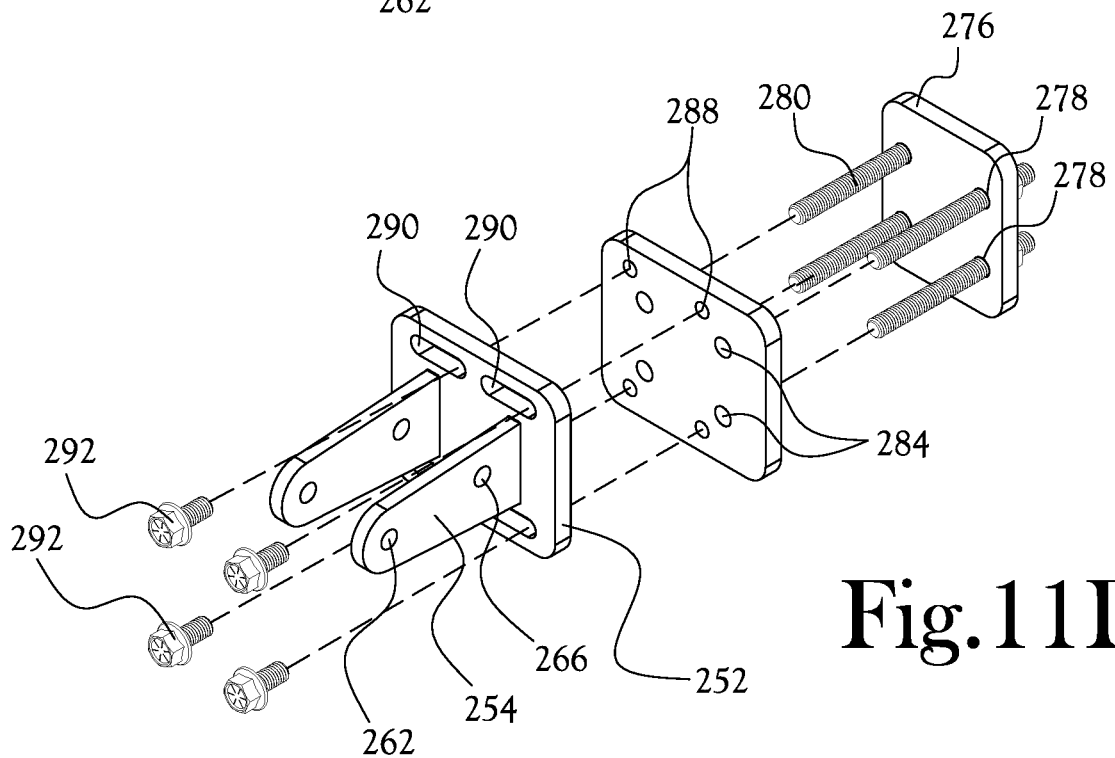

FIGS. 11A-D illustrate a hoist system bracket assembly according to another example embodiment of the present general inventive concept. FIG. 11A illustrates a side view of a bracket assembly 270, FIG. 11B illustrates a perspective view of the bracket assembly 270, and FIGS. 11C-D illustrate exploded views of the bracket assembly 270 in two different configurations. The bracket assembly 270 of FIGS. 11A-D may include the same bracket base member 252 and bracket arms 254 of the bracket assembly 250 illustrated in FIG. 10. However, instead of the U-bolt assembly illustrated in FIG. 10, the bracket assembly 270 includes a brace member 276 or plate configured to contact a surface of the roll bar 214 facing away from the bracket base member 252, and a support member 282 or plate configured to contact a surface of the roll bar 214 facing the bracket base member 252. The plate configuration shown in this example embodiment may be beneficial when the roll bar 214 is formed of substantially square/rectangular tubing. Thus, rather than the bracket base member 252 contacting the roll bar 214, as in the example embodiment illustrated in FIG. 10, the bracket base member 252 is mounted to the support member 282 that contacts the roll bar 214 in the bracket assembly 270 of FIGS. 11A-D. The brace member 276 is formed with a plurality of securing bolt holes 278 configured to receive a corresponding number of securing bolts 280 that extend from the support member 282 and through the brace member 276. The connection of the support member 282 and the brace member 276 through the securing bolts 280 adhere the bracket assembly 270 to the roll bar 214. In this example embodiment, the threaded securing bolts 280 are welded or otherwise adhered at one end to the face of the support member 282 facing the roll bar 214. In other various example embodiments, the securing bolts 280 may also pass through corresponding through holes formed in the support member 282, but may be configured in a countersunk arrangement on the surface of the support member facing away from the roll bar 214, so that the bracket base member 252 may contact the support member 282 with no substantial space therebetween due to heads of the threaded securing bolts 280. Although the securing bolts 280 are welded to the support member 282 in this example embodiment, such countersink locations 284 are illustrated in FIGS. 11C-D to indicate the general area where such countersinks may be located. The theoretical countersink locations 284 also show the general area on which the securing bolts 280 are welded to the support member 282 on the opposite face of the support member 282. In the example embodiment illustrated in FIGS. 11A-D, the bracket base member 252 is formed with a plurality of positioning bolt holes 290 that are formed as elongated grooves in this example embodiment, and are configured to receive a corresponding number of threaded positioning bolts 292 therethrough. These positioning bolts 292 are received in corresponding positioning bolt holes 288 formed on the surface of the support member 282 facing the bracket base member 252 to secure the bracket base member 252 to the support member 282, thus securing the bracket base member 252 to the roll bar 214. In various example embodiments the positioning bolt holes 288 formed in the support member 282 do not pass through to the surface of the support member 282 facing the roll bar 214, so that the positioning bolts 292 do not extend outward and interfere with the contact between the support member 282 and the roll bar 214. The configuration of various components of the bracket assembly 270 allows for a range of positioning of the bracket arms 254 relative to the respective portions of the roll bar 214 to which they are coupled. As previously described, the elongated bolt holes 290 allow a range of side-to-side positioning points for the bracket base member 252 relative to the support member 282 to which the bracket base member 252 is coupled by the positioning bolts 292. Even more side-to-side positioning is provided by the configuration of the positioning bolt holes 288 formed in the support member 282. As illustrated in FIGS. 11C-D, the bolt holes 288 formed in the support member 282 are formed in an asymmetric fashion, so that the overall configuration of the bolt holes 288 is shifted to one side or the other of the support member 282, depending on the orientation of the support member 282. Thus, when the support member 282 is oriented as shown in FIG. 11C, the positioning bolt holes 288 are "shifted" to one side of the support member 282, which will be referred to as the "right" side for purposes of this description, and when the support member 282 is rotated 180 degrees so as to be oriented as shown in FIG. 11D, the positioning bolt holes 288 are shifted to the other side, the "left" side, of the support member 282. Rotating the support member 282 between these two positions does not affect the positioning of the securing bolts 280, as they are arranged symmetrically about a center of the support member 282. As such, a user has a greater range of width with the bracket assemblies 270 relative to the roll bar 214, and is thus able to fit the width of the pivotable support bar 26 to a greater range of roll bar 214 widths. The support members 282 can be selectively oriented to the desired placement of the positioning bolt holes 288 relative to the roll bar 214, and then the bracket base member 252 can be further "fine-tuned" to a desired position due to the positioning bolt holes/grooves 290 being elongated and thus positionable along a range of side-to-side points relative to the positioning bolt holes 288 on the support member 282. Therefore, a maximum width of the bracket arms 254 relative to the roll bar 214 could be achieved with the "left" bracket assembly 270 having the support member 288 positioned as shown in FIG. 11D, and with the "right" bracket assembly 270 having the support member 288 positioned as shown in FIG. 11C, and with the respective bracket base members 252 positioned as far away from the center line of the tractor as possible due owing to the positions of the respective positioning bolts 292 in the corresponding positioning bolt holes 290 in the bracket base members 252. Reversing the arrangement would provide for the minimum width of the bracket arms 254 relative to the roll bar 214. As such, a single width of the pivotable support bar 226 may be fitted to a larger range of roll bar widths. As illustrated in FIGS. 11A-D, the positioning bolt holes 290 and the bracket arms 254 are formed substantially symmetrically on the bracket base member 252, which allows the bracket base member 252 to also be reversible to provide different assembly configurations, as illustrated in FIGS. 12A-D.

Figure 12A:
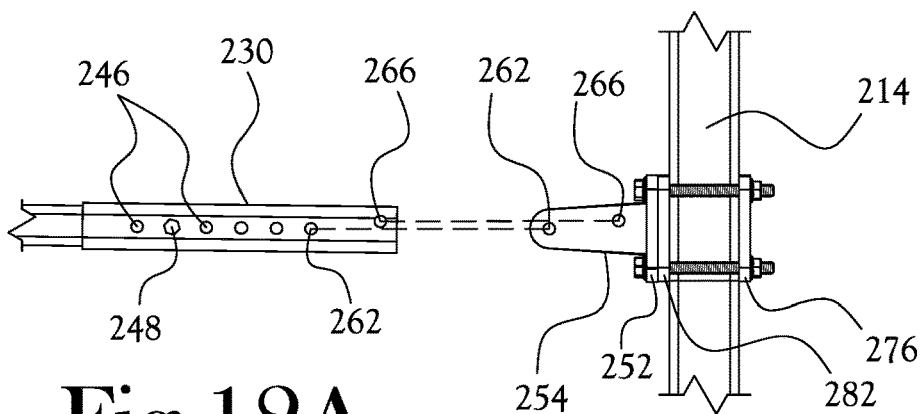
FIGS. 12A-D illustrate the bracket assembly of FIGS. 11A-D with two different orientations of the bracket base member.
Figure 12B:
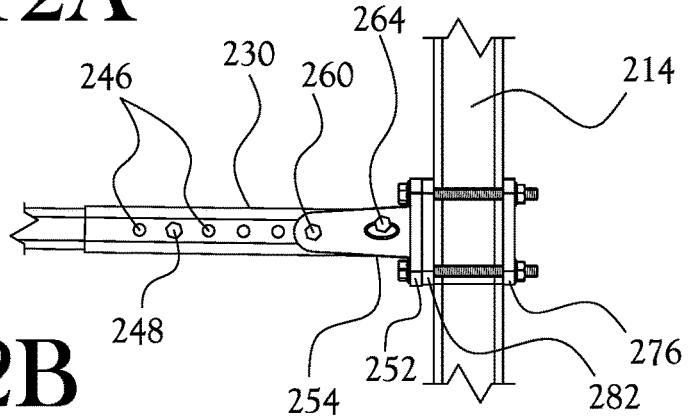
Figure 12C:
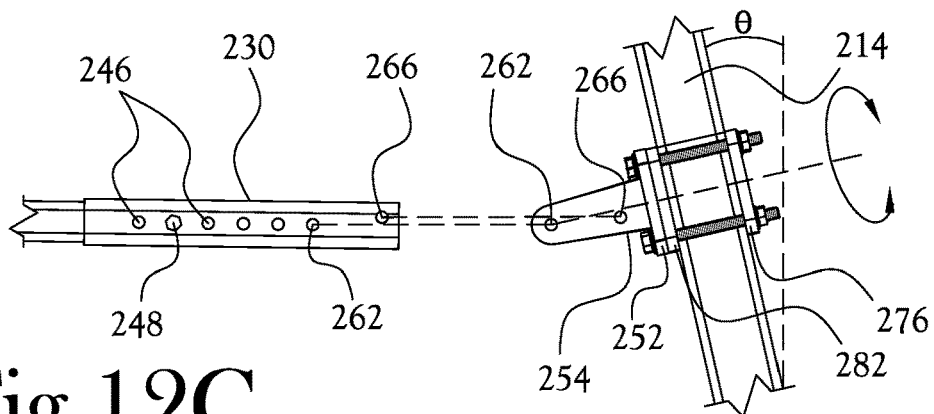
Figure 12D:
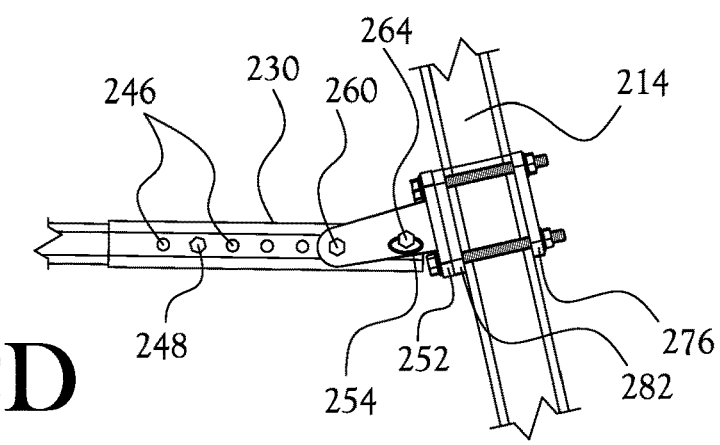

FIGS. 12A-D illustrate the bracket assembly 270 of FIGS. 11A-D with two different orientations of the bracket base member 252. FIGS. 12A-B illustrate the bracket base member 252 in a first selectable orientation, and FIGS. 12C-D illustrate the bracket base member 252 in a second selectable orientation, in which the bracket base member 252 has been rotated 180 degrees on an axis passing from a center of the bracket base member 252 through the bracket arms 254. In the example embodiments previously discussed, the roll bar 214 has been assumed to be installed in a substantially vertical orientation, as shown in FIGS. 12A-B. However, in some cases the roll bar 214 may not be substantially vertical, and may be angled forward or backward by some distance. For example, the roll bar 214 in FIGS. 12C-D may be angled toward the back of the tractor by approximately 10-15 degrees. The configuration of the pivot pin 260 through holes 262 and the anchor pin 264 through holes 266, along with the previously described symmetrical arrangement of the bracket arms 254 and the positioning bolt holes 290 on the bracket base member 252, allow the bracket base member 252 to be selectively oriented to help bring the pivotable support bar 226 closer to a horizontal use position with angled roll bars 214. As illustrated in FIG. 12A, the respectively corresponding pivot pin holes 262 and anchor pin holes 266 formed in the bracket arms 254 and the side end portions 230 have the same relative orientation when the bracket base member 252 is in this first selectable orientation, with the anchor pin holes 266 being formed at a higher point than the pivot pin holes 262 along a longitudinal axis of the side end portions 230 and the bracket arms 254. Thus, when the bracket assembly 270 is attached on a substantially vertical roll bar 214, and a pivot pin 260 is passed through the pivot pin holes 262 and an anchor pin 264 is passed through the anchor pin holes 266, the side end portion 230 is secured in a position that extends substantially horizontally, or substantially at a right angle to the tractor roll bar 214. This configuration is illustrated in FIG. 12B. As illustrated in FIG. 12C, when the roll bar 214 is tilted back at an angle θ, which in this example is approximately 30 degrees, the bracket base member 252 may be rotated 180 degrees during assembly such that the anchor pin holes 266 would be lower than the pivot pin holes 262 if the bracket arms 254 were horizontal, but due to the tilted arrangement of the roll bar 214 the anchor pin holes 266 are still slightly higher than the pivot pin holes 262. As illustrated in FIG. 12C, the location of the pivot pin holes 262 and the anchor pin holes 266 relative to a horizontal line passing between the two is substantially similar to the arrangement illustrated in FIG.

12A, in which the bracket base member 252 is attached to a vertical roll bar 214. As such, the side end portion 230 is able to be attached to the bracket arms 254 to secure the side end portion 230, and thus the pivotable support bar 226, in a substantially horizontal orientation when lowered for use. Thus, by offsetting the position of the anchor pin holes 266 from the pivot pin holes 262 in the bracket arms 254 relative to a longitudinal axis passing along the bracket arms 254, and by offsetting the position of the anchor pin holes 266 from the pivot pin holes 262 in the side end portion 230 relative to a longitudinal axis passing along the side end portion 230, a user is able to selectively orient the bracket base member 252 according to the angle of the roll bar 214 to better approximate a horizontal use position for the pivotable support bar 226. In various example embodiments the side portions 230 can also be rotated 180 degrees about their longitudinal axis if the configuration will help with different angles, or forward angles, and so on.

Figure 13:
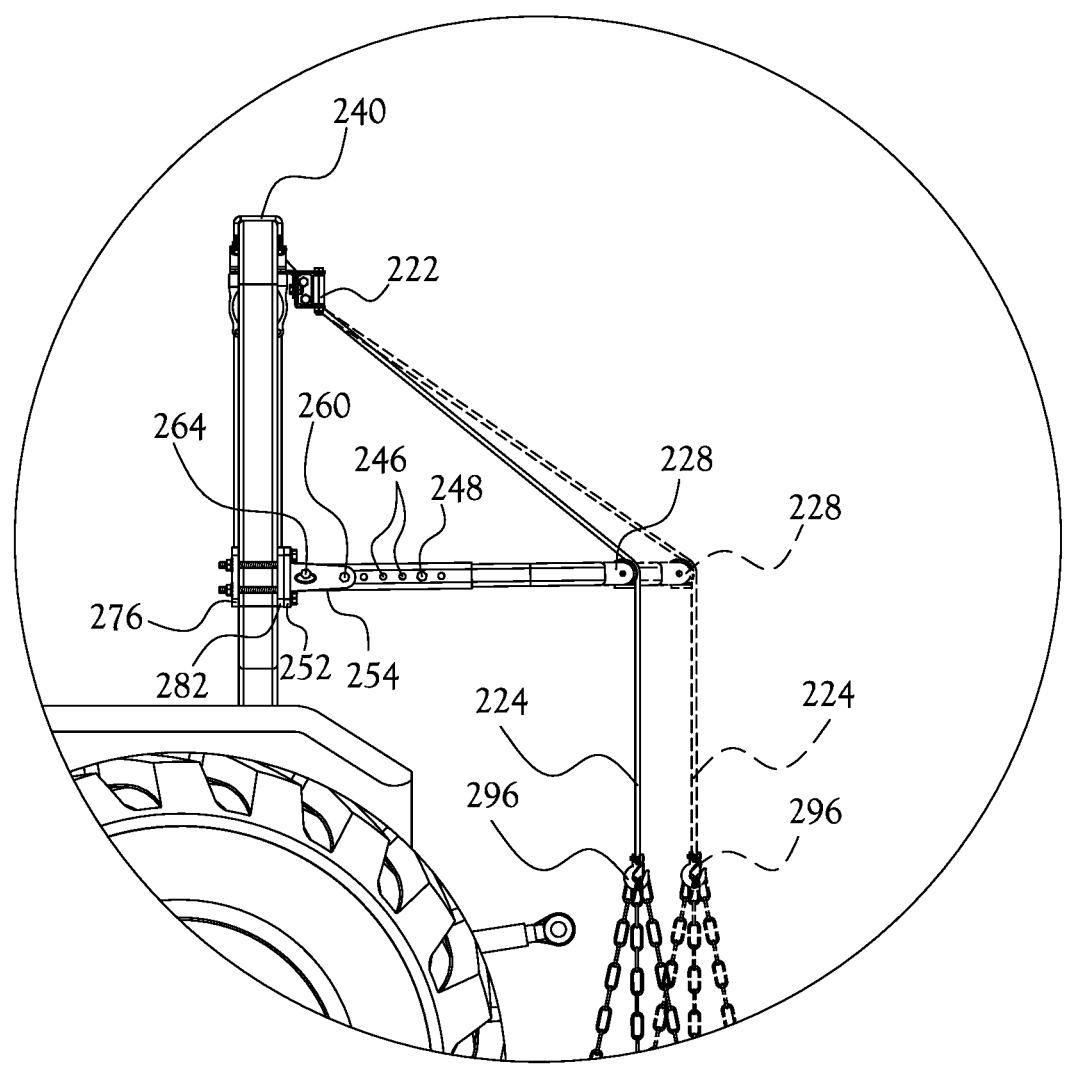
FIG. 13 illustrates a use of the power hoist equipment crane system of FIG. 10.

FIG. 13 illustrates a use of the power hoist equipment crane system 210 of FIG. 10, albeit with the bracket assembly 270 illustrated in FIGS. 11A-D. In FIG. 13 the pivotable support bar 226 of the system 210 has been rotated downward to the horizontal position for use with an implement. The pivotable support bar 226 is drawn with solid lines to illustrate a first position in which the overall length of the pivotable support bar may be a length that is desirable for the upright or stowed position to provide a desirable aesthetic arrangement with the tractor roll bar 214, and is drawn with broken lines to illustrated a second position in which the overall length of the support bar 226 has been extended to locate the pulley 228 farther back from the tractor. A 3-way chain arrangement 296 is shown suspended from the cable hook 244, which may be used to attach to various connections points and/or hooks on the implement that is to be supported by the hoist system 210. The length of the pivotable support bar 226 can be adjusted for placement over an implement to be attached to the tractor, but in some example embodiments can also be used to move an attached implement forward and back relative to the tractor. The overall length can be adjusted by removing the bolts 248 from the corresponding bolt receiving holes 246 provided in the side end portions 230 and middle portion distal ends 232, sliding the middle portion 234 relative to the side end portions 230 to the desired position, and then replacing the bolts 248 in the bolt receiving holes 246 to secure the pivotable support bar 226 at that length. Various example embodiments may provide a host of other position securing arrangements to set the selectable overall length of the pivotable support bar 226 without departing from the scope of the present general inventive concept.

Figure 14A:
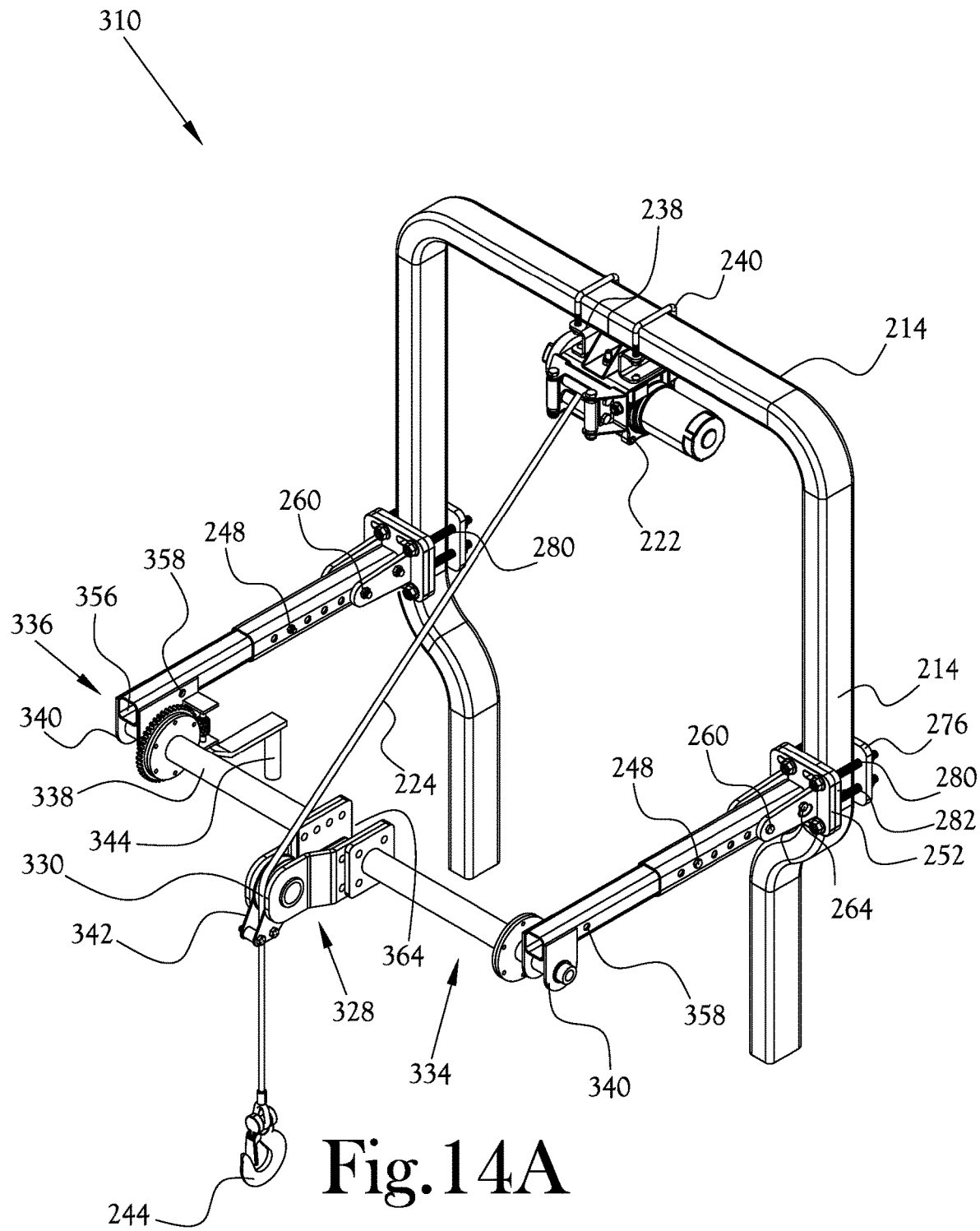
FIG. 14A illustrates a perspective view of a power hoist equipment crane system according to still another example embodiment of the present general inventive concept.
Figure 14B:
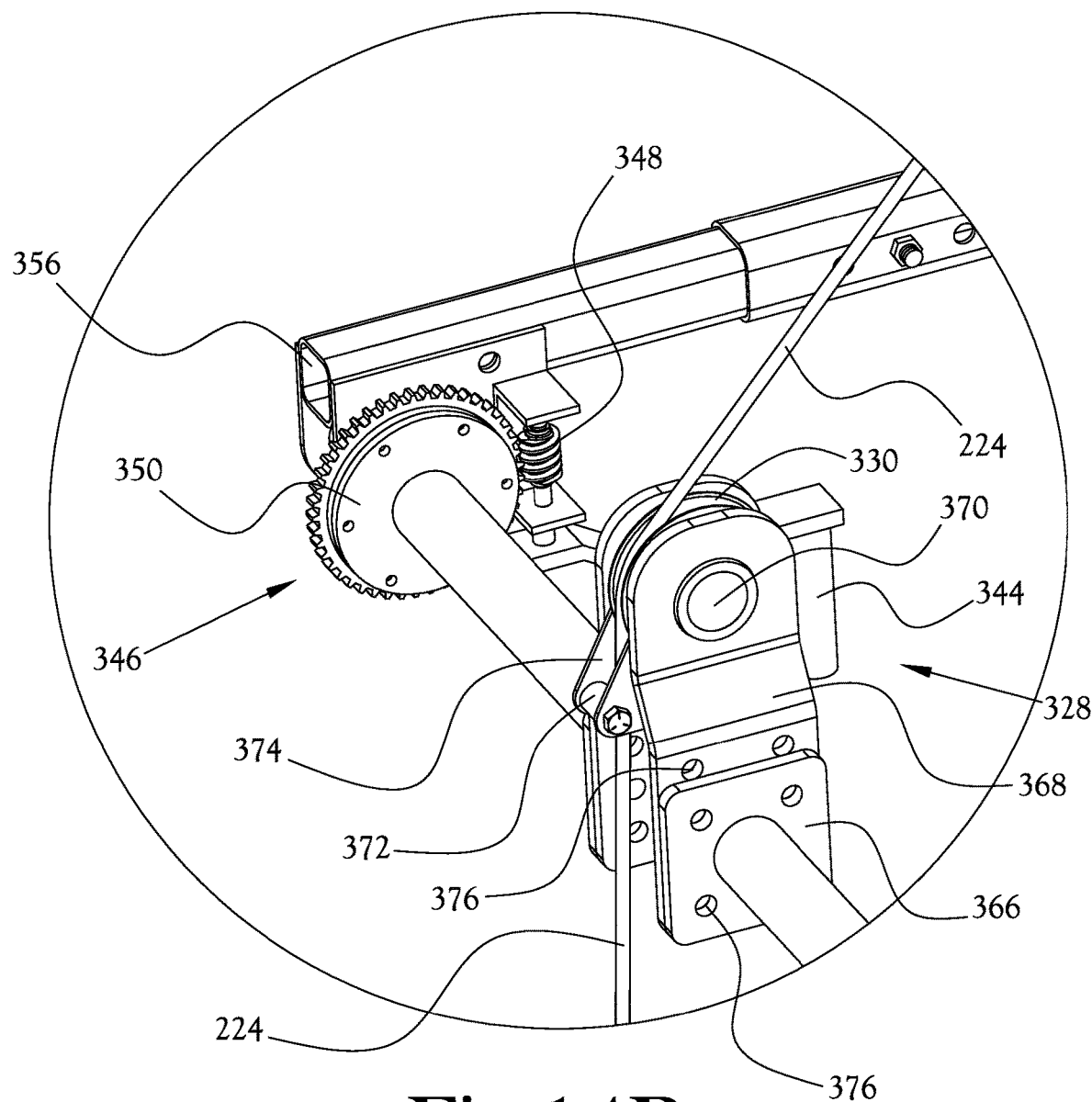
FIG. 14B illustrates a closer view of a portion of the system of FIG. 14A.

FIG. 14A illustrates a perspective view of a power hoist equipment crane system according to still another example embodiment of the present general inventive concept, and FIG. 14B illustrates a closer view of a portion of the system of FIG. 14A. As illustrated in FIG. 14A, a power hoist system 310 may include a pivotable support bar 326 having a middle portion 334 that is configured with a rotatable crossbar 338 extending between two corner portions 336 of the middle portion 334. A pulley assembly 328 is provided proximate a mid-point of the rotatable crossbar 338, and is configured such that a pulley 330 in the pulley assembly 328 is offset from a longitudinal axis of the rotatable crossbar 338. With such a configuration, by rotating the rotatable crossbar 338, the pulley 330 moves in an arcuate direction about the longitudinal axis of the rotatable crossbar 338 such that a distance between an axis of rotation of the pulley 330 and the longitudinal axis of the crossbar 338 is substantially constant as the rotatable crossbar 338 is rotated. Thus, by rotating the rotatable crossbar 338 while the pivotable support bar 326 is in the lowered position for use with an implement, the pulley 330 may be selectively moved back and forward, relative to the tractor, to provide the user more control over the placement of the pulley 330. As illustrated in FIG. 14A, the rotatable crossbar 338 extends between crossbar brackets 340 that are arranged proximate the corner portions 336 of the middle portion 334 of the pivotable support bar 326. In this example embodiment, the crossbar brackets 340 extend downward from a longitudinal axis formed by the side end portions 230 and the middle portion distal ends 332 inserted inside the side end portions 230, such that the rotational axis of the rotatable crossbar 338 is also below the longitudinal axis of the side end portions 230 when the support bar 326 is lowered to the use position. However, a host of different configurations could be arranged for the rotatable crossbar 338 without departing from the scope of the present general inventive concept. For example, the rotatable crossbar 338 could be configured to extend directly from the bodies forming the middle portion distal ends 332, e.g., on the same plane. In the example embodiment illustrated in FIGS. 14A-B, however, the downwardly extending crossbar brackets 340 allow the bodies forming the middle portion distal ends 332 to have open ends 356 which are configured to receive middle portion distal ends of another support bar, or a similarly configured body, to provide more support further away from the tractor to be used instead of, or in conjunction with, the middle portion 334 illustrated in FIG. 14A. As such, the middle portion distal ends 332 may be configured with securing holes 358 to receive a securing bolt or pin to secure any such auxiliary device inserted into the open ends 356 in place by passing through corresponding securing holes in the auxiliary device. An example embodiment such as this will be described herein in regard to FIG. 16.

As illustrated more clearly in FIG. 14B, one side of the rotatable crossbar 338 is provided with a worm drive gear arrangement 346 to allow a user to conveniently rotate the rotatable crossbar 338. A worm wheel 350 is provided proximate one end of the rotatable crossbar 338 and is arranged to have the same axis of rotation as the rotatable crossbar 338. A worm screw 348 is configured to be turned by a crank handle 344, operated by a user, and the interaction of the worm screw 348 with the worm wheel 350 cause the rotation of the rotatable crossbar 338, which causes the movement of the pulley 330 about the rotational crossbar 338. The worm screw 348 may be mounted on the crossbar bracket 340 proximate the worm wheel 350. The worm drive gear arrangement 346 may be configured to allow the crank forces to be low, such that the user can easily rotate the rotatable crossbar 338, and such that the crank forces are not "back-driven" by the load. By using the crank handle 344 to turn the rotatable crossbar 338, and thus the pulley assembly 328, via gear reduction, the user is given a safe way to adjust the position of the cable pulley 330 while it is loaded. By rotating the rotatable crossbar 338, the pulley 328 can be moved forward and back relative to the tractor, so that a user can safely and conveniently move a loaded implement toward and/or away from the tractor's hitch connections. A host of different gear configurations, and or modes of rotating the rotatable crossbar 338, may be used in various example embodiments of the present general inventive concept without departing from the scope of the present general inventive concept. The pulley assembly 328 may be arranged proximate a mid-point of the rotatable crossbar 338 so as to substantially align the pulley 330 with the cable 224 being fed from the hoist 222. While various example embodiments of the present general inventive concept may provide a simple pulley on a rigid member to offset the pulley from the rotational axis of the rotatable crossbar 338, the pulley assembly 328 of the example embodiment illustrated in FIGS. 14A-14B is arranged to provide a gap 364 proximate a mid-point of the rotatable crossbar 338 so that the cable 224 supported by the pulley 330 does not contact the rotatable crossbar 338 in the event that the pully 330 has been rotated to a position that is closer to the tractor than is the rotatable crossbar 338 itself. As illustrated in FIG. 14B, the rotatable crossbar 338 is divided into two sections to create the gap 364 in between distal ends of the two sections of the crossbar 338, and the pulley assembly 328 includes two bracket base members 366 that are respectively connected to the distal ends of the two sections of the crossbar 338. Two bracket arms 368 are coupled respectively to the bracket base members 366 so as to extend outward from the rotational axis of the rotatable crossbar 338. The bracket arms 368 may have an angled portion that causes the distal ends of the bracket arms 368 to be closer together than the proximal ends of the bracket arms 368. The distal ends of the bracket arms 368 are configured to support an axle 370 therebetween, and the pulley 330 is mounted on the axle 370 between the distal ends of the bracket arms 368. The cable guide 342 is also configured to be mounted on the axle 370 between the distal ends of the bracket arms 368, and arranged so as to rotate independently of the pulley 330 so that the pulley 330 can rotate with a cable 224 feed without rotating the cable guide 342 at the same time, while the cable guide 342 is also able to rotate to a proper orientation for guiding the cable 224 regardless of the orientation of the overall pulley assembly 328. As illustrated in FIGS. 14A-B, the cable guide 342 of this example embodiment has two cable guide side members 374 that extend downward from the axle 370 so as to support two parallel members 372 that are arranged to keep the cable 224 between the side members 374 and parallel members 372 when the cable 224 is being moved along on the pulley 330. The cable guide 342 may be configured with a counterweight portion on the other side of the rotational axis of the axle 370 to keep the cable guide 342 in substantially the same orientation as the pulley assembly 328 is rotated. Thus, in this example embodiment, the parallel members 372 of the pulley assembly 328 may always be slightly further back from the tractor than is the rotational axis of the axle 370 regardless of how far the pulley 330 is rotated about the rotatable crossbar 338, so that the cable 224 can be properly guided and maintained on a top-rear surface of the pulley 330 at whatever position to which a user has rotated the pulley 330. In various example embodiments the bracket arms 368 may be connected directly to the distal ends of the two sections of the rotatable crossbar 338, or may be coupled to the bracket base members by a variety of adhesive and/or securing members. In this example embodiment a plurality of positioning bolt or pin holes 376 are provided to both the bracket base members 366 and the proximal ends of the bracket arms 368, so that a user may adjust the distance between the rotational axis of the pulley 330 and the rotational axis of the rotatable crossbar 338. In this example embodiment the bracket arms 368 may be formed of a sufficiently rigid material to maintain the gap 364 between the sections of the rotatable crossbar 338, as well as the overall rotational axis of the rotatable crossbar 338 itself. In other various example embodiments the pulley assembly 328 and pulley 330 may be omitted, and a guide member such as a simple groove or similar arrangement may be provided at a distal end of an offset member that allows the cable to slide along the groove, rather than a pulley, at a position offset from the rotational axis of the rotatable crossbar.

As illustrated in FIGS. 14A-B, the support bar 326 of the system 310 may be configured to have the same telescoping arrangement with the side end portions 230 that is illustrated in the system 210 FIG. 10. Thus, the pivotable support bar 326 is able have its overall length adjusted to place the pulley 330 further back from the tractor, as well as the eccentric motion provided by the cranking operation actuated by the handle 344 and gear assembly 346. Various example embodiments may provide different features, such as a handle directly coupled to the rotatable bracket members without a gear assembly, a non-telescoping pivotable support bar, and so on, without departing from the scope of the present general inventive concept. Various example embodiments incorporating the telescoping arrangement illustrated in FIGS. 10 and 14A-B allow for a system to include different middle portions, such as the middle portions 234 and 334, or different middle portions configured for different functions, that can be changed out due to the user's preference since they have the same telescoping arrangement with the side portions 230 of those two systems. The different middle portions, such as middle portions 234 and 334, can also be configured with the open ends 356 proximate the corner portions of the middle portions, so that additional support bar arrangements, such as the example embodiment illustrated in FIG. 16 and described herein, may be inserted therein in a telescoping arrangement. Therefore, in various example embodiments the pivotable support bar 226 may be provided with such open ends, and the corner portions 236 of the support bar 226 may be more squared than rounded, though either configuration may be equipped with the open ends to receive an auxiliary support arrangement.

Figure 15:
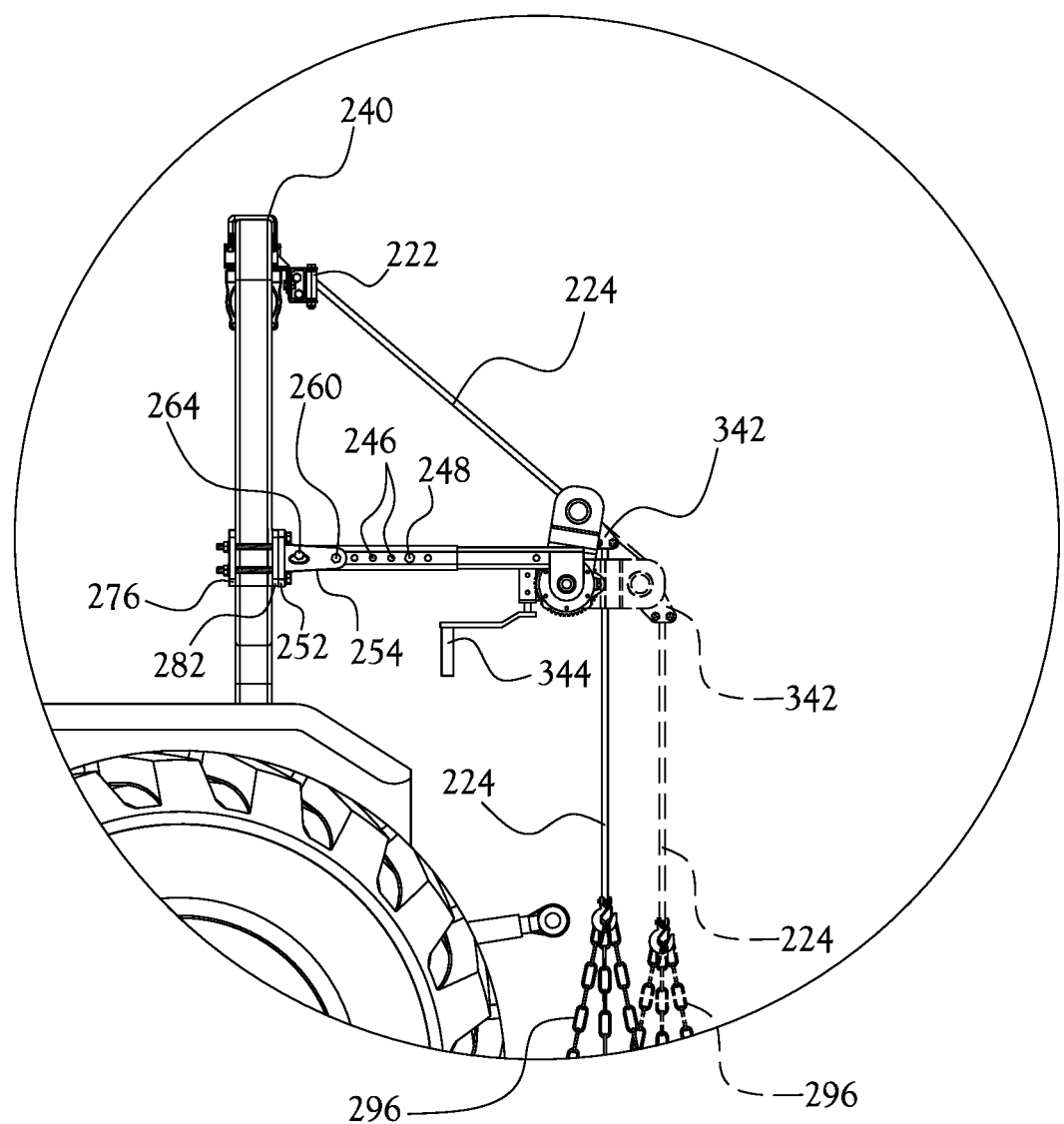
FIG. 15 illustrates a side view of the power hoist equipment crane system of FIGS. 14A-B being used to move the pulley back away from the tractor.

FIG. 15 illustrates a side view of the power hoist equipment crane system of FIGS. 14A-B being used to move the pulley back away from the tractor. As illustrated in FIG. 15, when the pulley assembly 328 is in a first position, illustrated with dashed lines, the pulley 330 is located as far back from the tractor as possible with this given overall length of the pivotable support bar 326. As illustrated, a user can turn the crank handle 344 to rotate the rotatable crossbar 338, thus rotating the pulley assembly 328 to a second position in which the pulley 330 is raised substantially above the rotational crossbar 338 to place a point at which the cable 224 travels downward from the pully 330 closer to the tractor. Thus, if the cable hook 244 is connected to an implement via the 3-way chain arrangement 296 in the first position, by rotating the rotatable crossbar 338 such that the pulley 330 is in the second position the implement connected to the cable 224 can also be moved closer to the tractor, which may aid the user in the connections/disconnections being made to the tractor and implement. Thus, in one example use, after the cable 224 is connected to the implement via the cable hook 244 and 3-way chain arrangement 296, the user can operate the hoist 222 to lift the implement up to disconnect the trailer hitch connections. Once the implement is disconnected from the three point hitch, the user can rotate the crank handle 344 so as to rotate the crossbar 338, and therefore the pulley 330, to another position further back from the tractor than the initial position, so that the implement has been moved back from the tractor hitch connections. The user can then operate the hoist 222 to lower the implement to the ground, and disconnect the cable hook 244 and/or 3-way chain arrangement from the implement.

Figure 16:
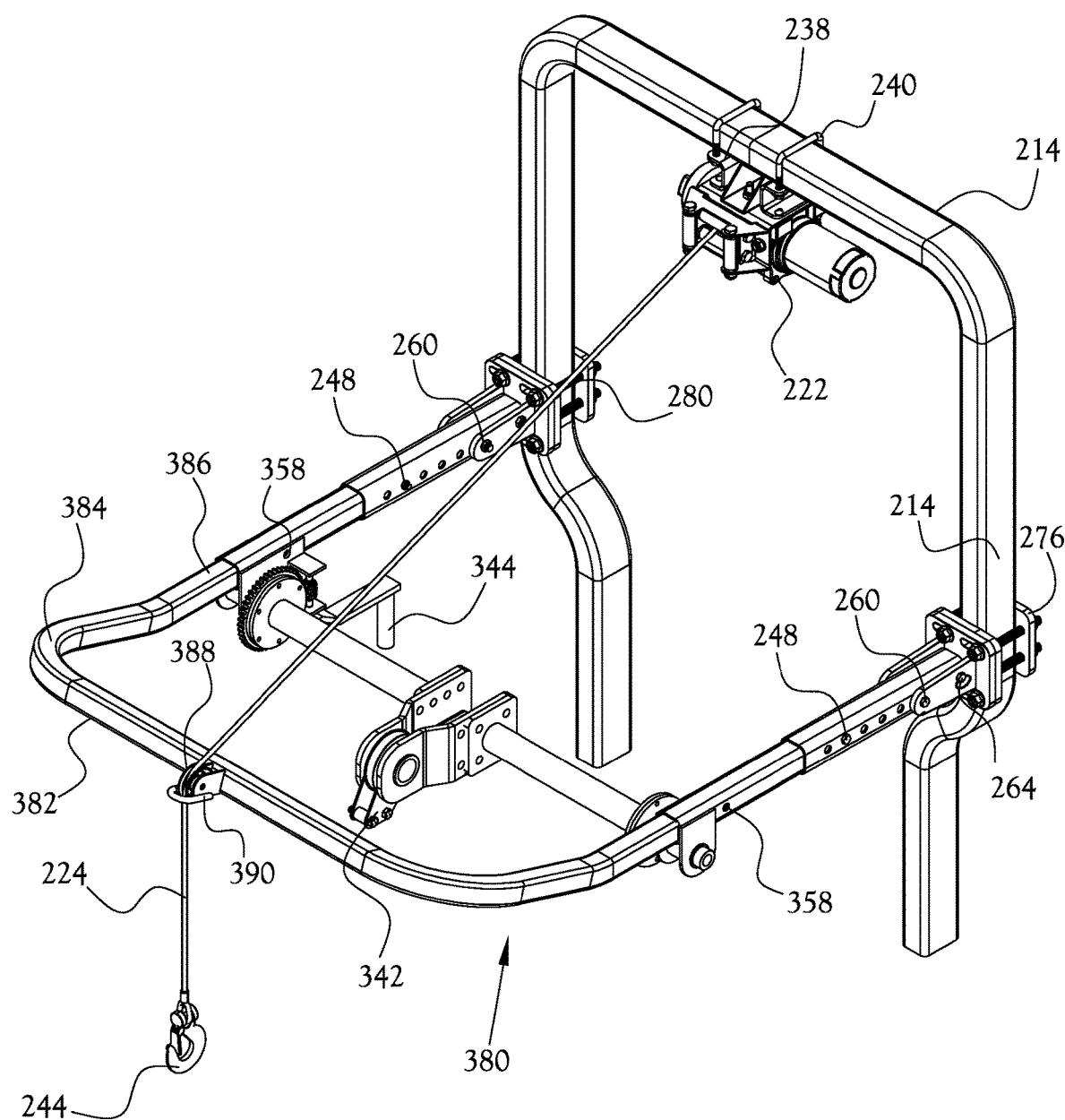
FIG. 16 illustrates a perspective view of the system of FIG. 14A with an auxiliary support bar according to an example embodiment of the present general inventive concept.

In various situations there may be an implement for which it would be beneficial to provide the cable support, such as a pulley which drops the cable down therefrom, even further back from the tractor, and/or at a higher point, than is intended with a system such as the hoist system 310 of FIG. 14A. Thus, various example embodiments may provide readily detachable auxiliary components that can locate a pulley further back, and/or higher, than the one provided on the pivotable support arms described so far. FIG. 16 illustrates a perspective view of the system 310 of FIG. 14A with an auxiliary support bar 380 according to an example embodiment of the present general inventive concept. The auxiliary support bar 380 has a middle portion 382 that turns at corner portions 384 to lead to distal ends 386 of the auxiliary support bar 380, and the distal ends 386 are configured to be inserted into the open ends 356 proximate the corner portions 336 of the pivotable support bar 326. Thus, the distal ends 386 of the auxiliary support bar 380 fit into the pivotable support bar 326 in a telescoping arrangement much like the middle portion distal ends 332 of the middle portion 334 of the pivotable support bar 326 fit into the side end portions 230 coupled to the bracket assemblies 250. As previously described, securing holes 358 are provided proximate the open ends 356 of the middle portion 334 of the pivotable support bar 326, and may be used when lined up with similar securing holes provided proximate the distal ends 386 of the auxiliary support bar 380 to secure the auxiliary support bar 380 in place by use of a bolt or pin or the like. With such a configuration, the auxiliary support bar 380 may be readily and conveniently attached or detached to the pivotable support bar 326 via one or more such pin connections on each side of the pivotable support bar 326. The auxiliary support bar 380 is provided with an auxiliary pulley 388 proximate a mid-point of the middle portion 382 of the auxiliary support bar 380, and an auxiliary cable guide 390 may be provided to the auxiliary pulley 388. Thus, as shown in FIG. 16, the cable 224 can be supported at a point significantly further back from the tractor than the pulley 330, and at a higher point, for situations in which supporting the cable 224 at the longer distance would be beneficial to the user. In various example embodiments the auxiliary support bar may be coupled to the pivotable support bar 326 in other arrangements without departing from the scope of the present general inventive concept. The cable hook 244 can be separated from the cable 224 in order to pass the end of the cable 224 out of the pulley assembly 328 and through the auxiliary cable guide 390, and the cable hook 244 can then be reattached to the cable 224, to use the auxiliary pulley 388 to support the cable 224 winding on to, or off of, the hoist 222. As illustrated in FIG. 16, in various example embodiments the auxiliary support bar may be formed with a bend proximate the corner portions 384, which may be at an area between the corner portions 384 and the distal ends 386, so that the middle portion 382 of the auxiliary support bar 380 between the corner portions 384 is situated to be higher than the crossbar 338 of the support bar 326 when the support bar 326 is in the lowered, or use, position. Such a configuration can be beneficial when dealing with an implement with very high components or connection points, such as an auger. The auxiliary support bar 380 can also be configured to be attached directly to the side end portions 230, rather than in the open ends 356 formed proximate the corners 336 of the pivotable support bar 326, to use the auxiliary support bar 380 itself as the middle portion of the pivotable support bar. Various example embodiments may provide the pivotable support bar 226, the pivotable support bar 326, and the auxiliary support bar 380, which may be configured to be interchangeably used with the side end portions 230. In example embodiments in which a pivotable support bar similar to the bar illustrated in FIG. 10 is formed with openings such as the open ends 356 illustrated in FIG. 14A, the auxiliary support bar can be used with either of the other pivotable support bars.

Figure 17:
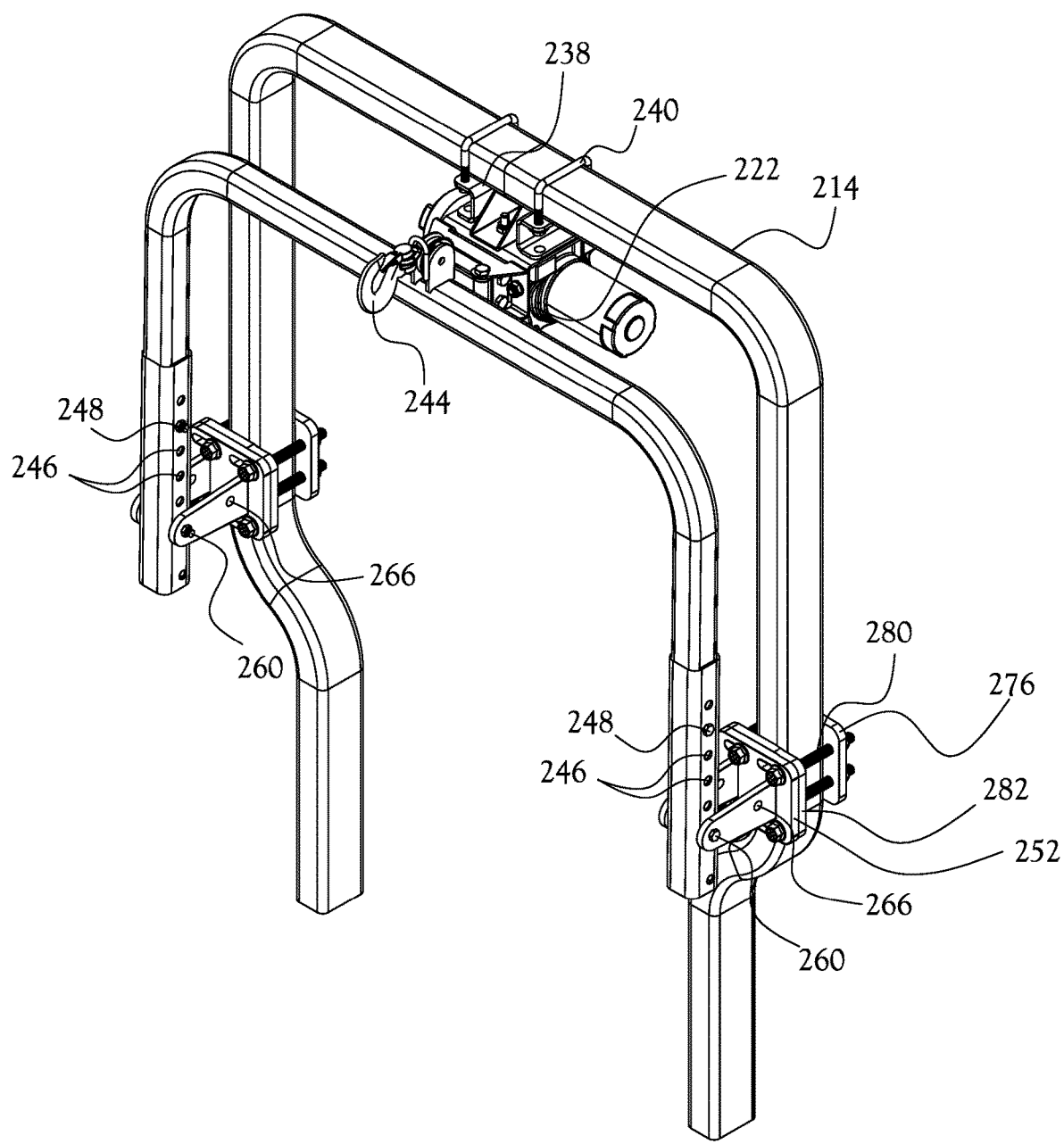
FIG. 17 illustrates a perspective view of a power hoist equipment crane system in a stowed position according to an example embodiment of the present general inventive concept.

FIG. 17 illustrates a perspective view of a power hoist equipment crane system in a stowed position according to an example embodiment of the present general inventive concept. As illustrated in this example embodiment, the pivotable support bar 226 can be easily raised and maintained in the upright, or stowed, position when not in use. By removing the anchor pin from the anchor pin holes 266 in each of the bracket arms 254 of the bracket assemblies 250, the support bar is then able to freely pivot about the pivot pins 260. Therefore, before removing the anchor pins, a user can operate the hoist 222 to wind the cable 224 up until the cable hook 244 makes contact with the cable guide 242. As the cable hook 244 is too large to pass through the cable guide 242, upward rotational pressure will be applied to the pivotable support bar 226 if the hoist is operated to continue winding after such contact. Thus, by stopping the hoist 222 when the cable hook 244 contacts the cable guide 242, the pivotable support bar 226 can now be supported by the cable 224 and hoist 222. The user is then free to remove the anchor pins from each of the bracket assemblies 250, and then operate the hoist 222 to wind the cable 224 up until the pivotable support bar 226 is in the upright and stowed position. No further fixing need be done to the positioning of the pivotable support bar 226, as the contact between the cable hook 244 and the cable guide 242 will maintain the upright position of the support bar 226. In various example embodiments of the present general inventive concept one or more bumper pads may be provided on the tractor roll bar 214 or pivotable support bar 226 to provide a cushion between the roll bar 214 and the support bar 226 when the support bar 226 is raised to the stowed position.

Figure 18:
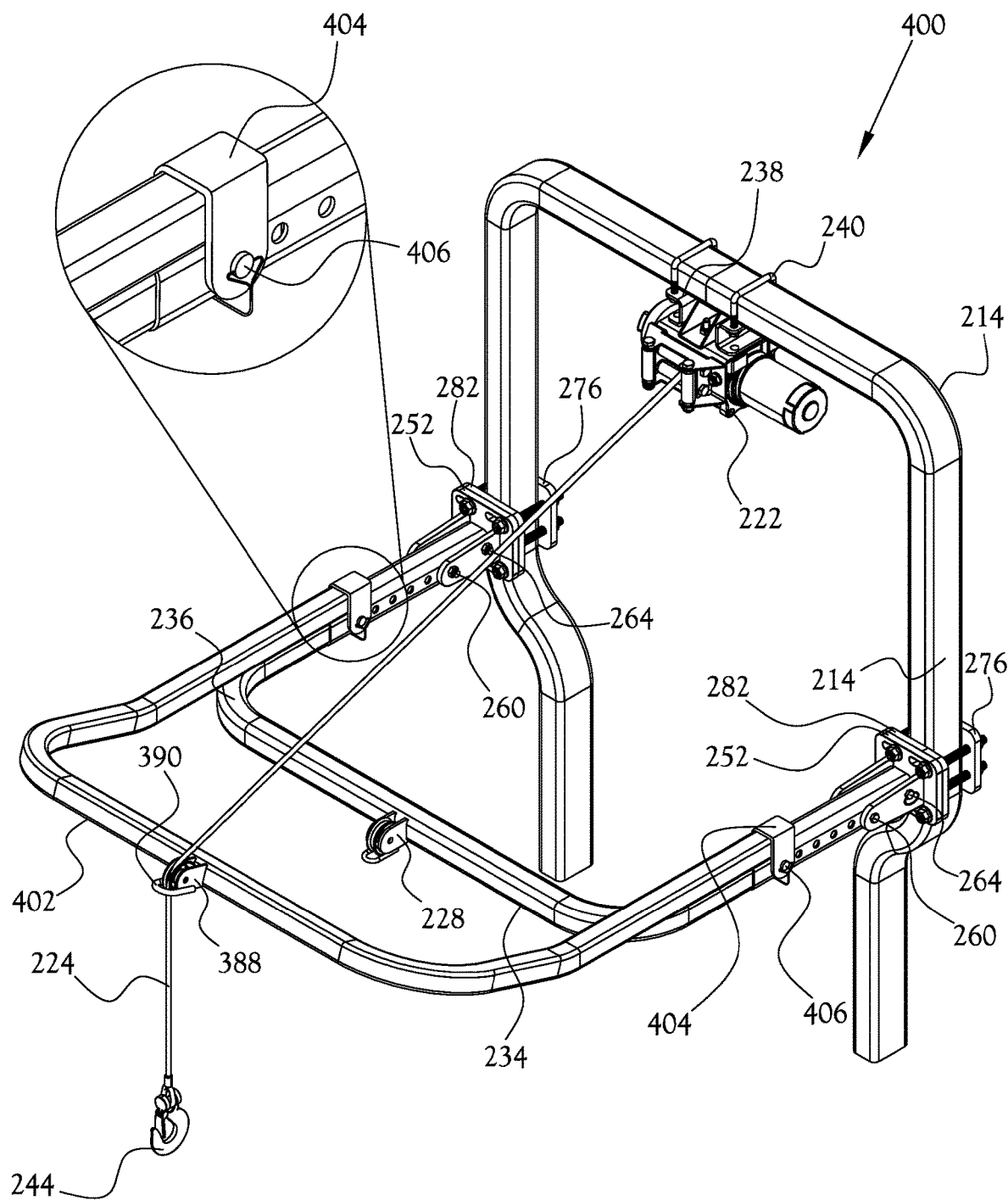
FIG. 18 illustrates a perspective view of a power hoist equipment crane system with an auxiliary support bar according to another example embodiment of the present general inventive concept.

FIG. 18 illustrates a perspective view of a power hoist equipment crane system with an auxiliary support bar according to another example embodiment of the present general inventive concept. The example embodiment illustrated in FIG. 18 shows a power hoist system 400 similar to the system 210 illustrated in FIG. 10, albeit with the bracket assemblies 270 illustrated in FIGS. 11A-D, along with an auxiliary support bar 402 that is configured to be coupled to the pivotable support bar 226 such that a portion of the underside of the auxiliary support bar 402 rests upon a portion of the topside of the pivotable support bar 226. Aside from the auxiliary support bar brackets 404 configured proximate the distal ends 406 of the auxiliary support bar 402, the auxiliary support bar 402 of this example embodiment may be substantially similar to the auxiliary support bar 380 illustrated in FIG. 16. The auxiliary support bar 402 may have an auxiliary pulley 388 configured with an auxiliary cable guide 390 to keep the cable 224 from moving out of the groove of the pulley 388, and may curve upward to accommodate implements with higher connections or other clearance issues. As illustrated in FIG. 18, one of the u-shaped auxiliary support bar brackets 404 are arranged at each of the distal ends of the auxiliary support bar 402. In this example embodiment, the auxiliary support bar brackets 404 wrap around the top and sides of the distal ends of the auxiliary support bar 402, and extend downward so as to face opposite sides of the respective side end portions 230 of the pivotable support bar 226 upon which the auxiliary support bar 402 is attached. The auxiliary support bar brackets 404 are formed with a bolt or pin receiving hole in each of the portions extending downward to face the side end portions 230, and configured such that a bolt 406 can pass through the corresponding bolt receiving holes 246 in the side end portions 230, and through the bolt receiving holes proximate the middle portion distal ends of the middle portion 234, so as to secure both the middle portion 234 of the pivotable support bar 226 and the auxiliary support bar 402 to the respective side end portions with the single bolt 406. In this example embodiment the auxiliary support bar brackets 404 may be attached to the auxiliary support bar by welding, but a host of different attachment configurations may be provided with different example embodiments. Also, various example embodiments may have auxiliary support bar brackets simply extending downward from the sides proximate the distal ends of the auxiliary support bars, and the bracket portions may be provided with multiple bolt receiving holes corresponding to multiple bolt receiving holes 240 in the side end portions, especially when the middle portion distal ends 232 of the middle portion 234 of the pivotable support bar 226 is also provided with such multiple bolt receiving holes. Therefore, a user can readily and conveniently attach and detach the auxiliary support bar 402 to the pivotable support bar 226 when needed. When the pivotable support bar 226 is lowered to the use position, as illustrated in FIG. 18, the user can remove the bolts 248 that were being used to secure the middle portion 234 of the pivotable support bar 226 to the side end portions 230, lay the auxiliary support bar 402 over the pivotable support bar 226 such that the holes in the auxiliary support bar brackets 404 align with the bolt receiving holes 246 that were just being used to secure the middle portion 234 to the side end portions 230, and then pass the bolts 406 through all of the aligned bolt receiving holes to secure the auxiliary support bar 402 to the pivotable support bar 226. The length of the pivotable support bar 226 may also be adjusted during the attachment of the auxiliary support bar 402 by simply choosing another pair of the bolt receiving holes 248 with which to align the bolt receiving holes of the middle portion distal ends 232 of the middle portion 234 of the pivotable support bar 226. As illustrated in FIG. 18, the auxiliary support bar 402 is coupled to the pivotable support bar 226 by the bolts 406, and length of the distal ends of the auxiliary support bar 402 rests atop portions of the side end portions 230 and middle portion distal ends 232 to further brace the auxiliary support bar 402 against the forces encountered when supporting a tractor implement. The detachment of the auxiliary support bar 402 is just as easy, wherein a user can simply remove the bolts 406 from the auxiliary support bar brackets 404, remove the auxiliary support bar 402, and replace the bolts 248 that otherwise secure the middle portion 234 of the pivotable support bar 226 to the side end portions 230. In various example embodiments, the user may choose to simply leave auxiliary support bar 402 attached to the pivotable support bar 226 when in use or stowed, and just change the cable 224 between the pulley 228 of the pivotable support bar 226 and the auxiliary pulley 388 of the auxiliary support bar 402 as needed. In various example embodiments the auxiliary support bar brackets 404 may be configured to be readily attachable and detachable from the auxiliary support bar 402, such as by being bolted on, so that the distal ends of the auxiliary support bar 402 can be coupled directly to the side end portions 230 in the same telescoping arrangement as provided to the middle portion 234, so that the middle portion 234 of the pivotably support bar 226 may be selectively interchangeable with the auxiliary support bar 402, and so that the auxiliary support bar 402 itself can be used as the middle portion of a pivotable support bar. As illustrated in FIG. 18, in various example embodiments the auxiliary support bar 402 may be formed with a bend proximate the corner portions 384, which may be at an area between the corner portions 384 and the distal ends 386, so that the middle portion 382 of the auxiliary support bar 402 between the corner portions 384 is situated to be higher than the middle portion 234 of the support bar 226 when the support bar 226 is in the lowered, or use, position. Such a configuration can be beneficial when dealing with an implement with very high components or connection points, such as an auger.

Figure 19A:
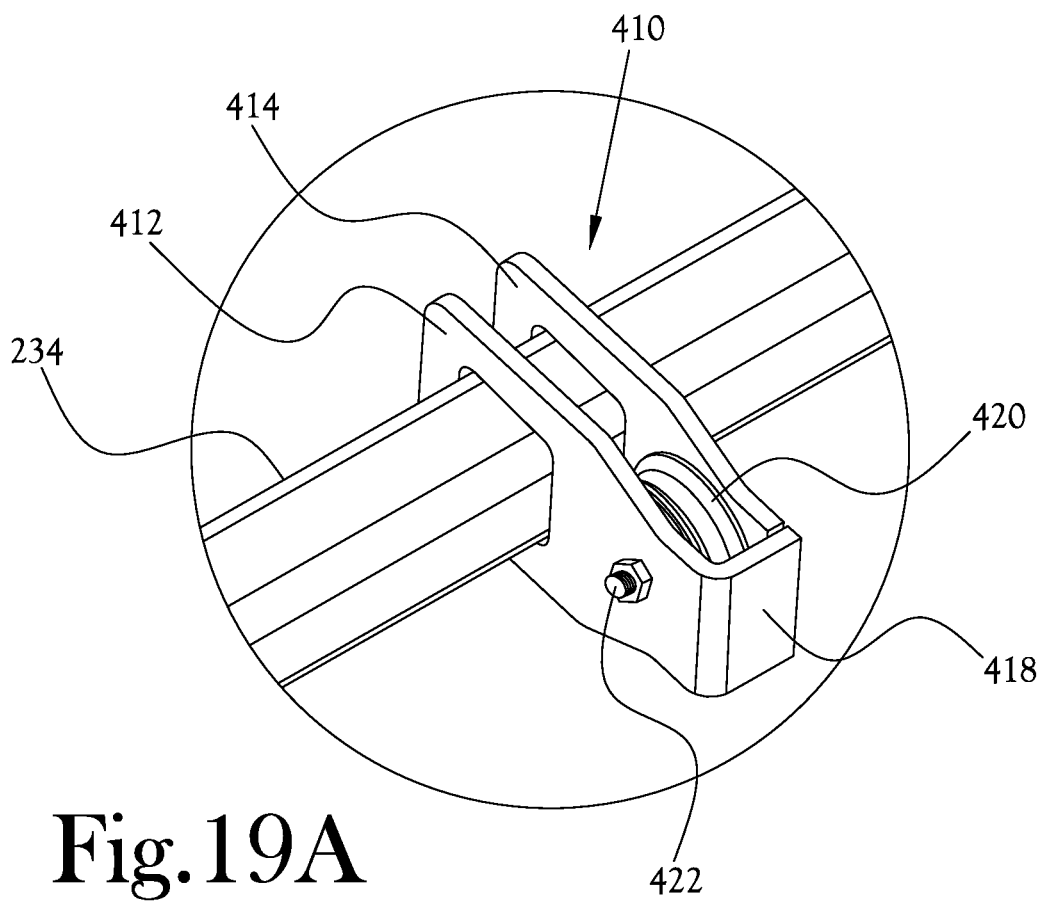
FIGS. 19A-C illustrate perspective views, and an exploded view, of a positionable pulley assembly according to an example embodiment of the present general inventive concept.
Figure 19B:
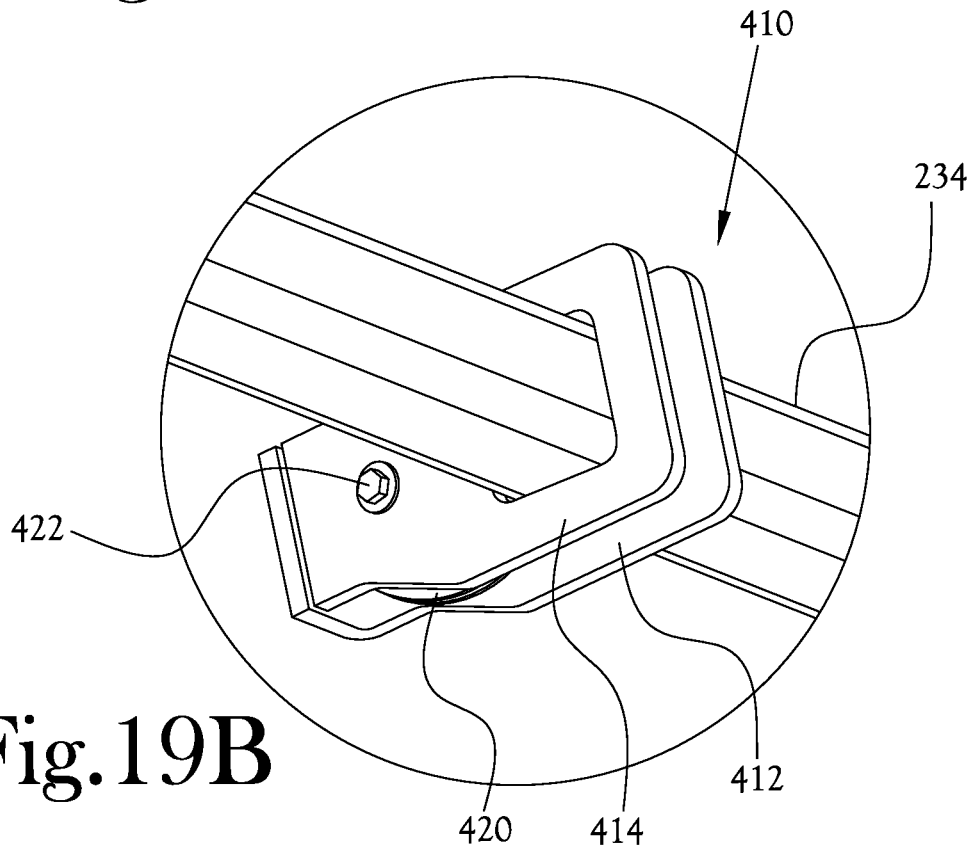
Figure 19C:
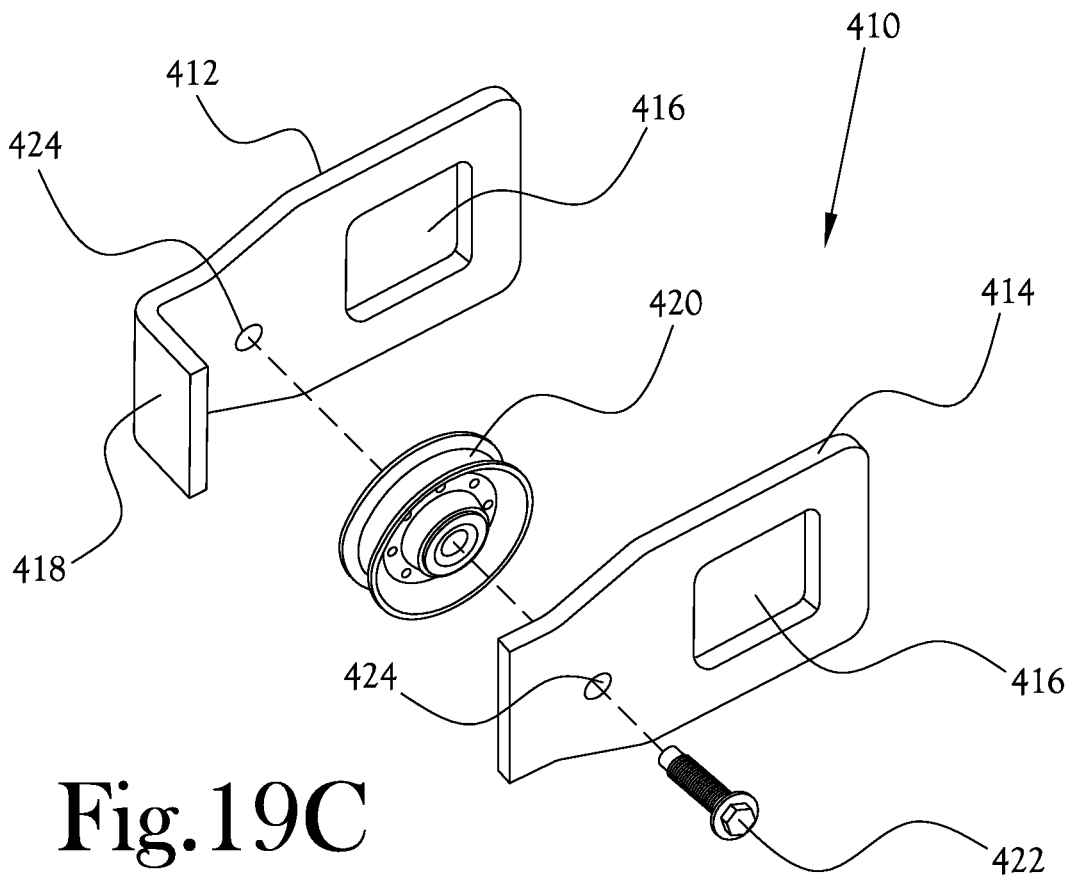

While the example embodiments described and illustrated so far typically have been provided with a pulley, or a pulley assembly, that is fixed at a certain point along the variously configured support bars, there may exist some situations in which it would be beneficial to move the pulley or pulley assembly in a lateral direction to better place the downwardly extending cable over a desired spot on an implement. FIGS. 19A-C illustrate perspective views, and an exploded view, of a positionable pulley assembly 410 according to an example embodiment of the present general inventive concept. FIGS. 19A-B illustrate perspective views looking at an angle from the top and bottom, respectively, of the pulley assembly 410, and FIG. 19C illustrates an exploded view of the pulley assembly 410. As illustrated, the positionable pulley assembly 410 includes a first bracket portion 412 and a second bracket portion 414, each having an opening 416 proximate a proximal end thereof that is configured to receive the body, tubing, etc., used to form the middle portion 234 of the pivotable support bar 226. In various example embodiments the opening 416 is configured to form a slip fit along a length of the support bar 226, so that the pulley assembly 410 can be positioned by simply sliding the pulley assembly 410 to the desired position on the pivotable support bar 226. The first bracket portion 412 and the second bracket portion 414 may have substantially mirrored dimensions in the plate portions facing each other, and the first bracket portion 412 has a lip 418 that bends toward the second bracket portion 414 to form a cable guide for a pulley 420 sandwiched between the first and second bracket portions 412,414. A pulley bolt 422 or pin passes through bolt openings 424 formed proximate distal ends of each of the first and second bracket portions 412,414, as well as through the pulley 420, to provide an axle for the positionable pulley assembly 410. With such a configuration, the pulley assembly 410 can be moved along a length of the middle portion 234 of the pivotable support bar 226 by simply sliding the assembly 410 along. When a load is applied to the cable 224, and thus force is exerted on the positionable pulley assembly 410, the torque causes an interaction between the openings 416 and the pivotable support bar 226 that will keep the positionable pulley assembly 410 in place during the implement attachment/detachment operations. Various example embodiments of the present general inventive concept provide a pulley assembly 410 that is readily disassembled by removing the pulley bolt 422, since it may be easier to slide the bracket portions 412,414 along the tubing of the support bar 226 one at a time, before attaching them to one another with the pulley bolt 422. Such an assembly and disassembly may also be convenient for threading the cable 224 onto the pulley 420 without having to remove the cable hook 244 from the cable 224. Although this example embodiment is described as being placed on the pivotable support bar 226, it could just as easily be used on other embodiments of the pivotable support bar, as well as embodiments of the auxiliary support bar. With example embodiments of the auxiliary support bar that have bracket portions welded onto the distal ends, the positionable pulley assembly may need to be placed on the auxiliary bar before the bracket portions are welded or otherwise attached to the auxiliary bar. In various example embodiments such a positionable pulley assembly may be used in lieu of the fixed pulleys described in other example embodiments, and in other example embodiments the positionable pulley assembly may be used on either side of such a fixed pulley, so that the positionable pulley assembly may be retro-fitted to such a support bar.

Figure 20:
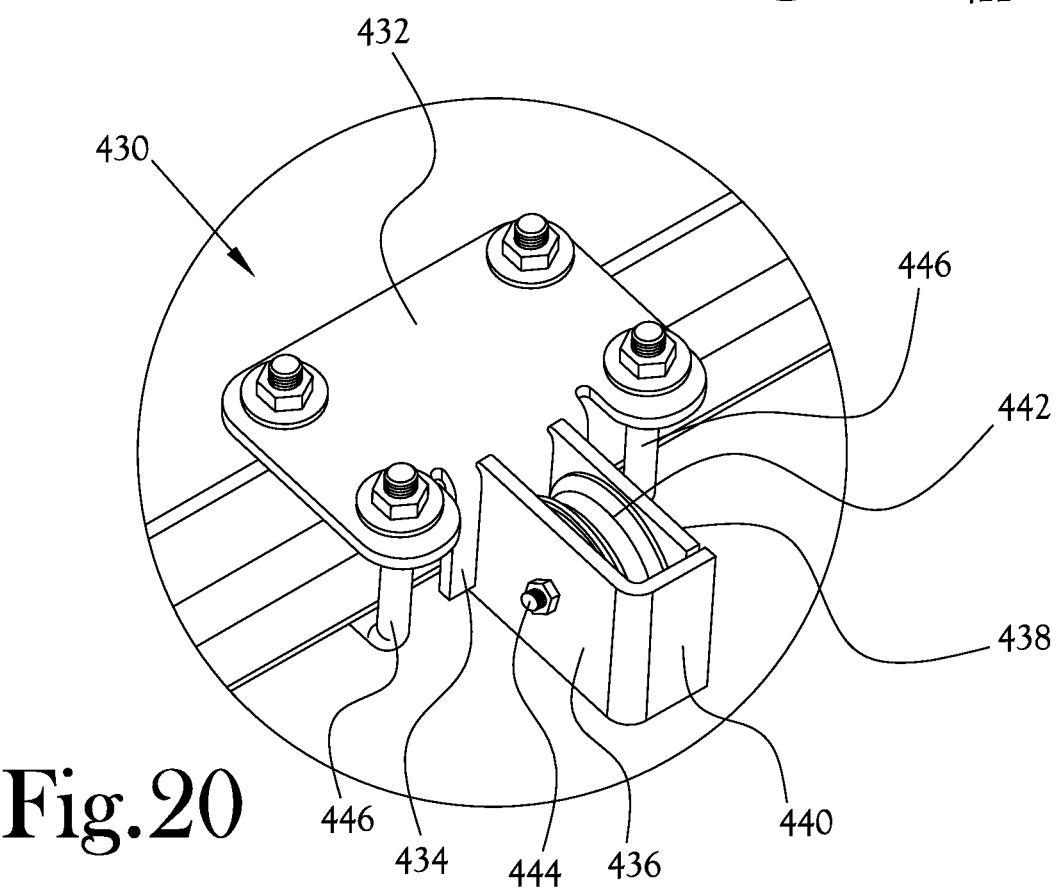
FIG. 20 illustrates a perspective view of a positionable pulley assembly according to another example embodiment of the present general inventive concept.

FIG. 20 illustrates a perspective view of a positionable pulley assembly 430 according to another example embodiment of the present general inventive concept. As illustrated in FIG. 20, this example pulley assembly 430 includes a plate 432 configured to rest atop the pivotable support bar 226, the plate 432 having a front portion 434 that extends downward over the surface of the pivotable support bar 226 facing away from the tractor. From the front portion 434 extends a first bracket portion 436 and a second bracket portion 438 with a pulley 442 sandwiched therebetween. A lip 440 extends from a distal end of the first bracket portion 436 toward a distal end of the second bracket portion 438 to form a cable guide for the pulley 442, and a pulley bolt 444 extends between the first and second bracket portions 436, 438 to form an axle for the pulley 442. The plate 432 is configured with two pairs of bolt receiving holes formed proximate the respective corners of the plate 432, such that two U-bolts 446 wrapped around three surfaces of the pivotable support bar 226 can be received in the bolt receiving holes to secure the positionable pulley assembly 430 in place at the desired position on the support bar 226. Thus, a user can simply loosen the nuts securing the U-bolts 446 in place, slide the pulley assembly 430 along the pivotable support bar or other such support bar to the desired position on the bar, and then tighten the nuts on the U-bolts 446 to secure the positionable and lockable pulley assembly 430 in place. In various example embodiments both the first and second bracket portions 436,438 may be welded or otherwise secured to the front portion 434. In various other example embodiments the first bracket portion 436 or the second bracket portion 438 may welded or otherwise secured to the front portion 434 while the remaining bracket portion is simply configured to be held in place by the pulley bolt 444 and overall fitting when fully assembled, which provides a convenient assembly/disassembly for threading the cable 224 onto the pulley 442, or removing the cable 224 from the pulley 442, without having to remove the cable hook 244 from the cable 224. As with the positionable pulley assembly 410 of FIGS. 19A-C, the lockable and positionable pulley assembly 410 of FIG. 20 can be used with various example embodiments of the present general inventive concept described herein.

Various example embodiments of the present general inventive concept provide power hoist systems such as those described herein, and/or more generally having a boom member configured to be coupled to a tractor such that the boom member extends to a position spaced back from the tractor. A cable and hook assembly may be supported from the end of such a boom member, or one or more chains may be hooked directly to the boom member to lift an implement to be attached to the tractor. The chain or chains may be configured to be attached to the boom member such that at least two portions of the chain extend down from the boom member in the general direction of the implement, and a plurality of implement supporting and/or connection members, such as hooks, and which may be referred to herein as lifting or supporting members, may be coupled between the chain portions and an implement that is attachable to the tractor. Various example embodiments of the present general inventive concept may provide a host of differently configured supporting members, some of which may be configured to be attached to specific different implements.

For example, a backhoe may be connected to a boom member on the tractor to aid in the overall connection of the backhoe (the implement in this situation) to the tractor. The greater reach of the tractor boom allows the backhoe's boom to be pulled toward the back of the tractor, thus lifting the bucket up and off the ground. When installing (attaching) the backhoe, the tractor's hydraulic system is used to lift and align the backhoe to the tractor. This is accomplished by manipulation of the left and right stabilizing arms on the tractor. The alignment required to mount the backhoe entails a good fit and alignment of the backhoe frame pin holes to the tractor rail holes. This allows the user/installer to insert the pins on each side of the frame to secure the backhoe to the tractor. The weight of the backhoe may likely be too much for the tractor boom to lift, so the boom system may just be used to align the implement, rather than lifting the backhoe wholly off the ground.

FIGS. 21A-B illustrate front and side views of a backhoe boom supporting member according to an example embodiment of the present general inventive concept. The backhoe boom supporting member 500 of FIGS. 21A-B is configured with two sidewalls 502 having a general J-shape, and a spacer portion 504 arranged therebetween such that the sidewalls are separated yet still fit partially into the structure of a backhoe to support the boom bolt and bushing in the curved portion of the sidewalls. The spacer portion may be arranged such that a bolt hole 506 is formed between upper ends of the sidewalls so that an end of the chain can be bolted to the backhoe boom supporting member. Thus, while bolted to the chain, the backhoe boom supporting member can be easily slipped on and off of the backhoe boom by the user. In an example embodiment the sidewalls may be approximately ¼" thick, and the spacer between the sidewalls may be approximately 1¾" wide, with an approximately ¾" bolt hole.

FIGS. 22A-B illustrate side and top views of a backhoe yoke clamp according to an example embodiment of the present general inventive concept. As illustrated in FIGS. 22A-B, the yoke clamp 510 may be configured with a first end 512 having a longitudinal first bolt hole formed therein, so that a chain link 511 can be secured by a bolt 514 installed in the first bolt hole. A clamp portion 516 having top and bottom members 518,520 extends away from the first end 512 and terminates in an open second end 522 that is configured to receive the backhoe plate therein. A second bolt hole 524 is formed proximate a terminal end of the top member 518 such that a bolt 526 can be threaded therethrough to create a pressure-force contact with a top of the backhoe plate, thus securing the yoke clamp 510 to the backhoe plate. Placing such a yoke clamp 510 on both sides of the backhoe plate may assist in the alignment of the backhoe when attaching the implement to the tractor. In an example embodiment the yoke clamp 510 may have a length of 3½", with the top and bottom members 518,520 having a width of ¾" except for a 1" width at the second bolt hole 524, which may be configured to receive a ⅜" threaded bolt. The first bolt hole may be configured to receive a ½" bolt. FIGS. 23A-B illustrate top and side views of a backhoe yoke clamp 530 according to another example embodiment of the present general inventive concept. In the example embodiment of FIGS. 23A-B the top member 532 extends to form the first bolt hole 534 on a top surface thereof, so that a bolt to secure the chain to the first bolt hole 534 is received in the same direction as a bolt in the second bolt 536 that secures the yoke clamp 530 to the backhoe plate. A ⅜" nut may be attached over the second bolt hole formed in the top member to provide more threading to the securing bolt.

FIGS. 24A-B illustrate side and front views of a rototiller supporting member according to an example embodiment of the present general inventive concept, FIG. 24C illustrates another example embodiment of the supporting member of 24B, FIG. 24D illustrates a side view of an additional fixed rototiller supporting member, and FIG. 24 E illustrates a rototiller tongue assembly with which the rototiller supporting member will interact according to an example embodiment of the present general inventive concept. The rototiller supporting member 540 of FIGS. 24A-B, or rototiller J hook, is configured to fit into the tongue of the rototiller to keep the tongue of the implement level with the back portion of the tiller when lifted. This position is beneficial in maneuvering the tiller to be mounted onto the three point hitch of the tractor. As illustrated in FIGS. 24A-B, the rototiller J hook 540 includes two generally J-shaped sidewalls 542 separated by an approximately 1" spacer 544 provided between the curved portions of the J-shaped sidewalls, and a bolt hole member 546 attached to a front surface of the sidewalls proximate a top end of the rototiller J hook. The bolt hole member 546 forms an approximately 21/32" bolt hole, and extends approximately 9/16" outward from the outer edge of each of the sidewalls 542, which may each be approximately ¼" thick. The overall height of the J hook 540 may be approximately 4⅛". As illustrated in FIG. 24E, the tongue assembly of the rototiller has a 1¼" diameter bushing that is approximately 1 9/16" in length between two sides of the tongue assembly, and in various example embodiments the dimensions of the J hook 540 are designed to fit snugly therein to aid in the lift and balance of the rototiller. FIG. 24C illustrates a J hook 550 according to another example embodiment of the present general inventive concept, in which the bolt hole member 552 is formed with a keyhole shaped hole so that a chain link can also be accommodated in the top portion of the keyhole. FIG. 24D illustrates a side view of an additional fixed rototiller supporting member according to an example embodiment of the present general inventive concept. The fixed rototiller hook 570 of FIG. 24D is configured to be secured to the rototiller itself, and therefore can be left attached to the rototiller, for convenience of the user, even when lifting operations are not being performed. When painted to match the rototiller, a casual viewer may not even recognize it as an added part. The fixed rototiller hook 570 is configured as an elongated member that may be approximately 6" long, with a 1⅛" hook 572 formed at a first end, and a ⅝" bolt hole 574 at a second end. Thus, the fixed rototiller hook 570 can use the rototiller's existing frame bolts, such as where the frame member leading to the tongue of the rototiller are attached to the lower body of the rototiller, to secure the fixed rototiller hook to the rototiller. One of the fixed rototiller hooks can be situated at the end of each of the tongue arms, thus, when used with the J hook of FIGS. 24A-B, providing three support points with which to support and balance the rototiller. As the rototiller J hook was designed to fit into the tongue of the rototiller, it is able to keep the tongue of the implement level with the back portion of the rototiller when lifted. This position is desirable to maneuver, with a chain connected to the J hook and two of the fixed rototiller hooks, the rototiller to mount onto the three point hitch. The J hook can be inserted into the rototiller tongue and hooked onto the top spacer pin, which is behind the linch pin hole, and then used with the two fixed rototiller hooks to enable a three point lifting ability. This allows a level rototiller to be presented to the three point hitch of the tractor. When a user wishes to attach the rototiller to the tractor, the rototiller or implement should be presented to the tractor lifting arms and top link in a level position. The rototiller tongue top link hole needs to be kept clear. Keeping the top link hole clear allows the linch pin to be inserted. The linch pin secures the rototiller to the top link of the tractor's three point hitch and is installed above the spacer pin. No bolt is required when using the rototiller J hook. The previously described balance hook chain may use a shackle installed on the rototiller J Hook to secure the chain to the sliding balance hook. The two fixed rototiller hooks are mounted on the rototiller at a distance from each other using the rototiller's existing bolts, securing the two right and left lift arm braces, thus providing a three chain support for the rototiller's installation.

Figure 25A:
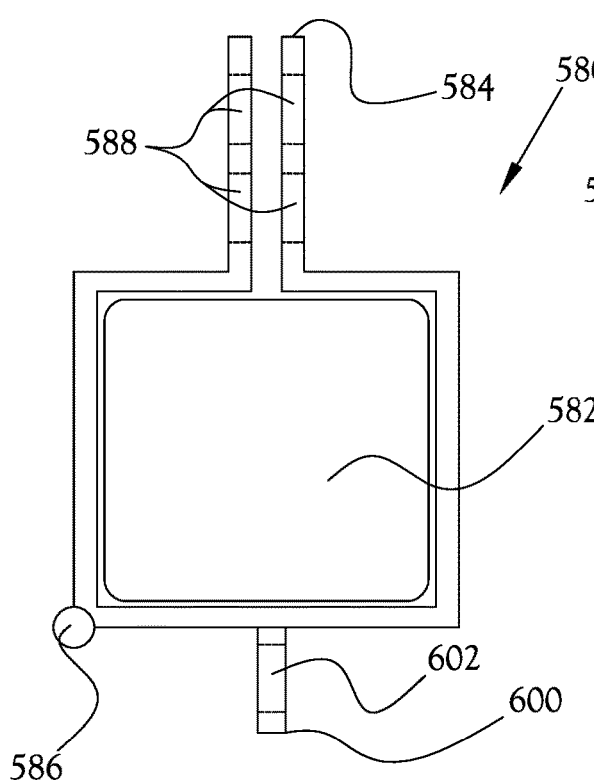
FIGS. 25A-D illustrate front and side views of two auger supporting members according to an example embodiment of the present general inventive concept.
Figure 25B:
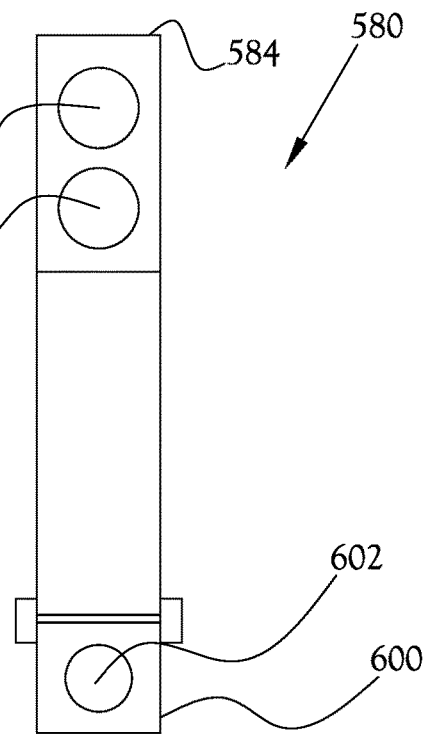
Figure 25C:
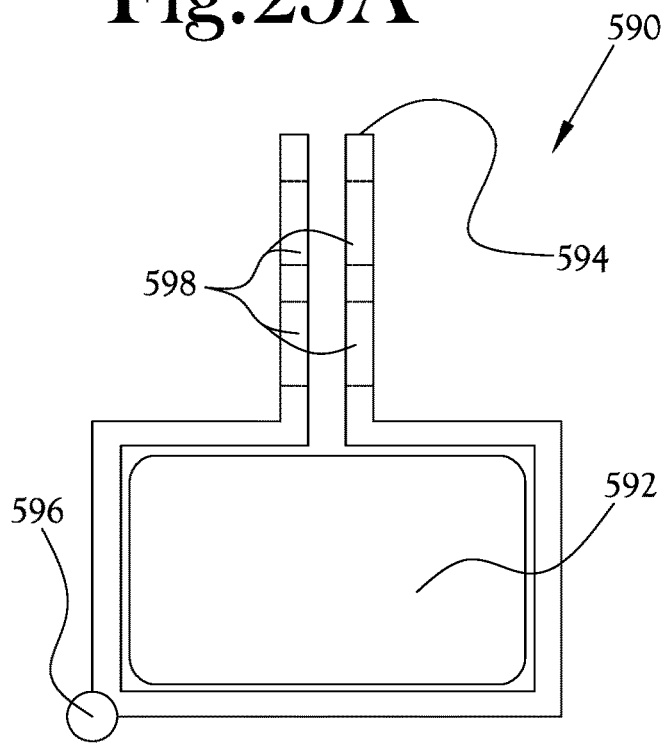
Figure 25D:
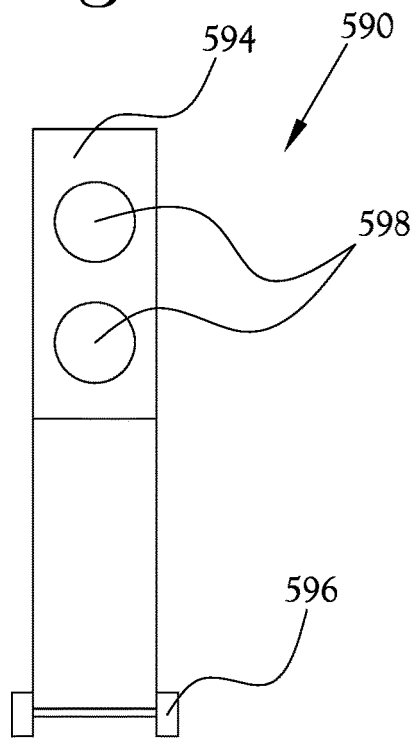

FIGS. 25A-D illustrate front and side views of two auger supporting members according to an example embodiment of the present general inventive concept. The procedure for attaching an auger (post hold digger) to the tractor is complicated by the auger cutter being attached to the main frame, which adds height to the auger. There is a tendency for the auger to fall over when being installed on the tractor and causing a misalignment of the link pins to the tractor's three point hitch. The auger lifting clamps (when attached to the previously described sliding balance hook and boom such as illustrated in FIGS. 8A-9) are configured to lift the auger upright and keep the implement perpendicular to the three point hitch. In an example embodiment using an auxiliary support bar, such as the system illustrated in FIG. 18, a user may use only one of these clamps, such as that illustrated in FIG. 25C. In such an example, a user may use a separate strap or similar member to support during PTO during the attachment and/or detachment of the auger. As illustrated in FIGS. 25A-D, the auger supporting members are configured as two clamps 580,590 having different dimensions. Each of the clamps 580,590 are configured with a generally rectangular sleeve portion 582,592 configured to fit over a portion of the frame arch of the auger, or the auger arm, and an upper portion 584,594 extending from the top to form support and securing connections. The clamps are configured with a two-piece hinged construction, with the hinge portion 586,596 formed at a bottom corner of the sleeve portion 582,592. Each of the two pieces forming the respective clamps extend from the hinge portion 586,596 to form the sleeve portion 582,592, and then extend upward to form the upper portion 584,594 with two facing members. Thus, the clamps are designed so as to be "opened" by action of the hinge members, wrapped around the frame arch, and then closed and secured using holes 588,598 in the upper portions of the clamps. Each of the clamps has two holes 588,598 at the upper portions thereof, one of which is used to secure the clamp to the arch frame. The lower of the respective holes 588,598 at the upper portions of the clamps may be a ½" hole configured to receive a ½" long bolt secured by a 1¼" nut. The bolt's installation provides a clamping action to hold the clamps tightly on the frame arch. The upper holes on the clamps are configured to provide a place to attach a shackle to a lifting/balance chain. FIGS. 25A-B illustrate front and side views of an approximately 6" clamp, and FIGS. 25C-D illustrate front and side views of an approximately 4" clamp. The 6" clamp of FIGS. 25A-B includes a lower portion 600 extending downward from the sleeve portion. This lower portion 600 has a hole 602 formed therein to provide an anchor point for a chain, rope, or the like to suspend the PTO drive shaft up and out of the way to the arch frame while attaching the auger to the tractor. The larger auger clamp, illustrated in FIGS. 25A-B, is configured to be fit over the arch a distance away from the main frame, may be approximately 6" in height, with an approximately 2¾" by 2½" inner sleeve portion, a 2" upper portion, and a 1" upper portion. The smaller auger clamp, illustrated in FIGS. 25C-D, is configured to be fit over the arch proximate a bend near the main frame, may be approximately 4" in height, with an approximately 2¾" by 1¾" inner sleeve portion, and a 2" upper portion.

Figures 26A, 26B:
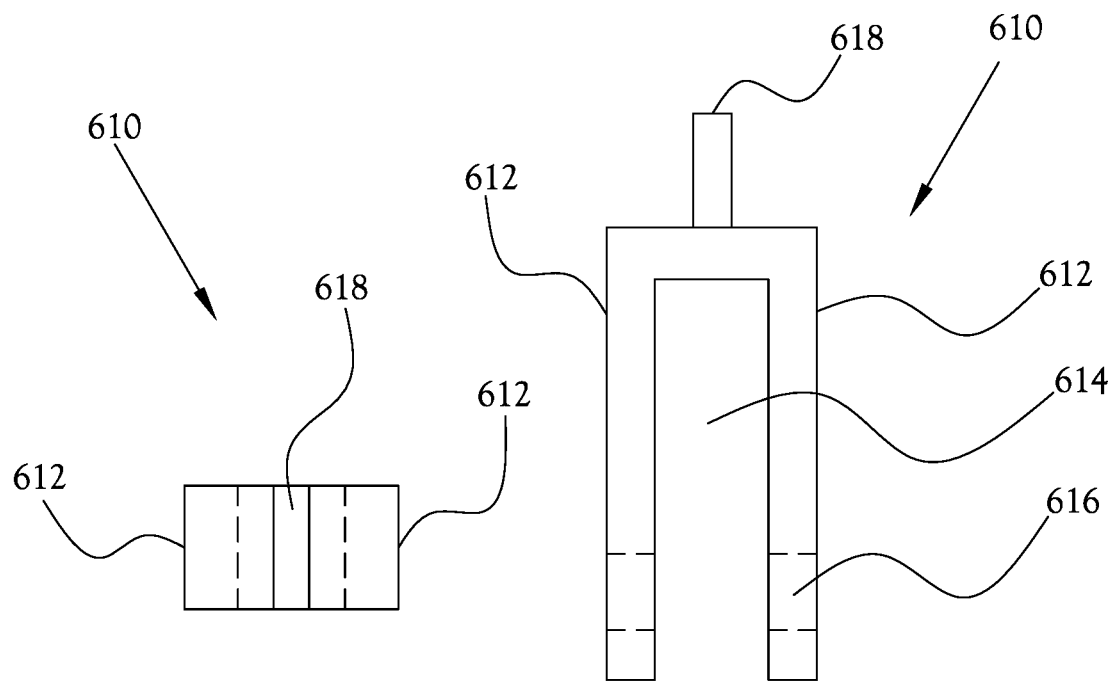
FIGS. 26A-C illustrate top, front, and side views of a bush hog lifting tool according to an example embodiment of the present general inventive concept.
Figure 26C:
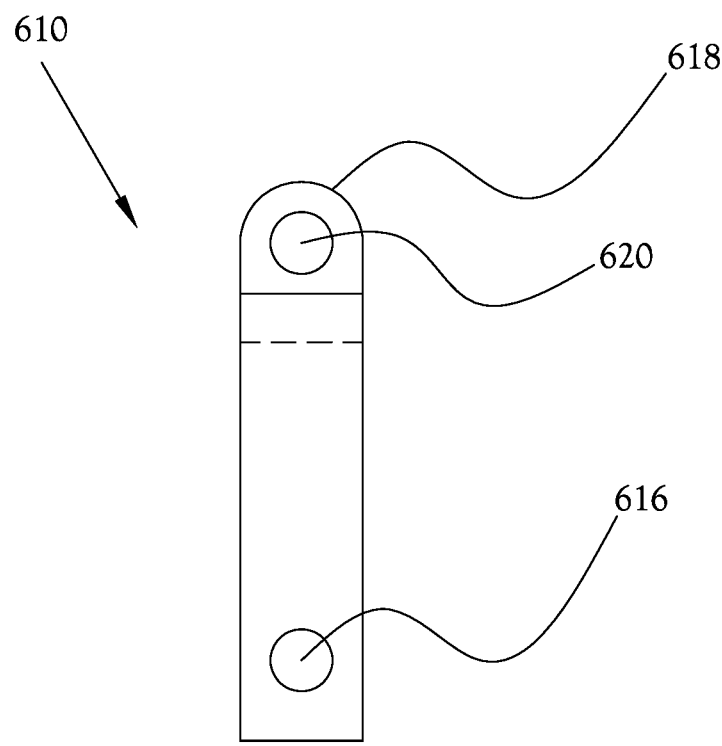

FIGS. 26A-C illustrate top, front, and side views of a bush hog lifting tool according to an example embodiment of the present general inventive concept. This example embodiment of a bush hog lifting tool 610 is configured with an elongated body configured with two side members 612 forming a slot 614 therebetween and opening to the bottom of the bush hog lifting tool 610. The slot 614 is configured to receive the tongue of a bush hog, and each of the two side members 612 have a ¾" hole 616 formed proximate the bottom thereof to receive a bolt to secure the lifting tool on the tongue. In other words, the bolt when received through bolt of the holes in the side members effectively closes the slot to that the tool is secured on the tongue of the bush hog. An upper portion 618 extends upward from the elongated body, and is formed with a ⅝" hole 620. The example embodiment illustrated in FIGS. 26A-C may be configured with a main body portion that is approximately 4½" tall, forming a 2¾" deep slot that is 1⅛" wide. The upper portion may extend approximately 1⅛" up from the main body portion. The bush hog lifting tool, or bush hog lifting clamp, may be mounted on the tongue of the bush hog that forms the top link of the implement. The bush hog mounting clamp may be left on the bush hog after its first installation. The bush hog mounting clamp may be secured with a ⅝" bolt that is 2½" long and having a ⅝" nut. When mounted to, for example, the sliding balance hook or three way chin and/or boom attached to the tractor, it uses a shackle to connect to a chain that is then connected to the sliding balance hook on a cable used by the boom. Mounting the bush hog lifting clamp on the top link behind the tractor top link hole allows clearance for the installation of the top link pin. The bush hog clamp may be designed to have the width of the two top link rods, and also provides a connection point to attach the lifting chain when installing the bush hog onto the three point tractor hitch. The bush hog lifting clamp can be used in conjunction with fixed hooks such as illustrated in FIG. 24D, which can be bolted to the diagonal brace mounting bracket holes toward the rear of the bush hog, and can also remain in place for later lifting operations. Similar to the rototiller lifting operation described herein, the balance chains can then be connected to the bush hog lifting clamp and fixed hooks to provide three points of lift and balance during the attachment of the bush hog to the tractor. Since the fixed hooks and/or bush hog clamp can stay installed to the bush hog for later lifting operations, the chain can simply be easily slipped on and off of the hook and shackle connections for the convenience of the user.

Embodiments of the present general inventive concept allow a single user to change out heavy equipment attached and detached form a tractor or other type vehicle with ease and convenience. Embodiments of the present general inventive concept also provide a host of other advantages. For example, as the whole system is separate from the tractor, there needs to be no permanent connections, such as welding, to the tractor. This allows the hoist support bar or crane to be easily attached and removed without damage to the tractor. In various example embodiments, the entire system may be attached to the roll bar by two number two—16 metric bolts hold the crane to the roll bar, and quick disconnect plugs can be used in the power leads to the hoist. In various example embodiments no clamps are required to allow the crane to be raised and lowered from the roll bar. The power hoist may be removed from the hoist support bar and installed on a lower portion of the tractor, and various example embodiments may employ a tie bar with a mounting plate attached to the tow bar for the power hoist. Off the shelf power hoists may be used with the system. In various example embodiments, the power hoist may be a 2,500 pound capacity power hoist may be connected to the tractor's battery supply with size 10 wiring through a 50-amp breaker. Other various example embodiments may include differently rated and sized components, such as, for example, a 3,500 pound capacity power hoist connected to the tractor's battery supply with size 6 wiring, and so on.

Various example embodiments of the present general inventive concept may provide a power winch equipment crane system to be used with a tractor roll bar, the system including a winch support bar configured to be generally U-shaped having two side portions and a middle portion connecting the two side portions, a power winch attached to the winch support bar proximate a midpoint of the middle portion of the winch support bar, and hinge members provided respectively proximate each end of the winch support bar and configured to couple the winch support bar to the tractor roll bar in a pivoting arrangement, the hinge members configured such that the winch support bar is pivotable between a substantially vertical position when not in use, and a substantially horizontal position in which the power winch is positioned at a point spaced back from the tractor so as to be located over an implement that is attachable to the tractor. The winch support bar may be shaped to correspond to at least a portion of the tractor roll bar. The system may further include stop members extending from the ends of the winch support bar and configured to contact the tractor roll bar to limit downward rotation of the winch support bar when in the substantially horizontal position. The system may further include at least one securing member attached to the winch support bar and configured to be selectively positioned so as to contact the tractor roll bar when the winch support bar is in the substantially vertical position to secure the winch support bar to prevent rotation. The at least one securing member may include a hook portion configured to contact a surface of the tractor roll bar facing away from the winch support bar when the at least one securing member is positioned to secure the winch support bar. The at least one securing member may further include a sleeve portion configured to wrap around the winch support bar and to be reciprocally slidable along a length of the winch support bar, the hook portion being attached to the sleeve portion. The sleeve portion may be configured to be reciprocally slidable to and from a first position that allows the winch support bar to be moved to and away from the substantially vertical position without the hook portion contacting the tractor roll bar, and a second position that allows the hook portion to contact the surface of the tractor roll bar facing away from the winch support bar when in the substantially vertical position. The sleeve portion may be configured to be reciprocally slidable along a first one of the side portions of the winch support bar. Movement of the sleeve portion in a direction toward the middle portion of the winch support bar may be limited by a bend between the middle portion and the first one of the side portions of the winch support bar. The system may further include coupling members configured to be attached to the tractor roll bar so as to extend back therefrom, and to connect to the hinge members of the winch support bar proximate the respective ends thereof to form the pivoting arrangement. The coupling members may be brackets configured to be welded to the tractor roll bar. The system may further include a crane boom configured to be selectively attached to, and detached from, the winch support bar, the crane boom including a crossmember mount configured to be attached at each end to the respective side portions of the winch support bar so as to sit thereon when the winch support bar is in the substantially horizontal position, a boom arm extending away from proximate a midpoint of the crossmember mount such that a distal end of the boom arm is positioned at a point farther away from the tractor roll bar than the power winch, and a pulley attached proximate the distal end of the boom arm and configured to support a cable of the power winch. The crane boom may further include a mounting bracket proximate each end of the crossmember mount, the mounting brackets being configured to extend below the winch support bar, and to receive a securing bolt below the winch support bar, to secure the crossmember mount to the winch support bar. The boom arm may include a boom arm base portion connected to the crossmember mount, and a boom arm telescoping portion extending from a distal end of the boom arm base portion and configured to slide in an axial direction relative to the boom arm portion such that the boom arm has an adjustable length. A portion of the boom arm telescoping portion may be configured to slide in and out of the distal end of the boom arm base portion to adjust the length of the boom arm, a proximal end of the boom arm telescoping portion being provided with a plurality of apertures formed along its length and configured to receive a position fixing pin passing through the boom arm base portion. The crane boom may further include a riser portion provided at a bottom of the boom arm and configured to contact the middle portion of the winch support bar so as to raise the boom arm to a position in which the pulley is positioned at a point higher than the power winch. The crane boom may further include a wire guide provided at the distal end of the boom arm to guard against the cable slipping off of the pulley, the wire guide being selectively positionable between a guard position proximate the pulley, and an away position extended away from the pulley. The crane boom may further include an anchor point formed on the crossmember mount and configured to receive a hook on an end of the winch cable. The system may further include a sliding balance hook configured to be supported on the winch cable when the winch cable from the power winch extends from the pulley back to the crossmember mount, the sliding balance hook including an elongate body, a balance hook pulley provided at each end of the elongate body, and a plurality of support hooks provided at points proximate a bottom of the elongate body and configured to support various points of the implement that is attachable to a tractor.

Various example embodiments of the present general inventive concept may provide a power winch equipment crane system to be used with a tractor roll bar, the system including a winch support bar configured to be generally U-shaped having two side portions and a middle portion connecting the two side portions, a power winch attached to the winch support bar proximate a midpoint of the middle portion of the winch support bar, hinge members provided respectively at each end of the winch support bar and configured to secure the winch support bar to a bracket on the tractor roll bar, the hinge members configured to form a pivoting connection to the winch support bar such that the winch support bar is pivotable between a substantially vertical position when not in use, and a substantially horizontal position in which the power winch is positioned at a point spaced back from the tractor, stop members extending from each end of the winch support bar and configured to contact the tractor roll bar when in the substantially horizontal position to brace the winch support bar against the tractor roll bar, and at least one movable securing member attached to the winch support bar and configured to be selectively positioned so as to contact the tractor roll bar to hold the winch support bar in the substantially vertical position.

Various example embodiments of the present general inventive concept may provide a power hoist equipment crane system to be used with a tractor roll bar, the system including a pivotable support bar configured to be substantially U-shaped having two side portions and a middle portion connecting the two side portions, a cable support member provided to the pivotable support bar and configured to support a cable from a hoist, and bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor. The pivotable support bar may be shaped to correspond to at least a portion of the tractor roll bar. The bracket assemblies may each include a bracket base member configured to contact a surface of the tractor roll bar, a plurality of U-bolts configured to secure the bracket base member to the tractor roll bar, a pair of bracket arms configured to extend from the bracket base member to contact opposite sides of the corresponding end of the pivotable support bar, a pivot pin configured to pass through pivot pin receiving holes formed in the bracket arms and the end of the pivotable support bar to provide a pivot point for the pivotable support bar, and an anchor pin configured to pass through anchor pin receiving holes formed in the bracket arms and the end of the pivotable support bar to secure the pivotable support bar in the use position, wherein removal of the anchor pin allows the pivotable support bar to pivot around the pivot point. The bracket assemblies may each include a brace member configured to contact a surface of the tractor roll bar opposite the pivotable support bar, a support member configured to contact a surface of the tractor roll bar opposite the brace member, a first plurality of bolts to secure the brace member to the support member, a bracket base member configured to be connected to the support member at a side opposite the tractor roll bar, a second plurality of bolts configured to secure the bracket base member to the support member, a pair of bracket arms configured to extend from the bracket base member to contact opposite sides of the corresponding end of the pivotable support bar, a pivot pin configured to pass through pivot pin receiving holes formed in the bracket arms and the end of the pivotable support bar to provide a pivot point for the pivotable support bar, and an anchor pin configured to pass through anchor pin receiving holes formed in the bracket arms and the end of the pivotable support bar to secure the pivotable support bar in the use position, wherein removal of the anchor pin allows the pivotable support bar to pivot around the pivot point. The bracket base member may be formed with a plurality of elongated grooves to respectively receive the second plurality of bolts, the elongated grooves configured such that the bracket base member is selectively positionable in a lateral direction relative to the support member. The support member may be configured with a plurality of positioning bolt holes to receive the second plurality of bolts extending through the bracket base member, the positioning bolt holes being offset from center toward a first side of the support member such that the bracket base member is adjustable to be further offset from the support member in a first direction when the support member is positioned in a first orientation, and adjustable to be further offset from the support member in a second direction opposite the first direction when the support member is rotated to a second orientation, the first and second orientations being selectable to allow more width adjustment for the bracket assemblies in a desired direction. The anchor pin receiving holes may be offset further from a longitudinal axis of the bracket arms than the pivot pin receiving holes, such that the pivotable support bar is held at a substantially right angle relative to the tractor roll bar in the use position when the bracket base member is connected to the support member in a first orientation, and such that the pivotable support bar is held at a different angle relative to the tractor roll bar in the use position when the bracket base member is rotated to be connected to the support member in a second orientation. The anchor pin and pivot pin receiving holes in the pivotable support bar may have the same configuration as the anchor pin and pivot pin receiving holes in the bracket arms. The system may further include an auxiliary support bar configured to be coupled to the pivotable support bar, and an auxiliary cable support member provided to the auxiliary support bar and configured to support the cable at a different position than provided by the cable support member of the pivotable support bar, wherein the auxiliary support bar is configured such that the auxiliary cable support member is positioned further back from the tractor than the cable support member of the pivotable support bar when in the use position. The auxiliary support bar may be configured such that the auxiliary cable support member is positioned higher than the cable support member of the pivotable support bar when in the use position. The auxiliary support bar may be configured with auxiliary support bar brackets proximate distal ends of the auxiliary support bar and configured to be connected to portions of the pivotable support bar. The auxiliary support bar brackets may each include at least one pin that passes through receiving holes formed in the pivotable support bar. The cable support member may be configured as a pulley assembly fixed proximate a midpoint of the middle portion of the pivotable support bar. The cable support member may be a positionable pulley assembly configured to be selectively positioned along a length of the middle portion of the pivotable support bar. The positionable pully assembly may include a pulley configured to support the cable, a pulley bolt configured as an axle to the pulley, and first and second plates having through openings proximate a first end to form a slip fit on the pivotable support bar, wherein the first and second plates are secured to one another with the pulley bolt so as to hold the pulley therebetween, and wherein at least one of the first and second plates has a lip extending from a second end to form a cable guide for the pulley. The positionable pulley assembly may be configured with at least one securing member to secure the positionable pulley assembly at a desired position along the pivotable support bar. The system may further include a power hoist configured to be attached to the tractor roll bar proximate a mid-point of the tractor roll bar, and to selectively wind and unwind the cable supported by the cable support member. The pivotable support bar may be configured to be selectively extendable such that the cable support member is positionable at a plurality of distances back from the tractor when the pivotable support bar is in the use position, and the middle portion of the pivotable support bar may include two distal ends configured in a telescoping arrangement with the two respective side portions. The system may further include a securing member provided on at least one of the side portions to secure the middle portion at the selected position of the cable support member. The middle portion of the pivotable support bar may include a rotatable crossbar extending between distal ends of the middle portion, crossbar brackets provided to each of the distal ends of the middle portion and configured to rotatably support the rotatable crossbar, and a handle coupled to the rotatable crossbar and configured to rotate the rotatable crossbar in each direction about the rotational axis of the rotatable crossbar, and the cable support member may be configured to be offset from the rotatable crossbar such that cable support member rotates about the rotational axis of the rotatable crossbar at a constant distance from the rotational axis of the rotatable crossbar. The system may further include a gear assembly coupled between the rotatable crossbar and the handle to transfer rotational power of the handle to the rotatable crossbar. The gear assembly may include a worm wheel fixed on an end of the rotatable crossbar, and a worm screw fixed to the handle and configured to interact with the worm wheel to transfer the rotational power of the handle to the rotatable crossbar.

Various example embodiments of the present general inventive concept may provide a power hoist equipment crane system to be used with a tractor roll bar, the system including a pivotable support bar configured to be substantially U-shaped having two side portions and a middle portion connecting the two side portions, a cable support member provided to the pivotable support bar and configured to support a cable from a hoist, bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor, an auxiliary support bar configured to be selectively coupled to the pivotable support bar, and an auxiliary cable support member provided to the auxiliary support bar and configured to support the cable at a different position than provided by the cable support member of the pivotable support bar, wherein auxiliary support bar is configured such that the auxiliary cable support member is positioned further back from the tractor, and higher, than the cable support member of the pivotable support bar when in the use position, and wherein each of the bracket assemblies comprise a plurality of plates coupled to one another so as to be adjustable in width to accommodate different tractor roll bar widths.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A power hoist equipment crane system to be used with a tractor roll bar, the system comprising:
    a pivotable support bar configured to be substantially U-shaped having two side portions and a middle portion connecting the two side portions;
    a cable support member provided to the pivotable support bar and configured to support a cable from a hoist; and
    bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor.

2. The system of claim 1, wherein the pivotable support bar is shaped to correspond to at least a portion of the tractor roll bar.

3. The system of claim 1, wherein the bracket assemblies each comprise:
    a bracket base member configured to contact a surface of the tractor roll bar;
    a plurality of U-bolts configured to secure the bracket base member to the tractor roll bar;
    a pair of bracket arms configured to extend from the bracket base member to contact opposite sides of the corresponding end of the pivotable support bar;
    a pivot pin configured to pass through pivot pin receiving holes formed in the bracket arms and the end of the pivotable support bar to provide a pivot point for the pivotable support bar; and
    an anchor pin configured to pass through anchor pin receiving holes formed in the bracket arms and the end of the pivotable support bar to secure the pivotable support bar in the use position;
    wherein removal of the anchor pin allows the pivotable support bar to pivot around the pivot point.

4. The system of claim 1, wherein the bracket assemblies each comprise:
    a brace member configured to contact a surface of the tractor roll bar opposite the pivotable support bar;
    a support member configured to contact a surface of the tractor roll bar opposite the brace member;
    a first plurality of bolts to secure the brace member to the support member;
    a bracket base member configured to be connected to the support member at a side opposite the tractor roll bar;
    a second plurality of bolts configured to secure the bracket base member to the support member;
    a pair of bracket arms configured to extend from the bracket base member to contact opposite sides of the corresponding end of the pivotable support bar;
    a pivot pin configured to pass through pivot pin receiving holes formed in the bracket arms and the end of the pivotable support bar to provide a pivot point for the pivotable support bar; and
    an anchor pin configured to pass through anchor pin receiving holes formed in the bracket arms and the end of the pivotable support bar to secure the pivotable support bar in the use position;
    wherein removal of the anchor pin allows the pivotable support bar to pivot around the pivot point.

5. The system of claim 4, wherein the bracket base member is formed with a plurality of elongated grooves to respectively receive the second plurality of bolts, the elongated grooves configured such that the bracket base member is selectively positionable in a lateral direction relative to the support member.

6. The system of claim 5, wherein the support member is configured with a plurality of positioning bolt holes to receive the second plurality of bolts extending through the bracket base member, the positioning bolt holes being offset from center toward a first side of the support member such that the bracket base member is adjustable to be further offset from the support member in a first direction when the support member is positioned in a first orientation, and adjustable to be further offset from the support member in a second direction opposite the first direction when the support member is rotated to a second orientation, the first and second orientations being selectable to allow more width adjustment for the bracket assemblies in a desired direction.

7. The system of claim 4, wherein the anchor pin receiving holes are offset further from a longitudinal axis of the bracket arms than the pivot pin receiving holes, such that the pivotable support bar is held at a substantially right angle relative to the tractor roll bar in the use position when the bracket base member is connected to the support member in a first orientation, and such that the pivotable support bar is held at a different angle relative to the tractor roll bar in the use position when the bracket base member is rotated to be connected to the support member in a second orientation.

8. The system of claim 7, wherein the anchor pin and pivot pin receiving holes in the pivotable support bar have the same configuration as the anchor pin and pivot pin receiving holes in the bracket arms.

9. The system of claim 1, further comprising:
    an auxiliary support bar configured to be coupled to the pivotable support bar; and
    an auxiliary cable support member provided to the auxiliary support bar and configured to support the cable at a different position than provided by the cable support member of the pivotable support bar;
    wherein the auxiliary support bar is configured such that the auxiliary cable support member is positioned further back from the tractor than the cable support member of the pivotable support bar when in the use position.

10. The system of claim 9, wherein the auxiliary support bar is configured such that the auxiliary cable support member is positioned higher than the cable support member of the pivotable support bar when in the use position.

11. The system of claim 9, wherein the auxiliary support bar is configured with auxiliary support bar brackets proximate distal ends of the auxiliary support bar and configured to be connected to portions of the pivotable support bar.

12. The system of claim 11, wherein the auxiliary support bar brackets each include at least one pin that passes through receiving holes formed in the pivotable support bar.

13. The system of claim 1, wherein the cable support member is configured as a pulley assembly fixed proximate a midpoint of the middle portion of the pivotable support bar.

14. The system of claim 1, wherein the cable support member is a positionable pulley assembly configured to be selectively positioned along a length of the middle portion of the pivotable support bar.

15. The system of claim 14, wherein the positionable pulley assembly comprises:
a pulley configured to support the cable;
a pulley bolt configured as an axle to the pulley; and
first and second plates having through openings proximate a first end to form a slip fit on the pivotable support bar;
wherein the first and second plates are secured to one another with the pulley bolt so as to hold the pulley therebetween; and
wherein at least one of the first and second plates has a lip extending from a second end to form a cable guide for the pulley.

16. The system of claim 14, wherein the positionable pulley assembly is configured with at least one securing member to secure the positionable pulley assembly at a desired position along the pivotable support bar.

17. The system of claim 1, further comprising a power hoist configured to be attached to the tractor roll bar proximate a mid-point of the tractor roll bar, and to selectively wind and unwind the cable supported by the cable support member.

18. The system of claim 1, wherein the pivotable support bar is configured to be selectively extendable such that the cable support member is positionable at a plurality of distances back from the tractor when the pivotable support bar is in the use position; and
wherein the middle portion of the pivotable support bar comprises two distal ends configured in a telescoping arrangement with the two respective side portions.

19. The system of claim 18, further comprising a securing member provided on at least one of the side portions to secure the middle portion at the selected position of the cable support member.

20. The system of claim 1, wherein the middle portion of the pivotable support bar comprises:

a rotatable crossbar extending between distal ends of the middle portion;
crossbar brackets provided to each of the distal ends of the middle portion and configured to rotatably support the rotatable crossbar; and
a handle coupled to the rotatable crossbar and configured to rotate the rotatable crossbar in each direction about the rotational axis of the rotatable crossbar;
wherein the cable support member is configured to be offset from the rotatable crossbar such that cable support member rotates about the rotational axis of the rotatable crossbar at a constant distance from the rotational axis of the rotatable crossbar.

21. The system of claim 20, further comprising a gear assembly coupled between the rotatable crossbar and the handle to transfer rotational power of the handle to the rotatable crossbar.

22. The system of claim 21, wherein the gear assembly comprises:
a worm wheel fixed on an end of the rotatable crossbar; and
a worm screw fixed to the handle and configured to interact with the worm wheel to transfer the rotational power of the handle to the rotatable crossbar.

23. A power hoist equipment crane system to be used with a tractor roll bar, the system comprising:
a pivotable support bar configured to be substantially U-shaped having two side portions and a middle portion connecting the two side portions;
a cable support member provided to the pivotable support bar and configured to support a cable from a hoist;
bracket assemblies provided respectively proximate each end of the pivotable support bar and configured to couple the pivotable support bar to the tractor roll bar in a pivoting arrangement, the bracket assemblies configured such that the pivotable support bar is pivotable between a substantially vertical stowed position when not in use, and a substantially horizontal use position in which the cable support member is positioned at a point spaced back from the tractor so as to be located over an implement that is attachable to the tractor;
an auxiliary support bar configured to be selectively coupled to the pivotable support bar; and
an auxiliary cable support member provided to the auxiliary support bar and configured to support the cable at a different position than provided by the cable support member of the pivotable support bar;
wherein auxiliary support bar is configured such that the auxiliary cable support member is positioned further back from the tractor, and higher, than the cable support member of the pivotable support bar when in the use position, and
wherein each of the bracket assemblies comprise a plurality of plates coupled to one another so as to be adjustable in width to accommodate different tractor roll bar widths.

* * * * *